United States Patent
Sugihara et al.

(10) Patent No.: US 9,335,598 B2
(45) Date of Patent: *May 10, 2016

(54) DISPLAY DEVICE AND METHOD FOR DRIVING SAME

(71) Applicant: Sharp Kabushiki Kaisha, Osaka (JP)

(72) Inventors: Toshinori Sugihara, Osaka (JP); Noboru Noguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/404,354

(22) PCT Filed: Apr. 30, 2013

(86) PCT No.: PCT/JP2013/062586
§ 371 (c)(1),
(2) Date: Nov. 26, 2014

(87) PCT Pub. No.: WO2013/179845
PCT Pub. Date: Dec. 5, 2013

(65) Prior Publication Data
US 2015/0146129 A1    May 28, 2015

(30) Foreign Application Priority Data

May 30, 2012 (JP) ................................. 2012-123294
Nov. 22, 2012 (JP) ................................. 2012-256087

(51) Int. Cl.
*G09G 3/32*    (2006.01)
*G02F 1/1362*    (2006.01)

(52) U.S. Cl.
CPC ........ *G02F 1/136286* (2013.01); *G09G 3/3233* (2013.01); *G09G 3/3291* (2013.01); *G09G2300/0819* (2013.01); *G09G 2300/0852* (2013.01); *G09G 2300/0861* (2013.01); *G09G 2310/0256* (2013.01); *G09G 2310/08* (2013.01); *G09G 2320/045* (2013.01)

(58) Field of Classification Search
CPC .............. G09G 3/3233; G09G 3/3291; G09G 2300/0819; G09G 2300/0852; G09G 2310/0256; G09G 2310/08; G09G 2320/045; G09G 2300/0861
USPC .................. 345/76–82, 84–100, 690–691
See application file for complete search history.

(56) References Cited

U.S. PATENT DOCUMENTS

| 2005/0179626 A1 | 8/2005 | Yuki et al. |
| 2015/0145899 A1* | 5/2015 | Sugihara et al. ............. 345/691 |
| 2015/0235595 A1* | 8/2015 | Sugihara et al. ............. 345/691 |

FOREIGN PATENT DOCUMENTS

JP    2005-258427 A    9/2005

OTHER PUBLICATIONS

U.S. Appl. No. 14/404,371 and U.S. Appl. No. 14/404,378, filed Nov. 26, 2014.

*Primary Examiner* — Vijay Shankar
(74) *Attorney, Agent, or Firm* — Chen Yoshimura LLP

(57) ABSTRACT

In a pixel circuit, during a period during which an organic EL element is not emitting light, transistors are in an "on" state and the organic EL element (OLED) is reversed-biased by a low-level power-supply potential and a reverse-biasing power-supply potential. A reverse-direction voltage determined by a reverse-direction current that depends on the degree to which degradation of the organic EL element has progressed is thus written to a capacitor. A data voltage is then supplied to the capacitor via another capacitor, bringing the drive voltage of a transistor (T2) that controls the current that drives the organic EL element to Vsig+Voledr. This makes it possible to minimize decreases in the emission luminance of an electrooptical element such as an organic EL element due to degradation thereof over time.

16 Claims, 32 Drawing Sheets

(A)

(B)

DISPLAY DEVICE AND METHOD FOR DRIVING SAME

TECHNICAL FIELD

The present invention relates to a display device, and more specifically to a display device including an electrooptical element driven by current such as an organic EL (electroluminescent) element and a method of driving the same.

BACKGROUND ART

Organic EL display devices are known for being thin profile, high image quality, and low power consumption display devices. The organic EL display device has formed therein a plurality of pixel circuits arranged in a matrix, the pixel circuits including organic EL elements, which are light-emitting electrooptical elements driven by current, driving transistors, and the like.

The organic EL elements have been known for having a decrease in light emitting efficiency due to deterioration over time, resulting in a decrease in light-emitting luminance. FIG. 31 is a drawing for describing the effect that deterioration over time of the organic EL elements has on image display. More specifically, FIG. 31(A) shows a situation in which the same pattern is displayed over a long period of time, and FIG. 31(B) shows a situation in which all pixel circuits are applied a signal for the same luminance after the same pattern was displayed over the long period of time. As shown in FIG. 31(A), the cumulative light-emitting time for organic EL elements (hereinafter, "organic EL elements in a first region PA") in the pixel circuits in the region PA (hereinafter, the "first region") where bright display is performed over a long period time is longer than that of organic EL elements (hereinafter, "organic EL elements in a second region PB") in pixel circuits in the region PB (hereinafter, the "second region") where dark display is performed over a long period of time. Thus, the organic EL elements in the first region PA undergo a decrease in light-emitting efficiency due to greater deterioration than those in the second region PB. As a result, as shown in FIG. 31(B), so-called screen burn-in occurs in the first region PA. Specifically, display of the same luminance as the second region PB normally should occur in the first region PA, but display of a lower luminance than the second region PB occurs in the first region PA.

FIG. 32 is a drawing for describing the decrease in luminance of the organic EL elements. Here, a fixed current is assumed to be fed to the organic EL elements. As deterioration over time of the organic EL elements progresses, impedance increases in the organic EL elements. As a result, as shown in FIG. 32, forward-biased voltage applied to the organic EL elements increases as deterioration over time of the organic EL elements progresses. As described above, light-emitting efficiency decreases as deterioration over time of the organic EL elements progresses, and as a result, the decrease in luminance occurs as shown in FIG. 32. The deterioration over time of the organic EL elements in the second region PB has not progressed as much as those in the first region PA, and thus, there is not as much decrease in luminance in the second region PB. On the other hand, the deterioration over time of the organic EL elements in the first region PA has progressed more than in the second region PB, and thus, there is a greater decrease in luminance in the first region PA. As a result, the display state shown in FIG. 31(B) occurs.

In relation to the present invention, Patent Document 1 discloses a pixel circuit that compensates for increase in forward bias voltage resulting from deterioration over time of organic EL elements. FIG. 33 is a circuit diagram showing a configuration of the pixel circuit 91 disclosed in Patent Document 1. In FIG. 33, for ease of explanation, the reference characters in the drawing of Patent Document 1 are modified. A pixel circuit 91 has one organic EL element OLED, six transistors T11 to T16, two capacitors C11 and C12, and a variable bias voltage source VS. The transistor T12 is of a p-channel type, and the transistors T11 and T13 to T16 are of an n-channel type.

First, a scan wiring line Sj is selected and the transistor T11 turns ON, and a voltage based on the data signal fed from a data wiring line Di is written to the capacitor C11. Next, the selection of the scan wiring line Sj ends and the transistor T11 turns OFF, and control lines Vg13j and Vg15j are selected. As a result, the transistor T13 turns ON, and a drive current based on a voltage between source and gate of the transistor T12 is fed to the organic EL element OLED. Also, the transistor T15 turns ON, and the gate potential of the transistor T16 becomes equal to the positive potential of the organic EL element OLED based on the drive current. The positive potential Pi of the organic EL element OLED changes due to deterioration of the organic EL element OLED. Here, using the variable bias voltage source VS, a source potential Ps of the transistor T16 is set according to the following formula (1).

$$Ps = Pi - Vth \qquad (1)$$

Here, Vth represents a threshold voltage of the transistor T16.

By setting the source potential Ps of the transistor T16 according to formula (1), it is possible to extract the increase in forward bias voltage resulting from the deterioration of the organic EL element OLED as the source/drain current of the transistor T16. After the source/drain current of the transistor T16 is determined, the selection of the control line Vg15j ends and the transistor T15 turns OFF, and then the control line Vg14j is selected and the transistor T14 turns ON. Thus, the potential of the gate terminal of the transistor T12 decreases based on the source/drain current of the transistor T16. As a result, it is possible to perform luminance compensation based on the increase in forward bias voltage resulting from deterioration over time of the organic EL element OLED. Therefore, it is possible to mitigate a decrease in luminance of emitted light resulting from the deterioration over time of the organic EL elements OLED.

RELATED ART DOCUMENTS

Patent Documents

Patent Document 1: Japanese Patent Application Laid-Open Publication No. 2005-258427

SUMMARY OF THE INVENTION

Problems to be Solved by the Invention

However, in the pixel circuit disclosed in Patent Document 1, when determining the source/drain current of the transistor T16, light is emitted from the organic EL element OLED. In other words, display is performed at a luminance based on the drive current prior to compensation according to the rise in forward bias voltage occurring. Thus, it is not possible to sufficiently mitigate a decrease in luminance of light emitted resulting from a deterioration over time of the electrooptical elements such as organic EL elements.

An object of the present invention is to provide a display device in which a decrease in luminance of emitted light resulting from deterioration over time of electrooptical elements such as organic EL elements is mitigated to a greater extent than in conventional devices, and a method of driving the same.

Means for Solving the Problems

A first aspect of the present invention is an active matrix display device, includes:
a plurality of data wiring lines supplying data signals;
a plurality of scan wiring lines that are each selectively driven;
reverse bias control lines that supply a control potential at least during a first prescribed period; and
a plurality of pixel circuits provided at respective intersections between the plurality of data wiring lines and the plurality of scan wiring lines,
wherein each of the pixel circuits includes:
an electrooptical element provided between a first power source line that supplies a first power source potential and a second power source line that supplies a second power source potential;
a driving unit that controls a current flowing to the electrooptical element, the driving unit including a driving transistor provided between the first power source line and the second power source line and connected in series to the electrooptical element;
an input unit that supplies to the driving unit a voltage of the data signal supplied by a corresponding data wiring line in response to a corresponding scan wiring line being selected;
a first compensation unit causing the electrooptical element to be reverse biased between the second power source line and the reverse bias control line during the first prescribed period, the first compensation unit supplying to the driving unit a compensation signal based on a reverse direction current flowing through the electrooptical element that is reverse biased; and
a light emission control unit that controls a light emission timing of the electrooptical element such that current is prevented from flowing between the first power source line and the electrooptical element during a second prescribed period that includes the first prescribed period, and
wherein the driving unit determines a drive voltage for controlling the driving transistor in accordance with at least a voltage of the data signal and the compensation signal, the driving unit causing the electrooptical element to emit light in accordance with the determined drive voltage after the second prescribed period ends.

A second aspect of the present invention is the first aspect of the present invention,
wherein the compensation signal is at a first voltage based on the reverse direction current, and
wherein the driving unit determines the drive voltage based on at least a voltage of the data signal and the first voltage.

A third aspect of the present invention is the second aspect of the present invention,
wherein the driving unit includes a driving capacitance unit that is provided between a control terminal and a first conductive terminal of the driving transistor and that stores the drive voltage,
wherein the input unit supplies a voltage of the data signal to the driving capacitance unit, and wherein the first compensation unit supplies the first voltage to the driving capacitance unit during at least a portion of the first prescribed period.

A fourth aspect of the present invention is the third aspect of the present invention,
wherein the first compensation unit supplies the reverse direction current to the driving capacitance unit during the first prescribed period, and
wherein the input unit includes an input capacitance element and supplies a voltage of the data signal to the driving capacitance unit through the input capacitance element.

A fifth aspect of the present invention is the fourth aspect of the present invention,
wherein the driving capacitance unit includes a first driving capacitance element to which the reverse direction current is supplied during the first prescribed period, and
wherein the driving unit further includes a drive voltage application control unit that controls the application of the drive voltage to the driving transistor.

A sixth aspect of the present invention is the fifth aspect of the present invention, wherein the pixel circuits each further include a pre-processing unit that performs pre-processing on the drive voltage stored in the driving capacitance unit during a pre-processing period that is during the second prescribed period and before the first prescribed period.

A seventh aspect of the present invention is the sixth aspect of the present invention, wherein the pre-processing unit includes a first pre-processing unit that causes a short-circuit between both terminals of the first driving capacitance element during a first pre-processing period during the pre-processing period.

An eighth aspect of the present invention is the seventh aspect of the present invention,
wherein the driving capacitance unit further includes a second driving capacitance element provided between the first conductive terminal and a second conductive terminal of the driving transistor,
wherein the pre-processing unit further includes a second pre-processing unit provided between the control terminal and the second conductive terminal of the driving transistor, and
wherein at least the second pre-processing unit causes a short-circuit between the control terminal and the second conductive terminal of the driving transistor during a second pre-processing period during the pre-processing period and after the first pre-processing period.

A ninth aspect of the present invention is the third aspect of the present invention, wherein the first compensation unit supplies the first voltage to the driving capacitance unit by causing a compensation current to flow between the driving capacitance unit and the reverse bias control line, the compensation current being determined based on the reverse direction current, the first compensation unit receiving said reverse direction current during the first prescribed period.

A tenth aspect of the present invention is the ninth aspect of the present invention,
wherein the first compensation unit includes:
a first compensation current control unit that controls a value of the compensation current based on the reverse direction current; and
a reverse direction current supplying unit that supplies the reverse direction current to the first compensation current control unit.

An eleventh aspect of the present invention is the tenth aspect of the present invention, wherein the first compensation unit further includes a second compensation current control unit that controls a timing at which the compensation current flows, and wherein the first compensation current control unit includes:

a capacitance element for compensation current control that stores a second voltage based on the reverse direction current; and a transistor for compensation current control that is provided between the driving capacitance unit and the reverse bias control line and that allows through a compensation current based on the second voltage stored in said capacitance element for compensation current control.

A twelfth aspect of the present invention is the eleventh aspect of the present invention, wherein each of the pixel circuits further includes a first compensation initializing unit that causes a short-circuit between both terminals of the capacitance element for compensation current control before or after the first prescribed period.

A thirteenth aspect of the present invention is the tenth aspect of the present invention, wherein the first compensation current control unit includes:

a resistor through which the reverse direction current flows; and a transistor for compensation current control that is provided between the driving capacitance unit and the reverse bias control line and that allows through a compensation current based on a second voltage that occurs between terminals of the resistor A fourteenth aspect of the present invention is the ninth aspect of the present invention, wherein each of the pixel circuits further includes a second compensation unit that causes a short-circuit between the control terminal and the second conductive terminal of the driving transistor before the compensation current flows between the driving capacitance unit and the reverse bias control line during the first prescribed period.

A fifteenth aspect of the present invention is the first to fourteenth aspects of the present invention, wherein the reverse bias control line supplies the control potential during the second prescribed period, and wherein the light emission control unit is controlled by the reverse bias control line and blocks a current flowing between the first power source line and the electrooptical element when the control potential is supplied to the control line.

A sixteenth aspect of the present invention is a method of driving an active matrix display device that includes: a plurality of data wiring lines supplying data signals; a plurality of scan wiring lines that are each selectively driven; and a plurality of pixel circuits provided at respective intersections between the plurality of data wiring lines and the plurality of scan wiring lines, each of the pixel circuits including: an electrooptical element provided between a first power source line that supplies a first power source potential and a second power source line that supplies a second power source potential; and a driving unit that controls a current flowing to the electrooptical element, the driving unit including a driving transistor provided between the first power source line and the second power source line and connected in series with the electrooptical element, the method comprising:

supplying to the driving unit a voltage of the data signal supplied by a corresponding data wiring line in response to a corresponding scan wiring line being selected;

supplying to the driving unit a compensation signal based on a reverse direction current flowing to the electrooptical element between the second power source line and a reverse bias control line that supplies a control potential at least during a first prescribed period;

determining a drive voltage for controlling the driving transistor by at least a voltage of the data signal and the compensation signal;

controlling a light emission timing of the electrooptical element to block current flowing between the first power source line and the electrooptical element during a second prescribed period that includes the first prescribed period; and causing the electrooptical element to emit light in accordance with the determined drive voltage after the second prescribed period ends.

Effects of the Invention

According to the first aspect of the present invention, a compensation signal based on the reverse direction current flowing in the electrooptical element (refers to the organic EL element below in the description of the effects of the invention) during reverse bias time is supplied to the driving unit, and the drive voltage is determined based on at least the voltages of the compensation signal and the data signal. A forward direction current (drive current) based on this drive voltage is then supplied to the organic EL element. The reverse direction current becomes greater as deterioration over time of the organic EL element progresses. Thus, the compensation signal also attains a value based on the degree of progression over time of deterioration of the organic EL element. As a result, the drive current also attains a value based on the degree of progression over time of the organic EL element. As a result, luminance compensation occurs based on the progression over time of deterioration of the organic EL element. Furthermore, this luminance compensation occurs during the second prescribed period during which the organic EL element does not emit light. Therefore, prior to the luminance compensation being completed, the organic EL element does not emit light, and therefore, a decrease in luminance in emitted light due to deterioration over time of the organic EL element can be mitigated to a greater degree than in conventional devices.

According to the second aspect of the present invention, the first voltage based on the reverse direction current is supplied to the driving unit, and the drive voltage is determined based on at least the first voltage and the voltage of the data signal. A forward direction current (drive current) based on this drive voltage is then supplied to the organic EL element. The reverse direction current becomes greater as deterioration over time of the organic EL element progresses. Thus, the first voltage based on the reverse direction current becomes greater as deterioration over time of the organic EL element progresses. As a result, the drive current also becomes larger as deterioration of the organic EL element progresses over time. As a result, effects similar to those of the first aspect of the present invention can be attained.

According to the third aspect of the present invention, it is possible to determine the drive voltage using the first voltage supplied to the driving capacitance element.

According to the fourth aspect of the present invention, by supplying the voltage of the data signal to the driving capacitance element through the input capacitance element when supplying the reverse direction current to the driving capacitance element, it is possible to determine the drive voltage based on at least the first voltage and the voltage of the data signal. In this manner, it is possible to perform luminance compensation based on the degree of progression of deterioration of the organic EL element.

According to the fifth aspect of the present invention, by supplying the reverse direction current to the first driving capacitance element to control the application of the drive voltage using the drive voltage application control unit, luminance compensation based on the degree of progression of deterioration of the organic EL element can be performed.

According to the sixth aspect of the present invention, it is possible to perform pre-processing on the drive voltage. Pre-processing includes initialization or threshold voltage compensation.

According to the seventh aspect of the present invention, by the first pre-processing unit, both terminals of the first driving capacitance element can be electrically connected to each other during the first pre-processing period. Thus, the voltage held in the first driving capacitance element is initialized to 0V. As a result, it is possible to reliably write the first voltage to the first driving capacitance element.

According to the eighth aspect of the present invention, the control terminal and the second conductive terminal of the driving transistor can be electrically connected to each other (form a diode connection) during the second pre-processing period using at least the second pre-processing unit. Thus, during the second pre-processing period, the threshold voltage of the driving transistor is written to the second driving capacitance element. As a result, it is possible to compensation for variation in the threshold voltage of the driving transistor using the threshold voltage.

According to the ninth aspect of the present invention, by causing a compensation current determined based on the reverse direction current to flow between the driving capacitance element and the reverse bias control line, it is possible to change the voltage held in the driving capacitance element based on the compensation current. This means that the voltage held in the driving capacitance element changes based on the reverse direction current. In other words, the first voltage based on the reverse direction current is supplied to the driving capacitance element. In this manner, it is possible to perform luminance compensation based on the degree of progression of deterioration of the organic EL element.

According to the tenth aspect of the present invention, by using the first compensation current control unit and the reverse direction current supplying unit, effects similar to the ninth aspect of the present invention can be attained.

According to the eleventh aspect of the present invention, a second voltage based on the reverse direction current is stored in the capacitance element for controlling the compensation current and the transistor for controlling the compensation current is controlled based on the second voltage, and thus, it is possible to cause the compensation current determined based on the reverse direction current to flow.

According to the twelfth aspect of the present invention, both terminals of the capacitance element for controlling the compensation current are electrically connected to each other before or after the first prescribed period by the first compensation initializing unit. Thus, the voltage held in the capacitance element for controlling the compensation current is initialized to 0V. Therefore, it is possible to reliably write the second voltage based on the reverse direction current to the capacitance element for controlling the compensation current.

According to thirteenth aspect of the present invention, by controlling the transistor for controlling the compensation current using the second voltage formed between the terminals of the resistor when the reverse direction current is flowing, it is possible to cause the compensation current determined based on the reverse direction current to flow.

According to the fourteenth aspect of the present invention, the control terminal and the second conductive terminal of the driving transistor are electrically connected to each other prior to the compensation current flowing between the driving capacitance element and the reverse bias control line during the first prescribed period (to form a diode connection). Thus, the threshold voltage of the driving transistor is written to the driving capacitance element. As a result, it is possible to compensation for variation in the threshold voltage of the driving transistor using the threshold voltage.

According to the fifteenth aspect of the present invention, components in the first compensation unit and the light emission control unit connected to the reverse bias control line can share a reverse bias control line. Thus, the number of lines can be reduced.

According to the sixteenth aspect of the present invention, in the method of driving the display device, effects similar to the first aspect of the present invention can be attained.

BRIEF DESCRIPTION OF THE DRAWINGS

FIG. 31(A) shows a state in which the same pattern is displayed over a long period of time. FIG. 31(B) shows a state in which a signal for the same luminance is applied to all pixel circuits after the pattern was displayed over the long period of time.

DETAILED DESCRIPTION OF EMBODIMENTS

0. Basic Study

Figure 1:
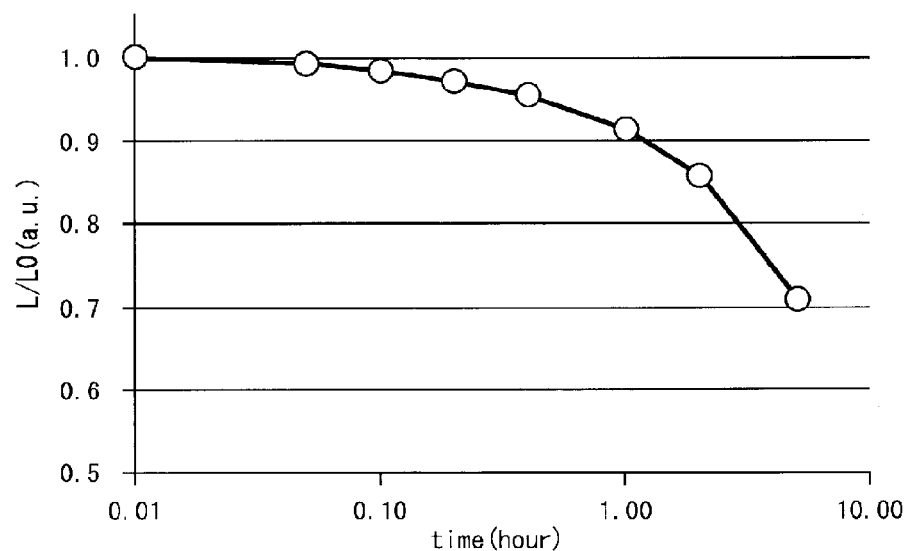
FIG. 1 shows luminance characteristics of an organic EL element in a basic study of the present invention.

Before describing embodiments of the present invention, a basic study conducted by inventors of the present invention in order to solve the above-mentioned problems will be described. The inventors of the present invention fed a fixed current of 15 mA to an 8 mm$^2$ organic EL element, and measured the luminance of the emitted light and the current during reverse bias (hereinafter referred to as "reverse bias current," and assigned the reference character "Ioledr") at respective elapsed times of 36 seconds, 3 minutes, 6 minutes, 12 minutes, 24 minutes, 1 hour, 2 hours, and 5 hours from start of fixed current feed. The reverse bias voltage was set at 2.8V.

FIG. 1 shows luminance characteristics of an organic EL element obtained in the above measurement. These luminance characteristics show a relation between a value obtained by dividing a luminance L at respective elapsed times by L0, which is the initial luminance of the organic EL element, and a logarithm of the elapsed time. As shown in FIG. 1, the more time elapses, or in other words, the more the deterioration over time of the organic EL element progresses, the more the luminance of light emitted by the organic EL element decreases.

Figure 2:
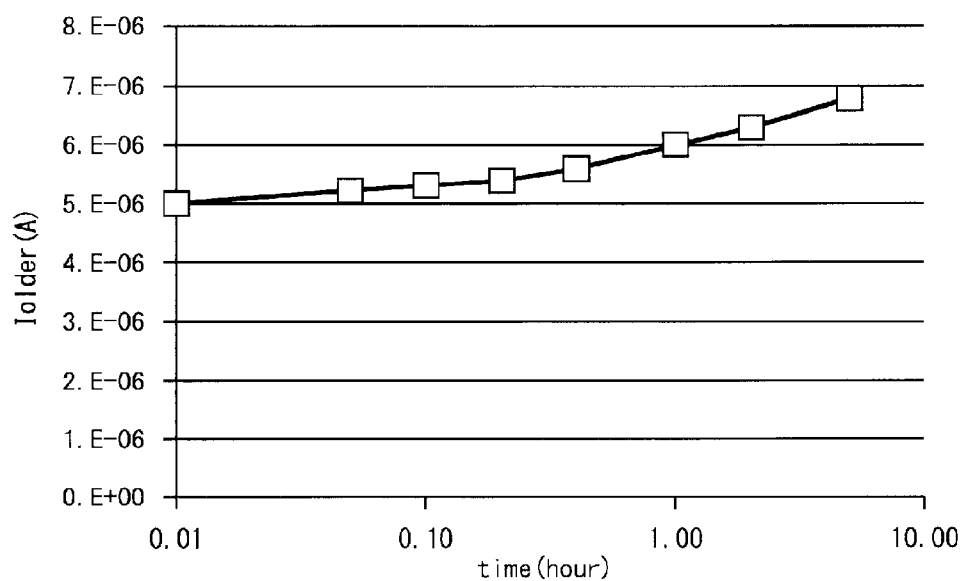
FIG. 2 shows reverse direction current characteristics of the organic EL element in the above-mentioned basic study.

FIG. 2 shows reverse direction current characteristics of the organic EL element obtained in the above measurement. The reverse direction current characteristics show a relation between the reverse direction current Ioledr flowing through the organic EL element and a logarithm of the elapsed time. As shown in FIG. 2, the more time has elapsed, or in other words, the more the deterioration over time of the organic EL element progresses, the greater the reverse direction current Ioledr is.

As seen in FIGS. 1 and 2, the reverse direction current Ioledr, which becomes greater the more the deterioration over time of the organic EL element progresses, can be used as luminance compensation for the organic EL element. Based on the basic study above, Embodiments 1 to 13 of the present invention made by inventors of the present invention will be described below with reference to the appended drawings.

The transistors included in the pixel circuits of the respective embodiments are field effect transistors, and typically thin film transistors (sometimes abbreviated as "TFTs" below). Examples of transistors included in the pixel circuits are oxide TFTs in which the channel layer is made of an oxide semiconductor, a low temperature polysilicon TFT in which the channel layer is made of a low temperature polysilicon, and an amorphous silicon TFT in which the channel layer is made of amorphous silicon. An example of an oxide TFT is an indium gallium zinc oxide TFT in which the channel layer is made of InGaZnO$_x$ (indium gallium zinc oxide), which is an oxide semiconductor having indium (I), gallium (Ga), zinc (Zn), and oxygen (O) as main components. Oxide TFTs such as indium gallium zinc oxide TFTs are particularly suited to being used as the n-channel type transistor included in the pixel circuit. However, the present invention does not exclude the use of p-channel type oxide TFTs. Also, similar effects can be attained for oxide semiconductors other than indium gallium zinc oxide if the channel layer is made of an oxide semiconductor including at least one of indium, gallium, zinc, copper (Cu), silicon (Si), tin (Sn), aluminum (Al), calcium (Ca), germanium (Ge), and lead (Pb), for example. Of the transistors included in the pixel circuits of the respective embodiments, a first conductive terminal of the transistor T2 to be described later corresponds to the source terminal and the second conductive terminal corresponds to the drain terminal.

The oxide semiconductor layer included in the oxide TFT will be described here. The oxide semiconductor layer is an In—Ga—Zn—O type semiconductor layer, for example. The oxide semiconductor layer includes an In—Ga—Zn—O type semiconductor, for example. The In—Ga—Zn—O type semiconductor is a ternary oxide of indium (In), gallium (Ga), and zinc (Z). There is no special limitation on the ratio (composition ratio) of In, Ga, and Zn, and the ratio may be In:Ga:Zn=2:2:1, In:Ga:Zn=1:1:1, In:Ga:Zn=1:1:2, or the like, for example.

TFTs having In—Ga—Zn—O type semiconductor layers have a high mobility (more than 20 times that of amorphous silicon TFTs) and a low leakage current (less than $\frac{1}{100}$ of amorphous silicon TFTs), and thus, are well suited to being used as driving TFTs and switching TFTs in the pixel circuits. The use of TFTs having In—Ga—Zn—O type semiconductor layers can greatly reduce power consumption in display devices.

In—Ga—Zn—O type semiconductors may be amorphous, or may be crystalline, with crystalline portions included. It is preferable that crystalline In—Ga—Zn—O type semiconductors have the c axis oriented generally perpendicularly to the layer surface. Such a crystalline structure for an In—Ga—Zn—O type semiconductor is disclosed in Japanese Patent Application Laid-Open Publication No. 2012-134475, for example. All contents disclosed in Japanese Patent Application Laid-Open Publication No. 2012-134475 are incorporated by reference herein.

Another oxide semiconductor may be included in the oxide semiconductor layer instead of the In—Ga—Zn—O type semiconductor. For example, the oxide semiconductor layer may include a Zn—O type semiconductor (ZnO), an In—Zn—O type semiconductor (IZO (registered trademark)), a Zn—Ti—O type semiconductor (ZTO), a Cd—Ge—O type semiconductor, a Cd—Pb—O type semiconductor, CdO (cadmium oxide), an Mg—Zn—O type semiconductor, an In—Sn—Zn—O type semiconductor ($In_2O_3$—$SnO_2$—ZnO), an In—Ga—Sn—O type semiconductor, or the like.

In the present specification, "a state in which component A is connected to component B" refers not only to a state in which component A is directly and physically connected to component B, but also a case in which component A is connected to component B through another component. Also, "a state in which component C is provided between component A and component B" refers not only to a state in which the component C is directly and physically connected to component A and component B, but also a state in which component C is connected to component A and component B through other components. However, such other components are limited to those that do not contradict with the concept of the present invention.

1. Embodiment 1

<1.1 Overall Configuration>

Figure 3:
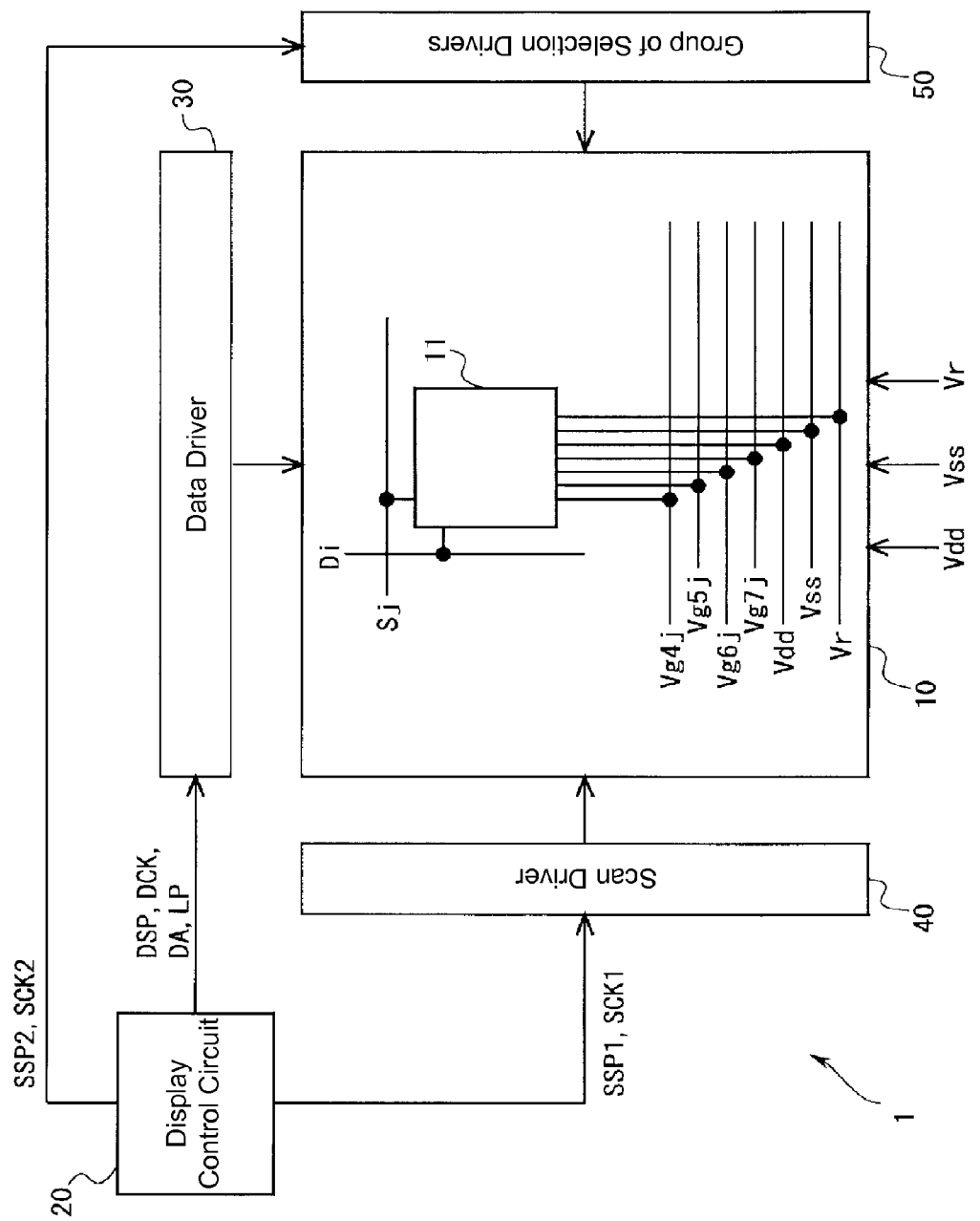
FIG. 3 is a block diagram showing an overall configuration of a display device of Embodiment 1 of the present invention.

FIG. 3 is a block diagram showing an overall configuration of a display device 1 of Embodiment 1 of the present invention. The display device 1 is an organic EL display device, and, as shown in FIG. 3, includes a display unit 10, a display control circuit 20, a data driver 30, a scan driver 40, and a group of selection drivers 50. The scan driver 40 and the group of selection drivers 50 are integrally formed with the display unit 10, for example. However, the present invention is not limited thereto.

The display unit 10 is provided with an m number of data wiring lines Di (i=1 to m) and an n number of scan wiring lines Sj (j=1 to n) perpendicular thereto. The display unit 10 is also provided with an m×n number of pixel circuits 11 corresponding to the intersections of the m number of data wiring lines Di and the n number of scan wiring lines Sj. In FIG. 3, only one pixel circuit 11 is shown for ease of description. The display unit 10 is also provided with an n number of control lines Vg4j, an n number of control lines Vg5j, an n number of control lines Vg6j, and an n number of control lines Vg7j along the n number of scan wiring lines Sj. The pixel circuit 11 has connected thereto the control lines Vg4j, Vg5j, Vg6j, and Vg7j provided along the corresponding scan wiring line Sj. The m number of data wiring lines Di are connected to the data driver 30 and the n number of scan wiring lines Sj are connected to the scan driver 40, and the n number of control lines Vg4j, the n number of control lines Vg5j, the n number of control lines Vg6j, and the n number of control lines Vg7j are connected to the group of selection drivers 50.

The display unit 10 is also provided with a power source line that supplies a high level power source potential Vdd (hereinafter referred to as the "high level power source line;" assigned the same reference character Vdd as the high level power source potential), a power source line that supplies a low level power source potential Vss (hereinafter referred to as the "low level power source line;" assigned the same reference character Vss as the low level power source potential), and a power source line that supplies a reverse bias power source potential Vr (hereinafter referred to as the "reverse bias power source line;" assigned the same reference character Vr as the reverse bias power source potential). The high level power source potential Vdd, the low level power source potential Vss, and the reverse bias power source potential Vr have a size relation indicated in formula (2) below:

$$Vdd > Vss > Vr \quad (2)$$

The high level power source potential Vdd, the low level power source potential Vss, and the reverse bias power source potential Vr are supplied from a power source circuit that is not shown. The high level power source line Vdd, the low level power source line Vss, and the reverse bias power source line Vr are respectively connected to each pixel circuit 11 shared therebetween. In the present embodiment, the high level power source line Vdd is the first power source line, the low level power source line Vss is the second power source line, and the reverse bias power source line Vr is the reverse bias control line.

The display control circuit 20 outputs respective control signals to the data driver 30, the scan driver 40, and the group of selection drivers 50. More specifically, the display control circuit 20 outputs a data start pulse DSP, a data clock signal DCK, display data DA, and a latch pulse LP to the data driver 30. The display control circuit 20 outputs a scan start pulse SSP1 and a scan clock signal SCK1 to the scan driver 40. The display control circuit 20 outputs a selection start pulse SSP2 and a selection clock signal SCK2 to the group of selection drivers 50. The selection start pulse SSP2 in reality includes a plurality of start pulses. Similarly, the selection clock signal SCK2 includes a plurality of clock signals.

The data driver 30 includes an m-bit shift register, a sampling circuit, a latch circuit, an m number of D/A converters, and the like, which are not shown. The shift register has an m number of bistable circuits connected to each other in the vertical direction, and transmits the data start pulse DSP supplied to the shift register in the initial stage in synchronization with the data clock signal DCK, and outputs a sampling pulse from each stage. Display data DA is fed to the sampling circuit in synchronization with the output of the sampling pulse. The sampling circuit stores the display data DA according to the sampling pulse. When one row of display data DA is stored in the sampling circuit, the display control circuit 20 outputs a latch pulse LP to the latch circuit. When the latch circuit receives the latch pulse LP, it stores the display data stored in the sampling circuit. The D/A converters are provided for each of the m number of data wiring lines Di, convert the display data DA stored in the latch circuit to a data signal that is an analog signal, and feed the obtained data signal to the m number of data wiring lines Di.

The scan driver 40 drives an n number of scan wiring lines Sj. The scan driver 40 includes a shift register, a buffer, and the like, which are not shown. The shift register sequentially transmits a scan start pulse SSP1 in synchronization with the scan clock signal SCK1. The scan signal outputted from respective steps of the shift register is fed to the corresponding scan wiring line through the buffer. As a result of an active scan signal (low level in the present embodiment), an m number of pixel circuits 11 connected to the scan wiring line Sj are simultaneously selected.

The group of selection drivers 50 drive an n number of control lines Vg4j, an n number of control lines Vg5j, an n number of control lines Vg6j, and an n number of control lines Vg7j. The group of selection drivers 50 are constituted of a plurality of selection drivers, and each selection driver controls one or more types of control lines. Each selection driver sequentially transmits a start pulse included in the selection start pulse SSP2 in synchronization with the timing of the selection clock signal SCK2. The selection signal outputted from respective steps of the shift register is fed to the corresponding control line through the buffer.

<1.2 Configuration of Pixel Circuit>

Figure 4:
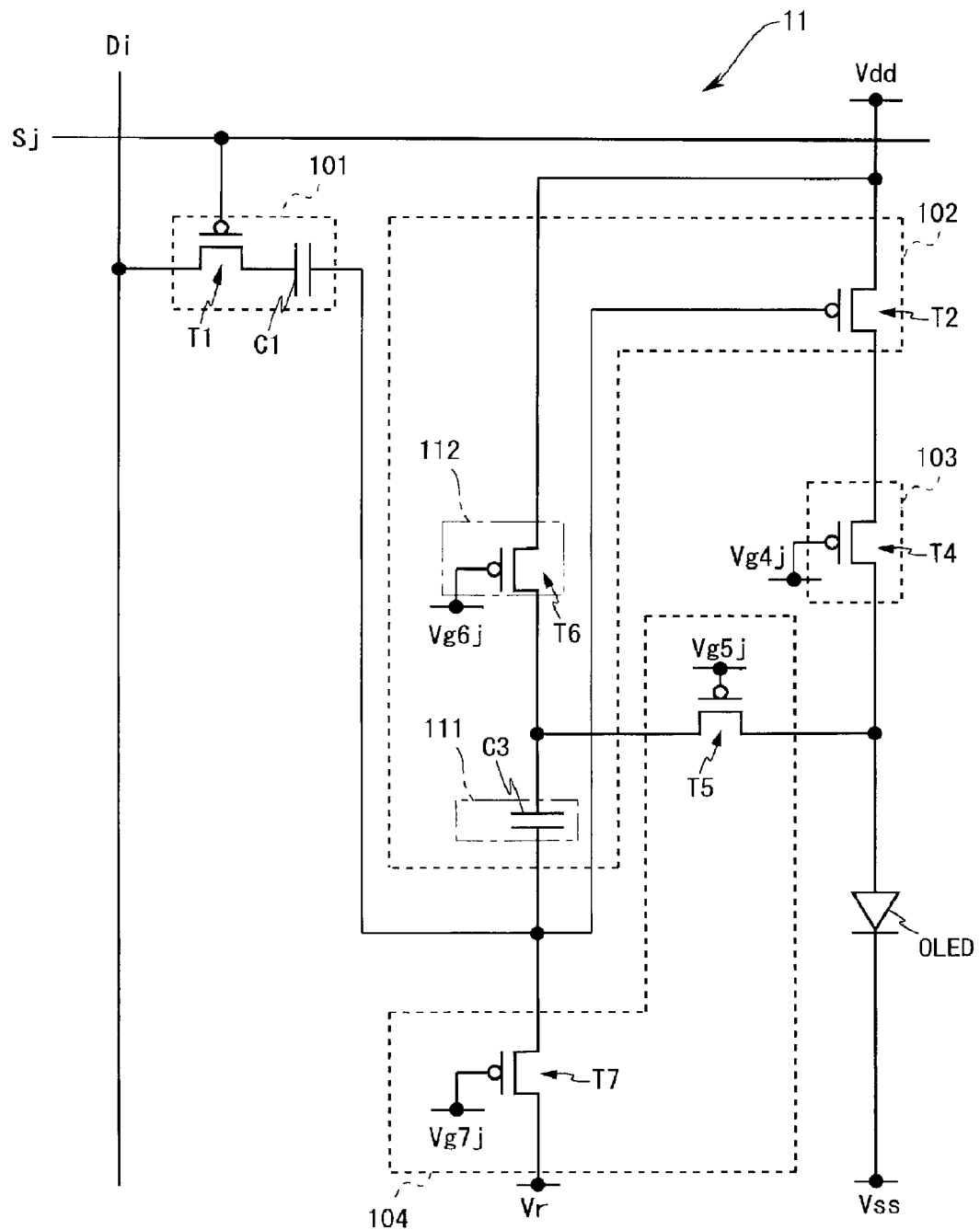
FIG. 4 is a circuit diagram showing a configuration of a pixel circuit of Embodiment 1.

FIG. 4 is a circuit diagram showing a configuration of a pixel circuit 11 of the present embodiment. As shown in FIG. 4, the pixel circuit 11 includes one organic EL element OLED, an input unit 101, a driving unit 102, a light emission control unit 103, and a reverse direction current compensation unit 104 as a first compensation unit. The input unit 101 includes one transistor T1 and one capacitor C1. The driving unit 102 includes one transistor T2, a driving capacitance element 111, and a drive voltage application control unit 112. The driving capacitance element 111 includes one capacitor C3. The drive voltage application control unit 112 includes one transistor T6. The light emission control unit 103 includes one transistor T4. The reverse direction current compensation unit 104 includes two transistors T5 and T7. The transistors T1, T2, and T4 to T7 are of a p-channel type.

The transistor T1 functions as an input transistor. The transistor T2 functions as a driving transistor. The transistor T4 functions as a light emission control transistor. The transistor T5 functions as a first transistor for supplying a reverse direction current. The transistor T6 functions as a transistor for controlling the application of a drive voltage. The transistor T7 functions as a second transistor for supplying a reverse direction current. The capacitor C1 functions as an input capacitance element. The capacitor C3 functions as a first driving capacitance element.

In response to the selection of the corresponding scan wiring line Sj, the input unit 101 feeds to the driving unit 102 a data voltage based on the data wiring line fed by the corresponding data wiring line Di. The gate terminal of the transistor T1 is connected to the scan wiring line Sj and a first conductive terminal of the transistor T1 is connected to the data wiring line Di. A first terminal of the capacitor C1 is connected to a second conductive terminal of the transistor T1.

The driving unit 102 controls a forward direction current (drive current) flowing through the organic EL element OLED. The driving capacitance element 111 stores a drive voltage to be applied between the gate terminal and the first conductive terminal of the transistor T2. The drive voltage application control unit 112 controls the application of the drive voltage to the transistor T2. The gate terminal of the transistor T2 is connected to a second terminal of the capacitor C3, and the first conductive terminal of the transistor T2 is connected to the high level power source line Vdd. The gate terminal of the transistor T6 is connected to a control line Vg6j, and the transistor T6 is provided between the first terminal of the capacitor C3 and the first conductive terminal of the transistor T2.

The light emission control unit 103 controls the timing at which the organic EL element OLED emits light, and, during a non-light emitting period LSP occurring later, stops the current (forward direction current) flowing between the high level power source line Vdd (first power source line) and the organic EL element OLED. In other words, during the non-light emitting period LSP, the organic EL element OLED is electrically disconnected from the transistor T2. The gate terminal of the transistor T4 is connected to the control line Vg4j, and the transistor T4 is provided between the second conductive terminal of the transistor T2 and the positive terminal of the organic EL element OLED.

The reverse direction current compensation unit 104 supplies to the capacitor C3 a compensation signal based on the reverse direction current Ioledr flowing through the organic EL element OLED. More specifically, the reverse direction current compensation unit 104 supplies to the capacitor C3 a voltage based on the reverse direction current Ioledr flowing through the organic EL element OLED. The gate terminal of the transistor T5 is connected to the control line Vg5j, and the transistor T5 is provided between the positive terminal of the organic EL element OLED and the first terminal of the capacitor C3. The gate terminal of the transistor T7 is connected to a control line Vg7j, and the transistor T7 is provided between the second terminal of the capacitor C3 and the reverse bias power source line Vr.

<1.3 Operation>

Figure 5:
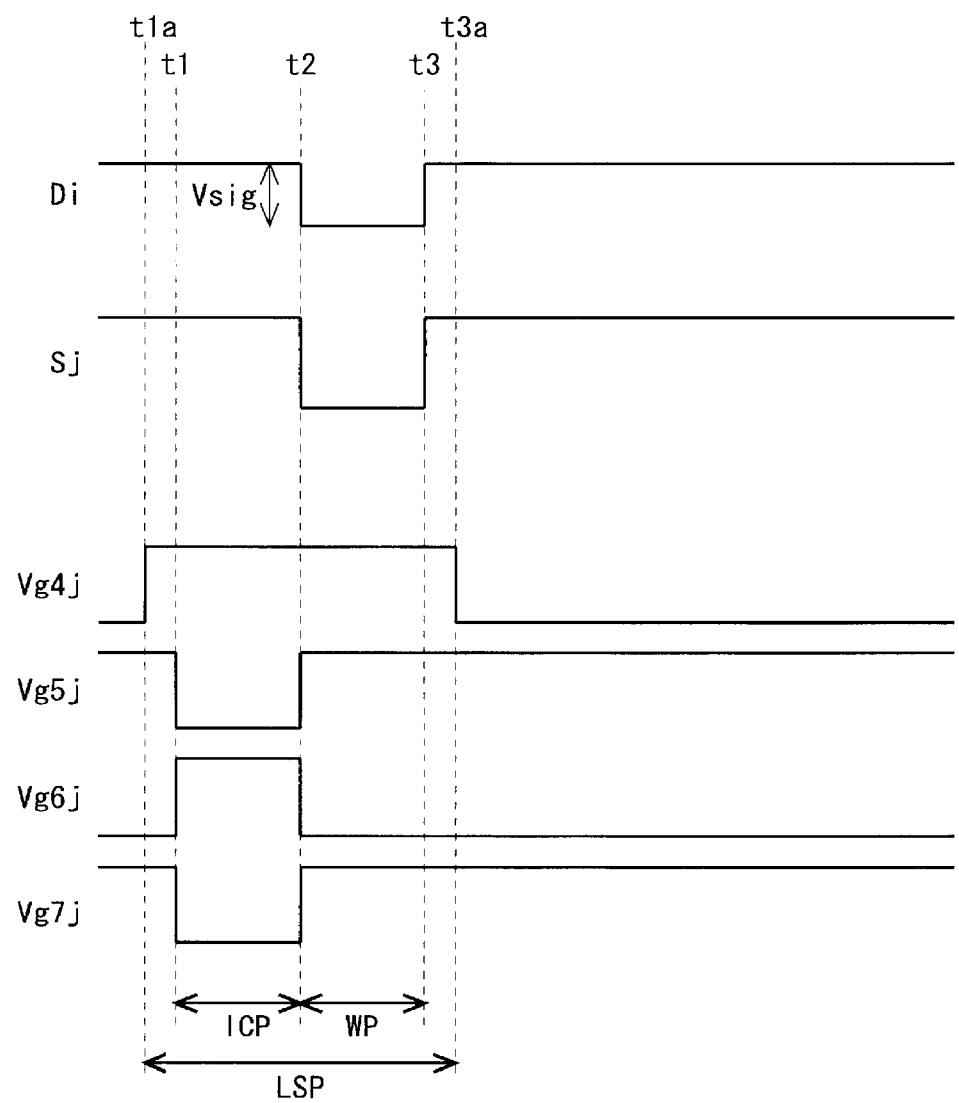
FIG. 5 is a timing chart showing a method of driving pixel circuits in Embodiment 1.

FIG. 5 is a timing chart showing a method of driving the pixel circuits 11 in the present embodiment. In the present embodiment, a time t1a to t3a is a non-light emitting period LSP. The time t1 to t2 is a reverse direction compensation period ICP, and the time t2 to t3 is a writing period WP. The non-light emitting period LSP corresponds to the second prescribed period and the reverse direction compensation period ICP corresponds to the first prescribed period. The non-light emitting period LSP may start from the time t1. As shown in FIG. 5, the same amount of potential change occurs in the control lines Vg5j and Vg7j, and thus, these may be consolidated to one control line (this similarly applies to Embodiments 2 and 3).

At time t1a, the potential of the control line Vg4j changes from a low level to a high level. Thus, the transistor T4 turns OFF, and the second conductive terminal of the transistor T2 is electrically separated from the positive terminal of the organic EL element OLED. Thus, the organic EL element OLED stops emitting light.

At the time t1, the potential of the control line Vg6j changes from a low level to a high level, and the transistor T6 turns OFF. As a result, the first conductive terminal of the transistor T2 is electrically disconnected from the first terminal of the capacitor C3. Also, at the time t1, the potential of the control lines Vg5j and Vg7j changes from a high level to a low level, and thus, the transistors T5 and T7 turn ON. Therefore, the organic EL element OLED becomes reverse biased due to the low level power source potential Vss and the reverse bias power source potential Vr. As a result, the reverse direction current Ioledr flowing through the organic EL element OLED is fed to the capacitor C3. The reverse direction current Ioledr becomes a value based on the progression of deterioration of the organic EL element OLED as shown in the basic study. In other words, a voltage determined by the reverse direction current Ioledr based on the progression of deterioration of the organic EL element OLED (hereinafter referred to as the "reverse direction voltage" and assigned the reference character Voledr) is written to the capacitor C3. The reverse direction current Ioledr becomes greater as deterioration of the organic EL element progresses, and thus, the reverse direction voltage Voledr written to the capacitor C3 also becomes greater as deterioration of the organic EL element progresses. In this manner, in the present embodiment, the reverse direction voltage Voledr is fed to the driving unit 102 as the voltage based on the reverse direction current Ioledr. In the present embodiment and in Embodiments 2 to 4 and 9 to 11, the reverse direction voltage Voledr corresponds to the first voltage based on the reverse direction current. Also, in the present embodiment and in Embodiments 2 to 4 and 9 to 11, the supplying of the reverse direction voltage Voledr by the reverse direction current compensation unit 104 to the driving unit 102 is the same as the reverse direction current compensation unit 104 supplying a compensation signal based on the reverse direction current Ioledr to the driving unit 102.

At the time t2, the potential of the control lines Vg5j and Vg7j changes from a low level to a high level, and the transistors T5 and T7 turn OFF. Thus, reverse biasing of the organic EL element OLED ends. Also, at the time t2, the potential of the control line Vg6j changes from a high level to a low level, and thus, the transistor T6 turns ON. Thus, the capacitor C3 electrically connects the gate terminal and the first conductive terminal of the transistor T2. Also, at the time t2, the potential of the scan wiring line Sj changes from a high level to a low level, and thus, the transistor T1 turns ON.

Therefore, the second terminal (gate potential of the transistor T2) of the capacitor C3 is boosted through the capacitor C1, and thus, "Vsig+Voledr" is written to the capacitor C3. Here, Vsig is the data signal voltage (hereinafter the "data voltage"). The data voltage Vsig is a negative voltage in the present embodiment and in Embodiments 2 to 9 and 13, and a positive voltage in Embodiments 10 to 12. It is preferable that the capacitance value of the capacitor C1 be sufficiently larger than the capacitance value of the capacitor C3. In the present embodiment, such boosting results in the data voltage Vsig being supplied to the driving unit 102.

Also, at the time t3, the potential of the scan wiring line Sj changes from a low level to a high level, and thus, the transistor T1 turns OFF. Therefore, the supplying of the data voltage Vsig to the driving unit 102 is stopped.

At the time t3a, the potential of the control line Vg4j changes from a high level to a low level, and thus, the transistor T4 turns ON. Therefore, a drive current I1 determined by formula (3) below is fed to the organic EL element OLED, and the organic EL element OLED emits light based on the value of the drive current I1.

$$I1=(\beta 1/2) \cdot (Vgs-VthT2)^2 \quad (3)$$

Here, β1 represents a constant, Vgs represents a source-gate voltage (drive voltage of the transistor T2, and VthT2 represents a threshold voltage of the transistor T2. Starting from the time t3a, the first and second conductive terminals of the transistor T2 respectively function as the source terminal and the drain terminal. "Vsig+Voledr" is stored in the capacitor C3 as described above; in other words, the drive voltage in the driving unit 102 is determined by the data voltage Vsig and the reverse direction voltage Voledr, and thus, formula (3) is replaced by formula (4) below.

$$I1=(\beta 1/2) \cdot (Vsig+Voledr-VthT2)^2 \quad (4)$$

In this manner, the drive current I1 is determined by the drive voltage. The reverse direction voltage Voledr becomes larger as deterioration over time of the organic EL element OLED progresses, and thus, the drive current I1 shown in formula (4) also becomes larger as deterioration over time of the organic EL element OLED progresses. In the present embodiment and in respective embodiments below, the "reverse direction voltage Voledr becoming greater" refers to the absolute value of the reverse direction voltage Voledr becoming greater.

<1.4 Effects>

According to the present embodiment, the data voltage Vsig and the reverse direction current Ioledr flowing through the organic EL element OLED during reverse bias time are fed to the driving capacitance element 111, and the drive voltage is determined by the data voltage Vsig and the voltage (compensation signal) based on the reverse direction current Ioledr. More specifically, the reverse direction voltage Voledr is written to the capacitor C3 (driving capacitance element 111) connected to the control terminal and the first conductive terminal of the transistor T2. Then, as a result of the sum of the data voltage Vsig and the reverse direction voltage Voledr being written to the capacitor C3 through the capacitor C1 due to boosting, the drive voltage is determined as the sum of the data voltage Vsig and the reverse direction voltage Voledr. Then, the organic EL element OLED emits light according to the drive current I1, which is proportional to a value obtained by the difference between the drive voltage and the threshold voltage of the transistor T2 raised to the second power. The reverse direction voltage Voledr becomes larger as deterioration over time of the organic EL element OLED progresses, and thus, the drive current I1 also becomes larger as deterioration over time of the organic EL element OLED progresses. As a result, luminance compensation occurs based on the progression over time of deterioration of the organic EL element OLED. Furthermore, this luminance compensation occurs during the non-light emitting period LSP during which the organic EL element does not emit light. Therefore, prior to the luminance compensation being completed, the organic EL element OLED does not emit light, and thus, a decrease in luminance in emitted light due to deterioration over time of the organic EL element can be mitigated to a greater degree than in conventional devices.

2. Embodiment 2

<2.1 Configuration of Pixel Circuit>

Figure 6:
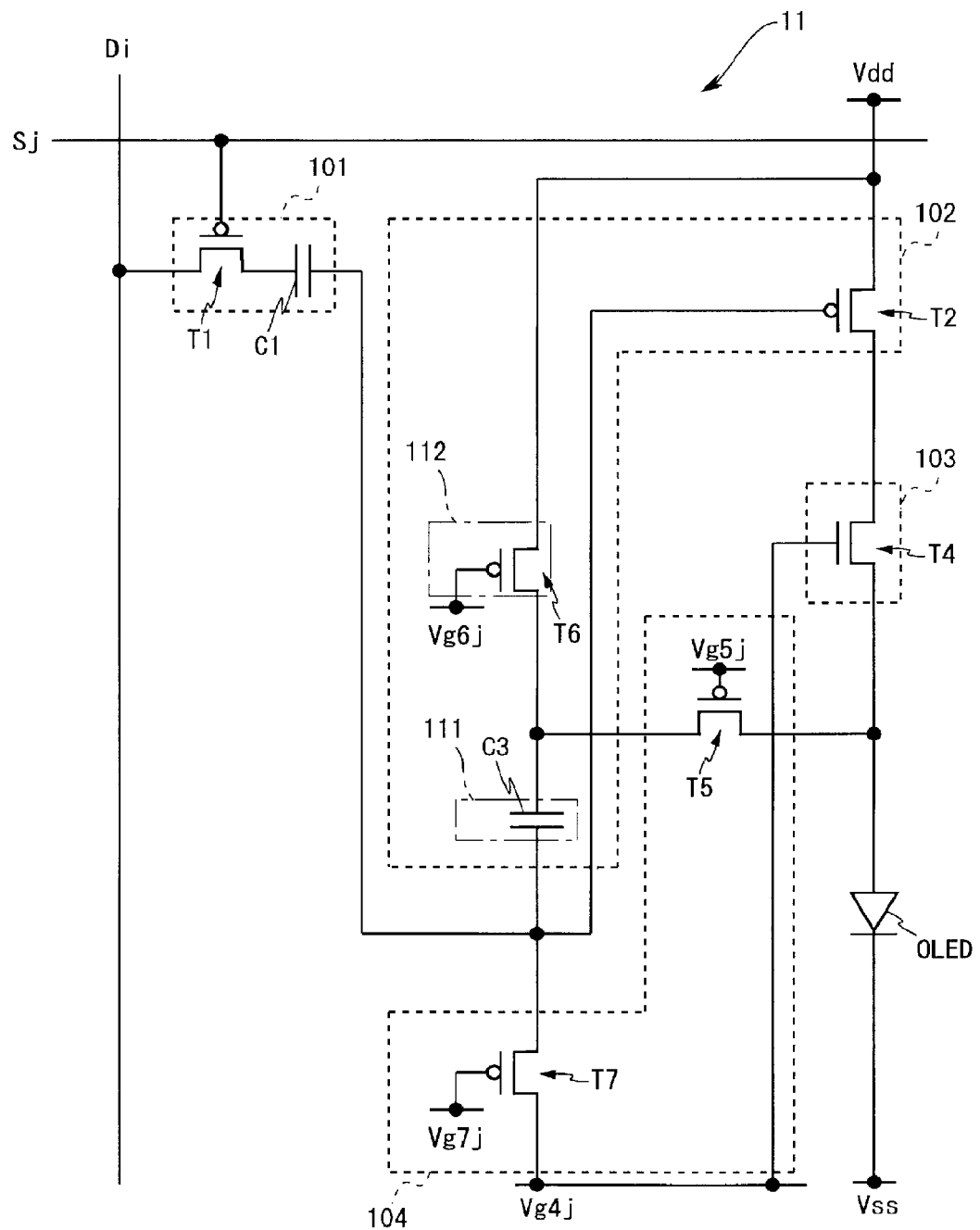
FIG. 6 is a circuit diagram showing a configuration of a pixel circuit of Embodiment 2 of the present invention.

FIG. 6 is a circuit diagram showing a configuration of a pixel circuit 11 of Embodiment 2 of the present invention. Components of the present embodiment that are the same as those of Embodiment 1 are assigned the same reference characters with descriptions thereof being omitted as appropriate. As shown in FIG. 6, in the present embodiment, the transistor T4 is of an n-channel type. In Embodiment 1, a conductive terminal (first conductive terminal) of the transistor T7, which is connected to the reverse bias power source line Vr, is connected to the control line Vg4j along with the gate terminal of the transistor T4. In the present embodiment, the control line Vg4j is the reverse bias control line. Furthermore, in the present embodiment, a reverse bias power source line Vr is not provided. The connective relations of other components within the pixel circuit 11 and between components are similar to those of Embodiment 1, and thus, descriptions thereof are omitted.

<2.2 Operation>

Figure 7:
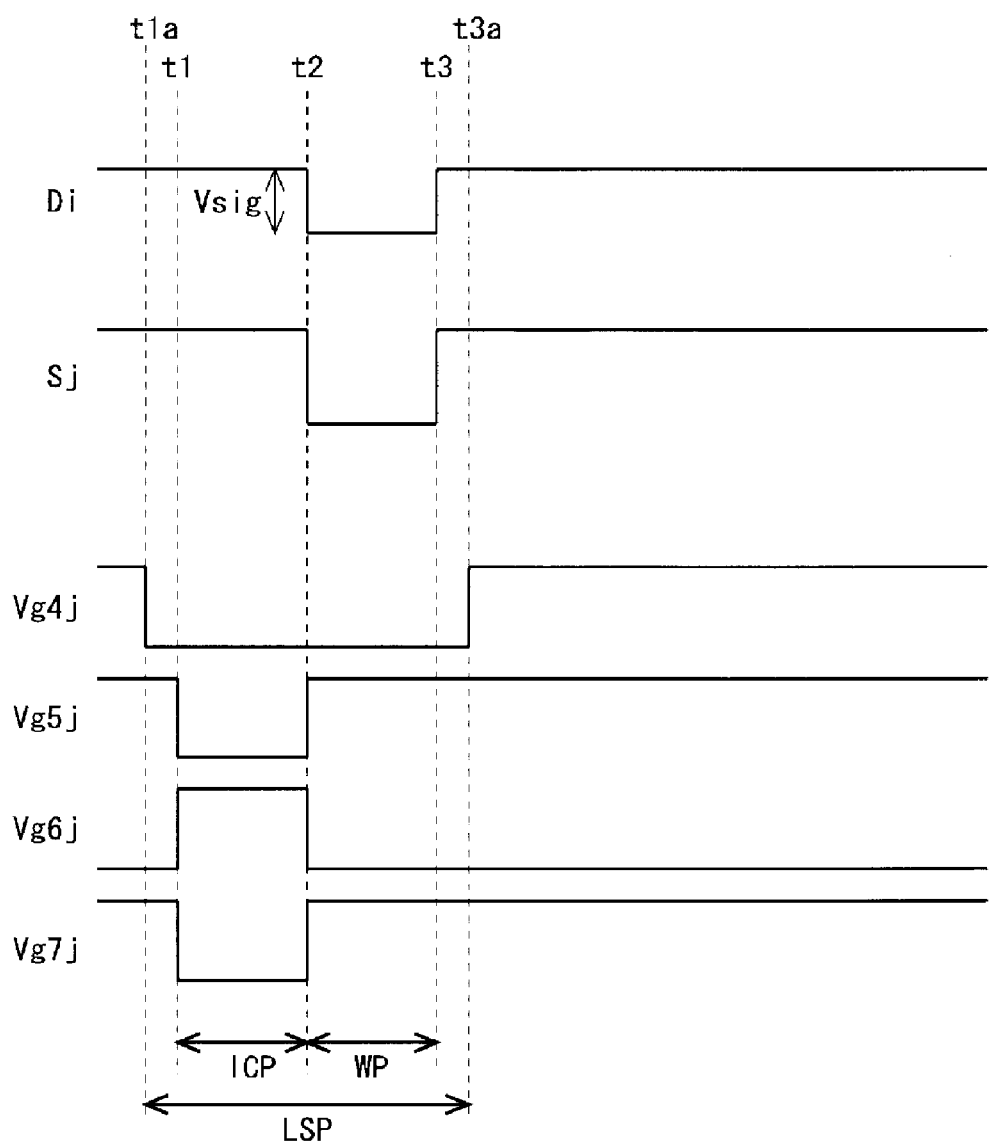
FIG. 7 is a timing chart showing a method of driving pixel circuits in Embodiment 2.

FIG. 7 is a timing chart showing a method of driving the pixel circuits 11 in the present embodiment. As shown in FIG. 7, the potential of the control line Vg4j of the present embodiment is inversed compared to that of Embodiment 1. However, the low level potential of the control line Vg4j of the present embodiment is the reverse bias power source potential Vr. In other words, during the non-light emitting period LSP, the reverse bias power source potential Vr is fed to the control line Vg4j.

At time t1a, the potential of the control line Vg4j changes from the high level to the reverse bias power source potential Vr. Thus, the transistor T4 turns OFF, and the second conductive terminal of the transistor T2 is electrically separated from the positive terminal of the organic EL element OLED. Thus, the organic EL element OLED stops emitting light. During the non-light emitting period LSP, the reverse bias power source potential Vr is fed to the control line Vg4j, and thus, during the non-light emitting period LSP, an operation similar to that of Embodiment 1 occurs.

At the time t3a, the potential of the control line Vg4j changes from the reverse bias power source potential Vr to a high level, and thus, the transistor T4 turns ON. Therefore, the organic EL element OLED emits light according to the drive current I1 shown in the formula (4) above in a manner similar to that of Embodiment 1.

<2.3 Effects>

According to the present embodiment, the transistor T4 is of an n-channel type, and by sharing the control line Vg4j between the gate terminal of the transistor T4 and the first conductive terminal of the transistor T7, the reverse bias power source line Vr of Embodiment 1 can be omitted.

3. Embodiment 3

<3.1 Configuration of Pixel Circuit>

Figure 8:
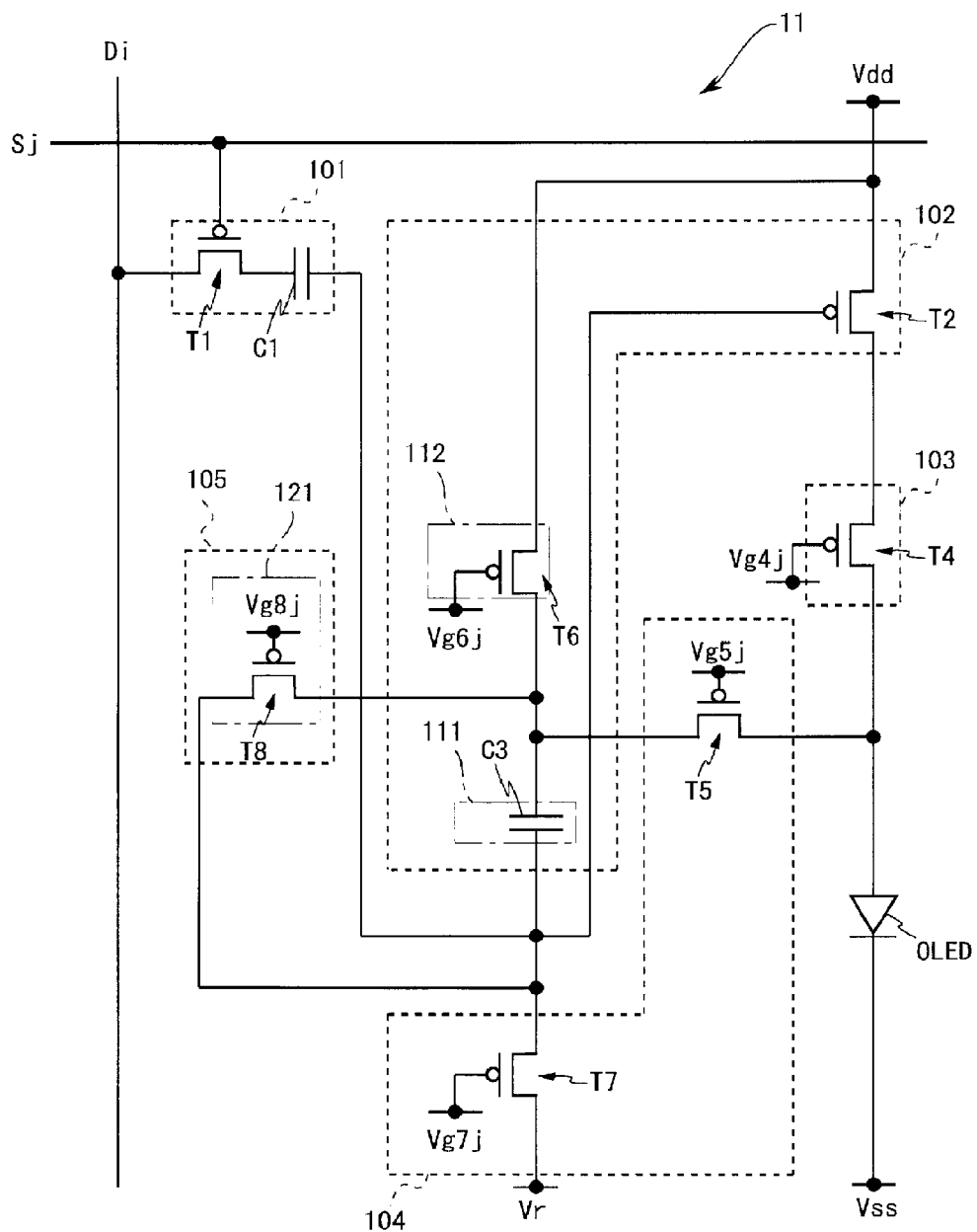
FIG. 8 is a circuit diagram showing a configuration of a pixel circuit of Embodiment 3 of the present invention.

FIG. 8 is a circuit diagram showing a configuration of a pixel circuit 11 of Embodiment 3 of the present invention. Components of the present embodiment that are the same as those of Embodiment 1 are assigned the same reference characters with descriptions thereof being omitted as appropriate. As shown in FIG. 8, the pixel circuit 11 of the present embodiment has the addition of a pre-processing unit 105 to the pixel circuit 11 of Embodiment 1. Also, in the display unit 10, an n number of control lines Vg8j are provided along each of the n number of scan wiring lines Sj. The n number of control lines Vg8j are connected to the group of selection drivers 50.

The pre-processing unit 105 performs pre-processing of the drive voltage stored in the driving capacitance element 111 during a pre-processing period PP during the non-light emitting period LSP and prior to the reverse direction compensation period ICP. The pre-processing unit 105 includes an initializing unit 121. The initializing unit 121 corresponds to the first pre-processing unit.

The initializing unit 121 includes one transistor T8. The transistor T8 is of a p-channel type. The transistor T8 functions as a first pre-processing transistor. The initializing unit 121 causes a short-circuit between the first terminal and the second terminal of the capacitor C3 during an initializing period IP to be described below during the pre-processing period PP. The gate terminal of the transistor T8 is connected to a control line Vg8j, and the transistor T8 is provided between the first terminal and the second terminal of the capacitor C3. The connective relations of other components within the pixel circuit 11 and between components are similar to those of Embodiment 1 and thus, descriptions thereof are omitted.

<3.2 Operation>

Figure 9:
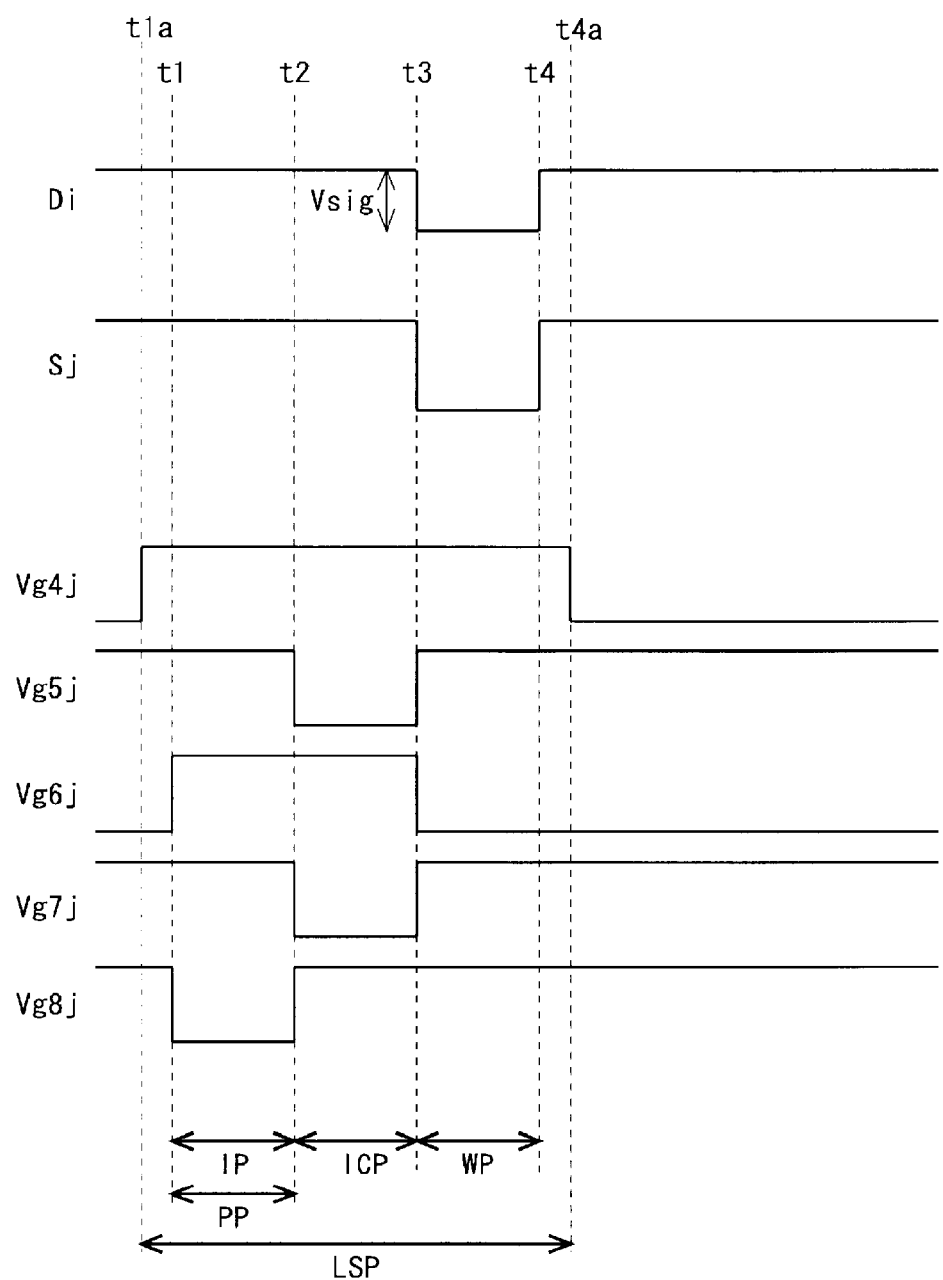
FIG. 9 is a timing chart showing a method of driving pixel circuits in Embodiment 3.

FIG. 9 is a timing chart showing a method of driving the pixel circuits 11 in the present embodiment. In the present embodiment, a time t1 a to t4a is a non-light emitting period LSP. The time t1 to t2 is a pre-processing period PP, the time t2 to t3 is a reverse direction compensation period ICP, and the time t3 to t4 is a writing period WP. The pre-processing period PP includes an initializing period IP. More specifically, the initializing period IP coincides with the pre-processing period PP. The initializing period IP corresponds to the first pre-processing period. The operations during the times t1a and t4a, the reverse direction compensation period ICP, and the writing period WP in the present embodiment are similar to those of Embodiment 1, and thus, descriptions thereof are omitted.

At the time t1, the potential of the control line Vg6j changes from a low level to a high level, and the transistor T6 turns OFF. As a result, the first conductive terminal of the transistor T2 is electrically disconnected from the first terminal of the capacitor C3. Also, at the time t1, the potential of the control line Vg8j changes from a high level to a low level, and thus, the transistor T8 turns ON. Thus, short-circuiting occurs between the first terminal and the second terminal of the capacitor C3, and the electric charge stored in the capacitor C3 is erased (the voltage stored therein is initialized to 0V).

At the time t2, the potential of the control line Vg8j changes from a low level to a high level, and the transistor T8 turns OFF. Thus, the initialization of the voltage stored in the capacitor C3 is completed.

<3.3 Effects>

According to the present embodiment, the transistor T8, which is ON during the initializing period IP, is provided between the first terminal and the second terminal of the capacitor C3, and thus, during the initializing period IP, the first terminal and the second terminal of the capacitor C3 are electrically connected to each other. Thus, the voltage stored in the capacitor C3 is initialized to 0V. As a result, during the reverse direction compensation period ICP, it is possible to reliably write to the capacitor C3 the reverse direction voltage Voledr based on the reverse direction current Ioledr.

4. Embodiment 4

<4.1 Configuration of Pixel Circuit>

Figure 10:
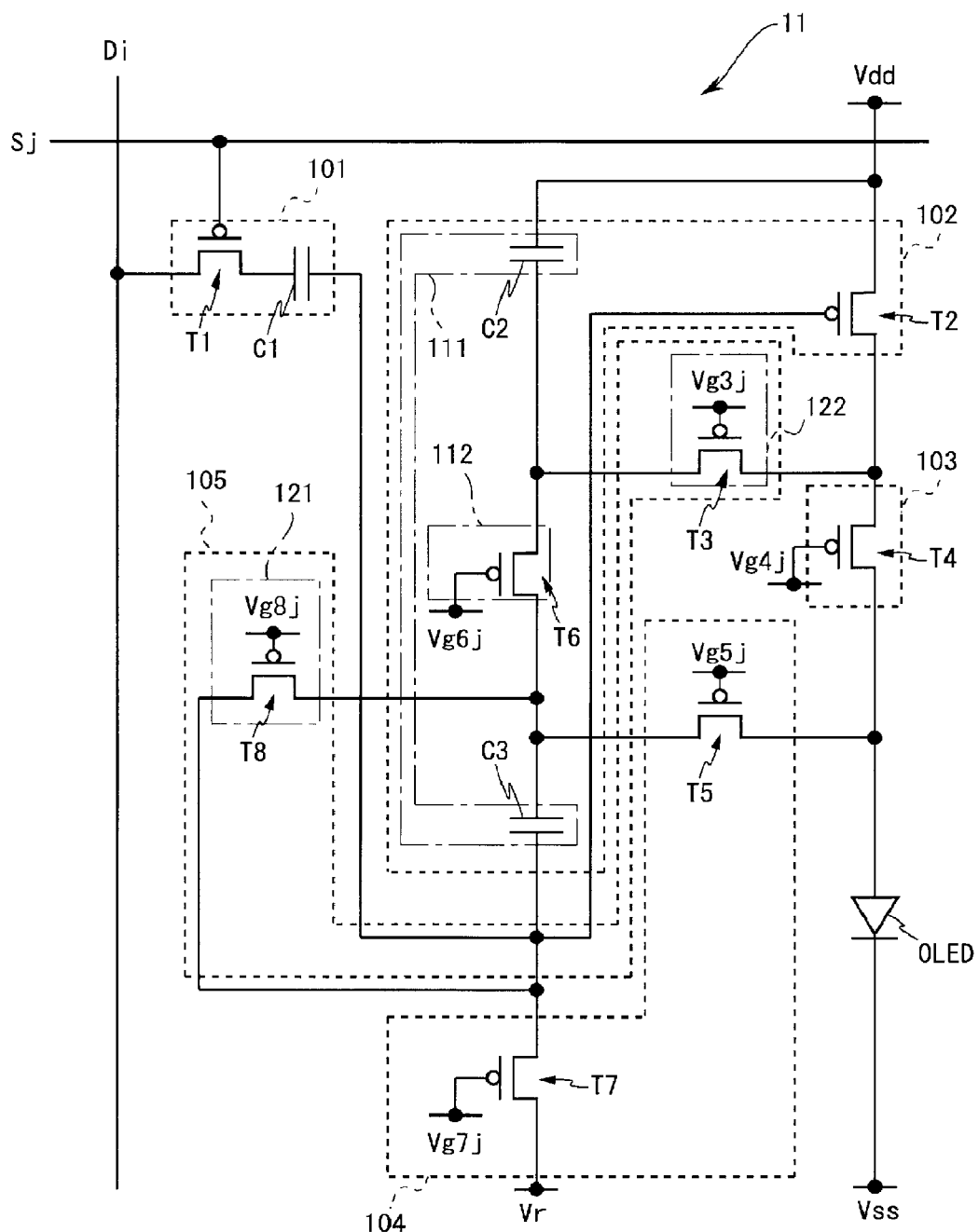
FIG. 10 is a circuit diagram showing a configuration of a pixel circuit of Embodiment 4 of the present invention.

FIG. 10 is a circuit diagram showing a configuration of a pixel circuit 11 of Embodiment 4 of the present invention. Components of the present embodiment that are the same as those of Embodiment 1 or 3 are assigned the same reference characters with descriptions thereof being omitted as appropriate. As shown in FIG. 10, the pixel circuit 11 of the present embodiment has the addition of a capacitor C2 to the driving capacitance element 111 of Embodiment 3, and a threshold voltage compensation unit 122 is added to the pre-processing unit 105. Also, in the display unit 10, an n number of control lines Vg3j are provided along an n number of scan wiring lines Sj. The n number of control lines Vg3j are connected to the group of selection drivers 50.

The capacitor C2 is provided between the first conductive terminal of the transistor T2 and the first conductive terminal of the transistor T6. The capacitor C2 functions as a second driving capacitance element.

The threshold voltage compensation unit 122 includes one transistor T3. The transistor T3 is of a p-channel type. The transistor T3 functions as a second pre-processing transistor. The threshold voltage compensation unit 122, the initializing unit 121, and the drive voltage application control unit 112 operate together during a threshold voltage compensation period TCP during the pre-processing period PP and after the initializing period IP, thereby causing a short-circuit between the second conductive terminal and the gate terminal of the transistor T2. The gate terminal of the transistor T3 is connected to the control line Vg3j, and the transistor T3 is provided between the first conductive terminal of the transistor T6 (one end of the drive voltage application control unit 112 towards the capacitor C2) and the second conductive terminal of the transistor T2. The threshold voltage compensation unit 122 corresponds to the second pre-processing unit.

The initializing unit 121, the reverse direction current compensation unit 104, and the drive voltage application control unit 112 of the present embodiment operate together during the initializing period IP, thereby causing a short-circuit between the first terminal of the capacitor C2 and the reverse bias power source line Vr. The connective relations of other components within the pixel circuit 11 and between components are similar to those of Embodiment 3, and thus, descriptions thereof are omitted.

<4.2 Operation>

Figure 11:
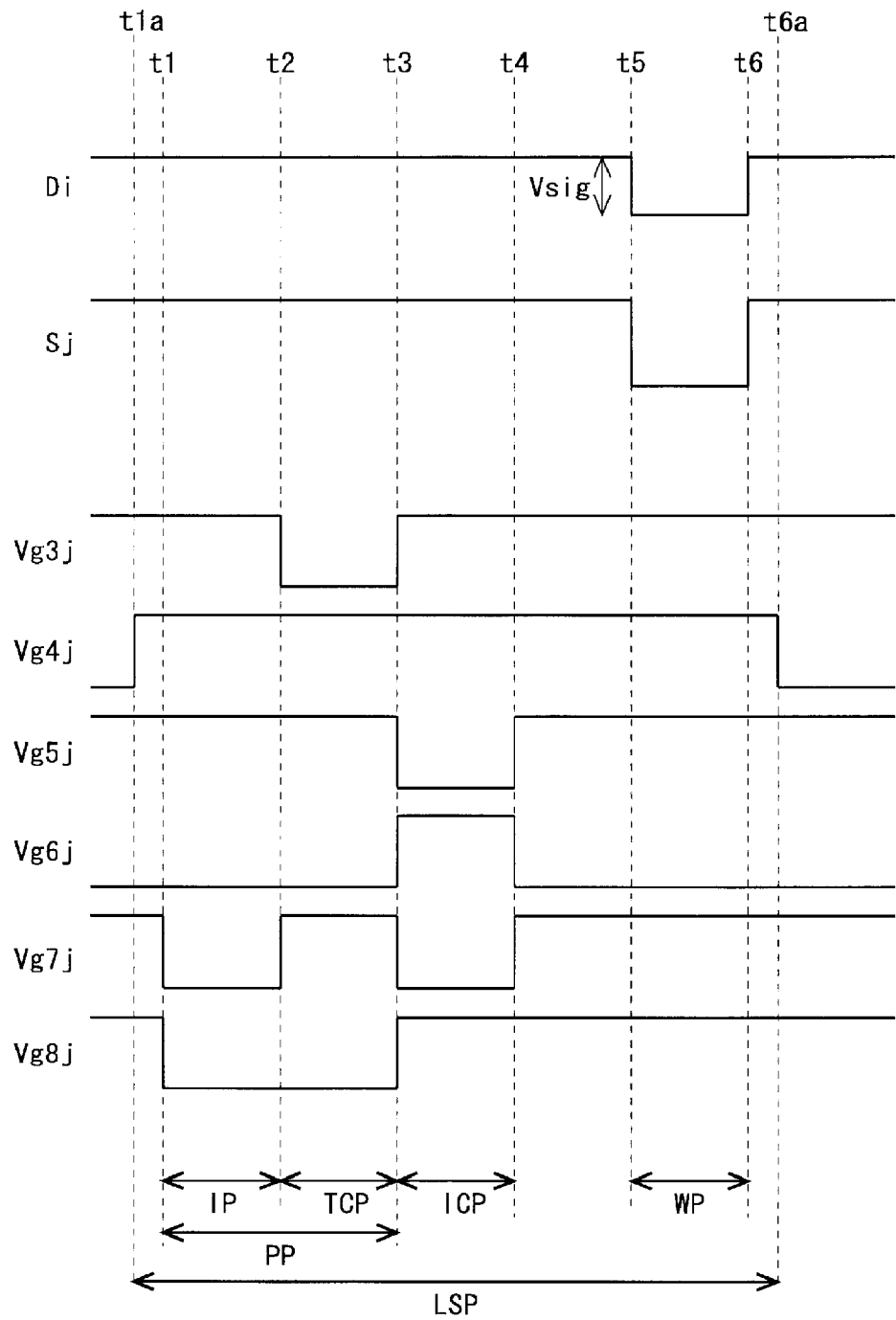
FIG. 11 is a timing chart showing a method of driving pixel circuits in Embodiment 4.

FIG. 11 is a timing chart showing a method of driving the pixel circuits 11 in the present embodiment. In the present embodiment, a time t1 a to t6a is a non-light emitting period LSP. The time t1 to t3 is a pre-processing period PP, the time t3 to t4 is a reverse direction compensation period ICP, and the time t5 to t6 is a writing period WP. The time t1 to t2 is the initializing period IP and the time t2 to t3 is the threshold voltage compensation period TCP. The threshold voltage compensation period TCP corresponds to the second pre-processing period. The writing period WP may be at the time t4 to t5 or the time t4 to t6.

During the time t1, the potential of the control line Vg6j is maintained at a low level, and thus, the transistor T6 is ON.

Also, at the time t1, the potential of the control lines Vg7j and Vg8j changes from a high level to a low level, and thus, the transistors T7 and T8 respectively turn ON. Thus, the first terminal and the second terminal of the capacitor C3 are electrically connected to each other, and the voltage stored in the capacitor C3 is initialized to 0V. Also, as a result of the first terminal of the capacitor C2 and the reverse bias power source line Vr being electrically connected to each other, the voltage stored in the capacitor C2 is initialized to the potential difference between the high level power source potential Vdd and the reverse bias power source potential Vr, which are both fixed potentials. Initialization of the voltage stored in the capacitor C3 to 0V may be performed alone in the initializing period IP.

At the time t2, the potential of the control line Vg7j changes from a low level to a high level, and the transistor T7 turns ON. As a result, the gate terminal of the transistor T2 and the reverse bias power source line Vr are electrically disconnected from each other. Also, at the time t2, the potential of the control line Vg3j changes from a high level to a low level, and thus, the transistor T3 turns ON. As a result, the gate terminal and the second conductive terminal of the transistor T2 are electrically connected to each other through the transistors T3, T6, and T8 (forming a diode connection). As a result, during the threshold voltage compensation period TCP at the time t2 to t3, a voltage based on the threshold voltage VthT2 of the transistor T2 is written to the capacitor C2. Below, for ease of description, it is assumed that the threshold voltage VthT2 of the transistor T2 is written to the capacitor C2. As a result of the initialization above, a voltage having a larger absolute value than the threshold voltage VthT2 is stored in the capacitor C2 immediately before the time t2.

At the time t3, the potential of the control lines Vg3j, Vg6j, and Vg8j changes from a low level to a high level, and the transistors T3, T6, and T8 turn OFF. As a result, the writing of the threshold voltage VthT2 of the transistor T2 to the capacitor C2 is completed. Also, at the time t3, the potential of the control lines Vg5j and Vg7j changes from a high level to a low level, and thus, the transistors T5 and T7 turn ON. Therefore, the organic EL element OLED becomes reverse biased due to the low level power source potential Vss and the reverse bias power source potential Vr. As a result, the reverse direction current Ioledr flowing through the organic EL element OLED is fed to the capacitor C3. As a result, similar to Embodiment 1, a reverse direction voltage Voledr is written to the capacitor C3.

At the time t4, the potential of the control lines Vg5j and Vg7j changes from a low level to a high level, and the transistors T5 and T7 turn OFF. Thus, reverse biasing of the organic EL element OLED ends. Also, at the time t4, the potential of the control line Vg6j changes from a high level to a low level, and thus, the transistor T6 turns ON. As a result, the capacitors C2 and C3 are connected in series, and the voltage stored in the entire driving capacitance element 111 becomes "VthT2+Voledr."

Also, at the time t5, the potential of the scan wiring line Sj changes from a high level to a low level, and thus, the transistor T1 turns ON. At this time, as a result of the above-mentioned boosting through the capacitor C1, the voltage stored in the entire driving capacitance element 111 becomes "Vsig+VthT2+Voledr." It is preferable that the capacitance value of the capacitor C1 be sufficiently larger than the capacitance values of the capacitors C2 and C3.

Also, at the time t6, the potential of the scan wiring line Sj changes from a low level to a high level, and thus, the transistor T1 turns OFF. Therefore, the supplying of the data voltage Vsig to the driving unit 102 is stopped.

At the time t6a, the potential of the control line Vg4j changes from a high level to a low level, and thus, the transistor T4 turns ON. The entire driving capacitance element 111 stores a voltage of "Vsig+VthT2+Voledr," or in other words, the drive voltage is determined by the data voltage Vsig in the driving unit 102, the threshold voltage VthT2 of the transistor T2, and the reverse direction voltage Voledr, and thus, in the present embodiment, the drive current I1 according to the following formula (5) is fed to the organic EL element OLED.

$$I1=(\beta 1/2)\cdot (Vsig+Voledr)^2 \quad (5)$$

Unlike the formula (4), the threshold voltage VthT2 is absent in formula (5). Thus, variation in the threshold voltage VthT2 of the transistor T2 is compensated.

<4.3 Effects>

According to the present embodiment, the transistor T3 and the capacitor C2, which turn ON in the threshold voltage compensation period TCP are provided, and during the threshold voltage compensation period TCP, the transistors T6 and T8 turn ON. As a result, during the threshold voltage compensation period TCP, the gate terminal and the second conductive terminal of the transistor T2 are electrically connected to each other through the transistors T3, T6, and T8 (forming a diode connection). As a result, during the threshold voltage compensation period TCP, the threshold voltage VthT2 of the transistor T2 is written to the capacitor C2. Therefore, the threshold voltage VthT2 of the transistor T2 stored in the capacitor C2 is used to compensate for the variation in the threshold voltage VthT2 of the transistor T2.

Also, according to the present embodiment, during the initializing period IP, the transistors T6 and T7 are turned ON in addition to the transistor T8. Thus, the first terminal of the capacitor C2 and the reverse bias power source line Vr are electrically connected to each other through the transistors T6 to T8. As a result, the voltage stored in the capacitor C2 is initialized to the potential difference of the high level power source potential Vdd and the reverse bias power source potential Vr, which are fixed potentials during the initializing period IP. Therefore, during the threshold voltage compensation period TCP, it is possible to stably write the threshold voltage VthT2 of the transistor T2 to the capacitor C2, and thus, it is possible to stably compensate for the variation in the threshold voltage VthT2 of the transistor T2.

5. Embodiment 5

<5.1 Configuration of Pixel Circuit>

Figure 12:
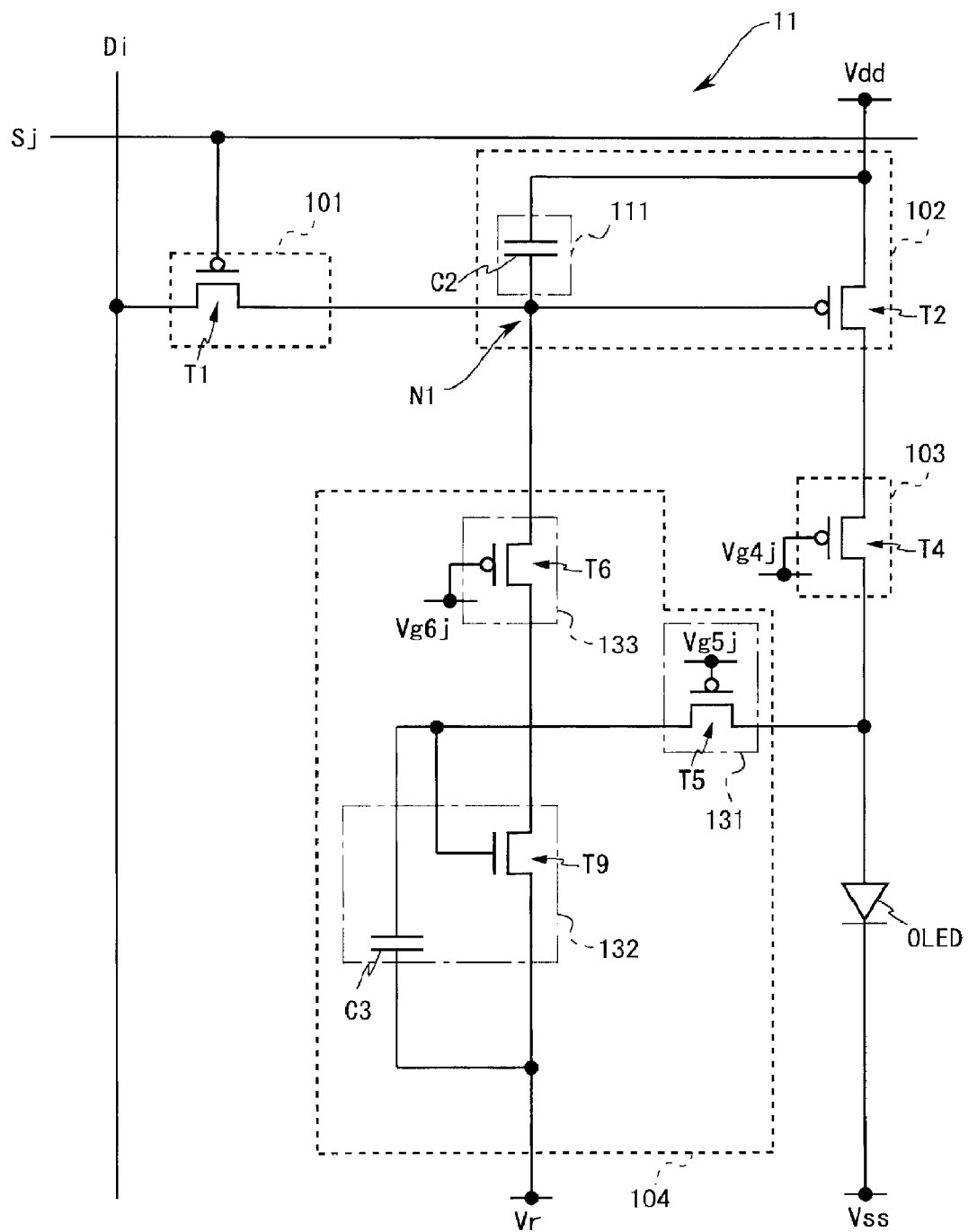
FIG. 12 is a circuit diagram showing a configuration of a pixel circuit of Embodiment 5 of the present invention.

FIG. 12 is a circuit diagram showing a configuration of a pixel circuit 11 of Embodiment 5 of the present invention. The input unit 101 includes one transistor T1. The driving unit 102 includes one transistor T2 and a driving capacitance element 111. The driving capacitance element 111 includes one capacitor C2. The light emission control unit 103 includes one transistor T4. The reverse direction current compensation unit 104 includes a reverse direction current supplying unit 131 and first and second compensation current control units 132 and 133. The reverse direction current supplying unit 131 includes one transistor T5. The first compensation current control unit 132 includes one transistor T9 and one capacitor C3. The second compensation current control unit 133 includes one transistor T6. The transistors T1, T2, and T4 to T6 are of the p-channel type, and the transistor T9 is of the n-channel type. In the present embodiment, similar to Embodiment 1, the high level power source line Vdd is the first power source line and the low level power source line Vss is the second power source line, and the size relations of the high level power source potential Vdd, the low level power source potential Vss, and the reverse bias power source potential Vr are shown in formula (2) above.

The transistor T1 functions as an input transistor. The transistor T2 functions as a driving transistor. The transistor T4 functions as a light emission control transistor. The transistor T5 functions as a transistor for supplying a reverse direction current. The transistor T6 functions as a second transistor for controlling a compensation current. The transistor T9 functions as a first transistor for controlling a compensation current. The capacitor C2 functions as a drive capacitance element. The capacitor C3 functions as a capacitance element for controlling a compensation current.

The display unit 10 is provided with an n number of control lines Vg4j, an n number of control lines Vg5j, and an n number of control lines Vg6j, along the n number of scan wiring lines Sj. The n number of control lines Vg4j, the n number of control lines Vg5j, and the n number of control lines Vg6j are connected to the group of selection drivers 50.

The input unit 101 feeds to the driving unit 102 a data voltage based on the data wiring line fed by the corresponding data wiring line Di in response to the selection of the corresponding scan wiring line Sj. The gate terminal of the transistor T1 is connected to the scan wiring line Sj and a first conductive terminal of the transistor T1 is connected to the data wiring line Di.

The driving unit 102 controls the drive current I1. The driving capacitance element 111 stores the drive voltage of the transistor T2. The gate terminal of the transistor T2 is connected to a second conductive terminal of the transistor T1, and the first conductive terminal of the transistor T2 is connected to the high level power source line Vdd. The first terminal of the capacitor C2 is connected to the gate terminal of the transistor T2, and the second terminal of the capacitor C2 is connected to the first conductive terminal of the transistor T2.

The light emission control unit 103 controls the timing at which the organic EL element OLED emits light, and, during a non-light emitting period LSP, stops the current (forward direction current) flowing between the high level power source line Vdd (first power source line) and the organic EL element OLED. In other words, during the non-light emitting period LSP, the organic EL element OLED is electrically disconnected from the transistor T2. The gate terminal of the transistor T4 is connected to the control line Vg4j, and the transistor T4 is provided between the second conductive terminal of the transistor T2 and the positive terminal of the organic EL element OLED.

The reverse direction current compensation unit 104 supplies to the capacitor C2 a compensation signal based on the reverse direction current Ioledr flowing through the organic EL element OLED. More specifically, the reverse direction current compensation unit 104 supplies to the capacitor C2 a voltage based on the reverse direction current Ioledr flowing through the organic EL element OLED. More specifically, by causing a compensation current I2 determined based on the reverse direction current Ioledr towards the reverse bias power source line Vr from the capacitor C2 during a second compensation period to be mentioned later, the voltage stored in the capacitor C2 changes. From the perspective of the movement of electrons, this means that the compensation signal based on the reverse direction current Ioledr is supplied to the capacitor C2. This also means that a voltage based on the reverse direction current Ioledr (amount of fluctuation in voltage) is supplied to the capacitor C2. Also, it can be said that in the present embodiment, the voltage based on the reverse direction current Ioledr supplied to the capacitor C2 is the voltage based on the compensation current I2.

The reverse direction current supplying unit 131 supplies the reverse direction current Ioledr to the first compensation current control unit 132. The gate terminal of the transistor T5 is connected to the control line Vg5j, and the first conductive terminal of the transistor T5 is connected to the positive terminal of the organic EL element OLED.

The first compensation current control unit 132 controls the value of the compensation current I2 based on the reverse direction current Ioledr received from the reverse direction current supplying unit 131. The gate terminal of the transistor T9 is connected to a second conductive terminal of the transistor T5, and the first conductive terminal of the transistor T9 is connected to the reverse bias power source line Vr. The capacitor C3 is provided between the gate terminal and the first conductive terminal of the transistor T9.

The second compensation current control unit 133 controls the timing at which the compensation current I2 flows. The gate terminal of the transistor T6 is connected to the control line Vg6j, the first conductive terminal of the transistor T6 is connected to the capacitor C2, and the second conductive terminal of the transistor T6 is connected to the second conductive terminal of the transistor T9.

In the present embodiment and in Embodiments 6 to 8 and 12, the connecting point between the first terminal of the capacitor C2, the gate terminal of the transistor T2, and the first conductive terminal of the transistor T6 is referred to as the "node N1" for ease of description. In Embodiment 13, the connecting point between the first terminal of the capacitor C2 and the gate terminal of the transistor T2 is referred to as the "node N1" for ease of description.

<5.2 Operation>

Figure 13:
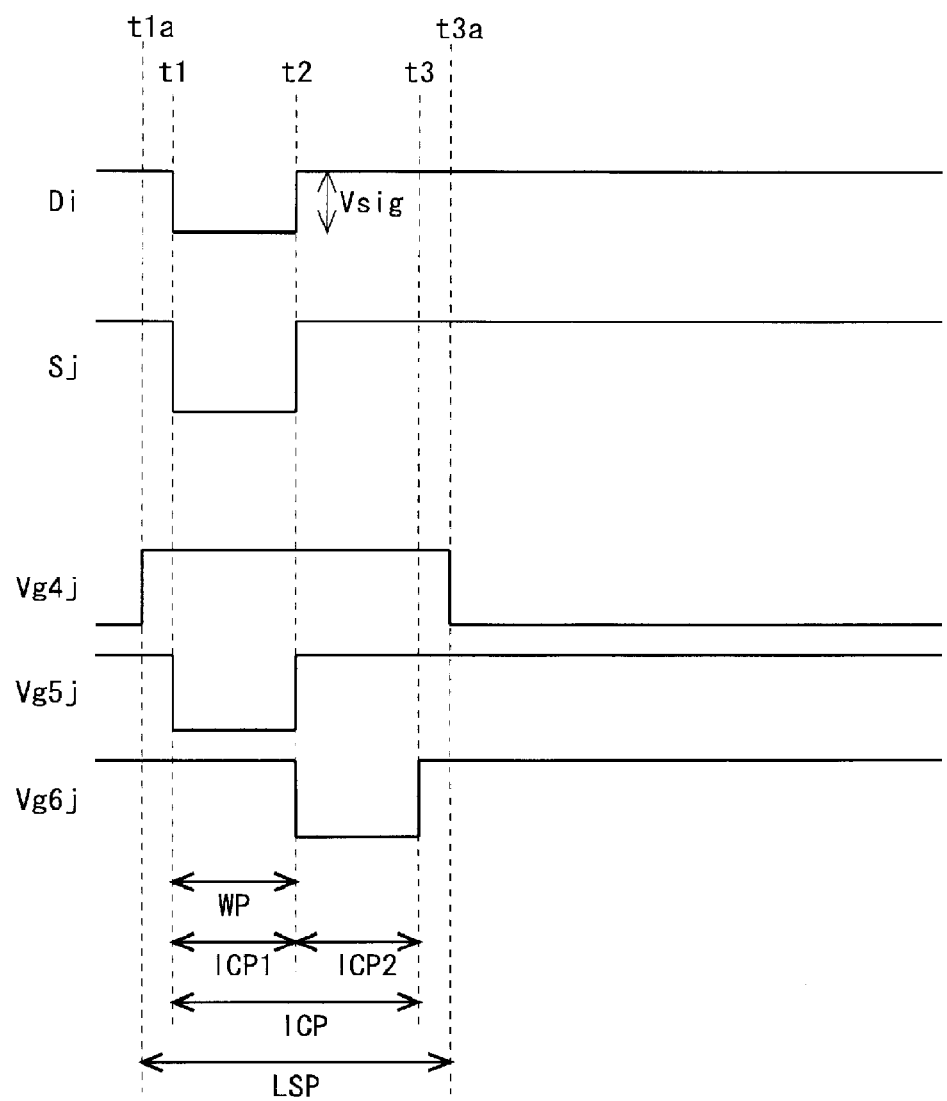
FIG. 13 is a timing chart showing a method of driving pixel circuits in Embodiment 5.

FIG. 13 is a timing chart showing a method of driving the pixel circuits 11 in the present embodiment. In the present embodiment, a time t1 a to t3a is a non-light emitting period LSP. The time t1 to t3 is the reverse direction compensation period ICP. The time t1 to t2 is the first reverse direction compensation period ICP1 and the writing period WP. The time t2 to t3 is the second reverse direction compensation period ICP2. The non-light emitting period LSP corresponds to the second prescribed period and the reverse direction compensation period ICP corresponds to the first prescribed period. The first reverse direction compensation period ICP1 corresponds to the first compensation period and the second reverse direction compensation period ICP2 corresponds to the second compensation period. The non-light emitting period LSP may start from the time t1.

At time t1a, the potential of the control line Vg4j changes from a low level to a high level. Thus, the transistor T4 turns OFF, and the second conductive terminal of the transistor T2 is electrically separated from the positive terminal of the organic EL element OLED. Thus, the organic EL element OLED stops emitting light.

Also, at the time t1, the potential of the scan wiring line Sj changes from a high level to a low level, and thus, the transistor T1 turns ON. Thus, the voltage Vsig (data voltage) of the data signal supplied from the data wiring line Di is written to the capacitor C2. Also, at the time t1, the potential of the control line Vg5j changes from a high level to a low level, and thus, the transistor T5 turns ON. Therefore, the organic EL element OLED becomes reverse biased due to the low level power source potential Vss and the reverse bias power source potential Vr. As a result, the reverse direction current Ioledr flowing through the organic EL element OLED is supplied to the capacitor C3, and a reverse direction voltage Voledr is written to the capacitor C3. In the present embodiment and Embodiments 6 to 8 and 12, the reverse direction voltage Voledr stored in the capacitor C3 corresponds to the second voltage based on the reverse direction current. The reverse bias power source potential Vr of the present embodiment must satisfy the following formula (6) in addition to formula (2) above.

$$|Vss-Vr|>|VthT9| \quad (6)$$

Here, VthT9 represents a threshold voltage of the transistor T9.

Also, at the time t2, the potential of the scan wiring line Sj changes from a low level to a high level, and thus, the transistor T1 turns OFF. Thus, the writing of the data voltage Vsig to the capacitor C2 ends. Also, at the time t2, the potential of the control line Vg5j changes from a low level to a high level, and the transistor T5 turns ON. Thus, reverse biasing of the organic EL element OLED ends. Also, at the time t2, the potential of the control line Vg6j changes from a high level to a low level, and thus, the transistor T6 turns ON. As a result, the compensation current I2 flows from the capacitor C2 towards the reverse bias power source line Vr. During the period of the time t2 to t3 (hereinafter assigned the reference character tc), it is preferable that the difference between the potential of the node N1 and the reverse bias power source potential Vr be such that the transistor T9 operates in a saturation region. As a result, the compensation current I2 is at a value based on the reverse direction voltage Voledr stored in the capacitor C3 according to formula (7) below.

$$I2=(\beta 2/2)\cdot(Voledr-VthT9)^2 \quad (7)$$

Here, β2 represents a constant. The compensation current I2 is at a fixed value during the period tc. During the period tc, the first and second conductive terminals of the transistor T9 respectively function as the source terminal and the drain terminal.

As a result of the compensation current I2 flowing during the period tc, the drive voltage stored in the capacitor C2 changes by ΔVC2 attained by the following formula (8).

$$\Delta VC2=I2\cdot tc/C2 \quad (8)$$

Below, the amount of change ΔVC2 of the drive voltage stored in the capacitor C2 during the period tc is referred to as the "compensation change voltage." In the present embodiment and Embodiments 6 to 8, 12, and 13, the compensation change voltage ΔVC2 corresponds to the first voltage based on the reverse direction current or the compensation current.

At the time t3, the potential of the control line Vg6j changes from a low level to a high level, and the transistor T6 turns OFF. Thus, the flow of the compensation current I2 stops.

At the time t3a, the potential of the control line Vg4j changes from a high level to a low level, and thus, the transistor T4 turns ON. Therefore, the drive current I1 determined by formula (3) above is fed to the organic EL element OLED, and the organic EL element OLED emits light based on the value of the drive current I1. As a result of the compensation current I2 flowing during the period tc, "Vsig+ΔVC2" is stored in the capacitor C2, and thus, it is possible to replace formula (3) with formula (9) below.

$$I1=(\beta 1/2)\cdot(Vsig+\Delta VC2-VthT2)^2 \quad (9)$$

In this manner, in the present embodiment, the compensation change voltage ΔVC2 determined based on the compensation current I2 is supplied to the capacitor C2. The reverse direction voltage Voledr becomes larger as deterioration of the organic EL element OLED progresses over time, and thus, the compensation current I2 shown in formula (7) above also becomes larger.

In formula (8), tc and C2 are fixed values, and thus, the compensation change voltage ΔVC2 is determined based on the compensation current I2. Thus, as the compensation current I2 becomes greater due to the progression over time of deterioration of the organic EL element OLED, the compensation change voltage ΔVC2 also becomes larger. Here, "the compensation change voltage ΔVC2 becoming larger" in the present embodiment and Embodiments 6 to 8, 12, and 13 refers to the fact that the absolute value of the compensation change voltage ΔVC2 becomes larger.

In the above manner, the drive current I1 shown in formula (9) above becomes larger as deterioration of the organic EL element OLED progresses over time.

<5.3 Effects>

According to the present embodiment, by having the compensation current I2 (compensation signal) flow from the capacitor C2 to the reverse bias power source line Vr during the period tc, the compensation current I2 being determined based on the reverse direction current Ioledr flowing through the organic EL element OLED during reverse bias time, the voltage stored in the capacitor C2 changes based on the compensation current I2. This means that the compensation change voltage ΔVC2 based on the compensation current I2 is supplied to the capacitor C2. The compensation current I2 is determined based on the reverse direction current Ioledr, and thus, the compensation change voltage ΔVC2 is also a voltage determined by the reverse direction current Ioledr. The drive voltage is determined by the compensation change voltage ΔVC2 and the data voltage Vsig, and thus, the organic EL element OLED radiates light based on the drive current I2, which is proportional to the difference between the drive voltage and the threshold voltage of the transistor T2 raised to the second power. The reverse direction current Ioledr becomes larger as deterioration over time of the organic EL element OLED progresses, and thus, the compensation current I2 also becomes larger as deterioration over time of the organic EL element OLED progresses. Thus, the compensation change voltage ΔVC2 based on the compensation current I2 becomes larger as deterioration of the organic EL element OLED progresses over time. As a result, the drive current I1 also becomes larger as deterioration of the organic EL element OLED progresses over time. As a result, luminance compensation occurs based on the progression over time of deterioration of the organic EL element OLED. Furthermore, this luminance compensation occurs during the non-light emitting period LSP during which the organic EL element does not emit light. Therefore, prior to the luminance compensation being completed, the organic EL element OLED does not emit light, and therefore, a decrease in luminance in emitted light due to deterioration over time of the organic EL element can be mitigated to a greater degree than in conventional devices.

6. Embodiment 6

<6.1 Configuration of Pixel Circuit>

Figure 14:
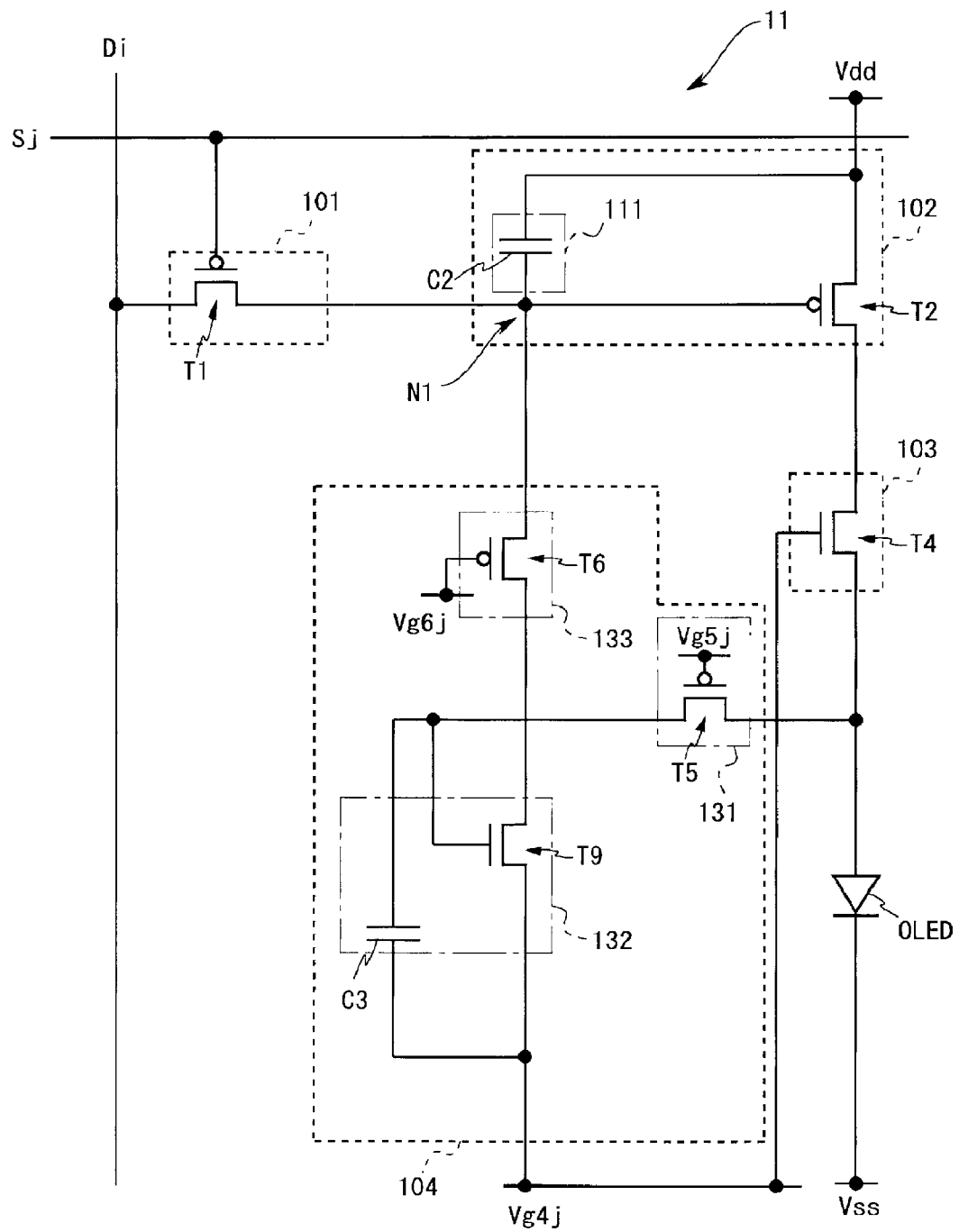
FIG. 14 is a circuit diagram showing a configuration of a pixel circuit of Embodiment 6 of the present invention.

FIG. 14 is a circuit diagram showing a configuration of a pixel circuit 11 of Embodiment 6 of the present invention. Components of the present embodiment that are the same as those of Embodiment 5 are assigned the same reference characters with descriptions thereof being omitted as appropriate. As shown in FIG. 14, in the present embodiment, the transistor T4 is of an n-channel type. The first conductive terminal of the transistor T9 is connected to the control line Vg4j along with the gate terminal of the transistor T4. In the present embodiment, the control line Vg4j is the reverse bias control line. Also, in the present embodiment, a reverse bias power source line Vr is not provided. The connective relations of other components within the pixel circuit 11 and between components are similar to those of Embodiment 5, and thus, descriptions thereof are omitted.

<6.2 Operation>

Figure 15:
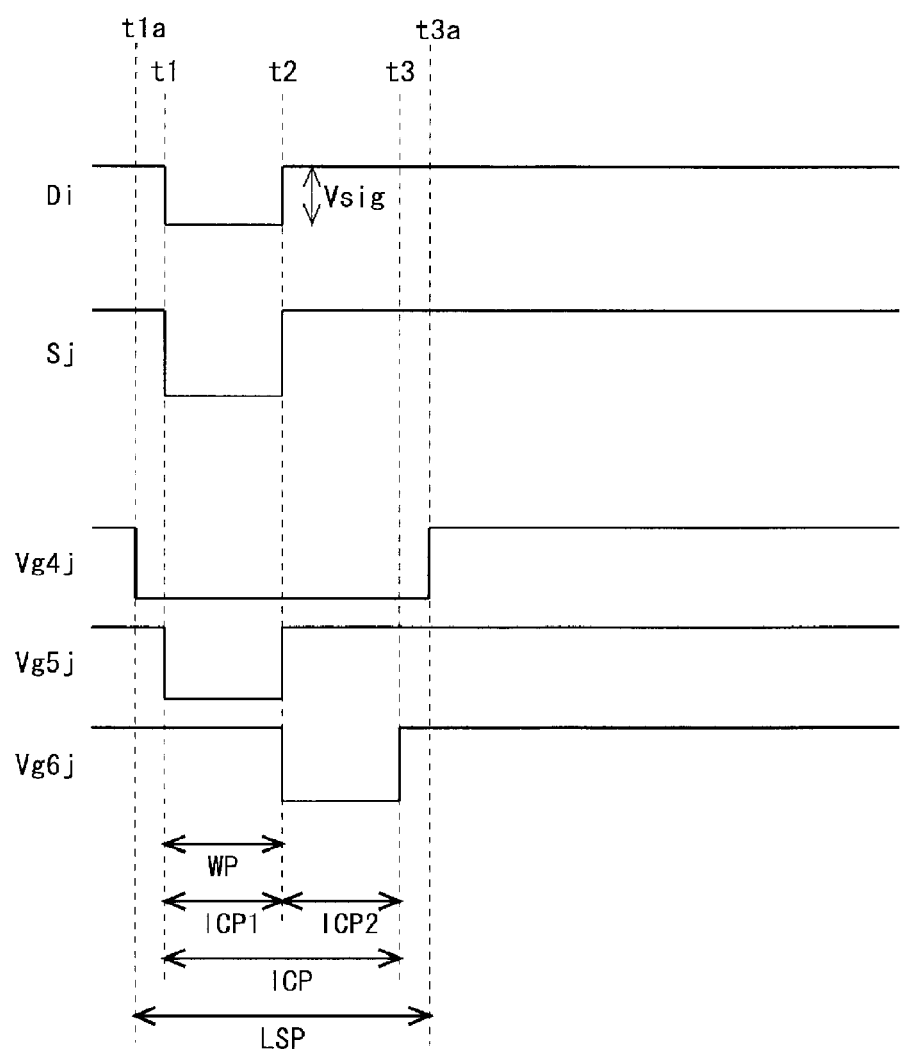
FIG. 15 is a timing chart showing a method of driving pixel circuits in Embodiment 6.

FIG. 15 is a timing chart showing a method of driving the pixel circuits 11 in the present embodiment. As shown in FIG. 15, the potential of the control line Vg4j of the present embodiment is inversed compared to that of Embodiment 5. However, the low level potential of the control line Vg4j of the present embodiment is the reverse bias power source potential Vr. In other words, during the non-light emitting period LSP, the reverse bias power source potential Vr is fed to the control line Vg4j. The reverse bias power source potential Vr satisfies formulae (2) and (6) in a manner similar to that of Embodiment 5.

At time t1a, the potential of the control line Vg4j changes from the high level to the reverse bias power source potential Vr. Thus, the transistor T4 turns OFF, and the second conductive terminal of the transistor T2 is electrically separated from the positive terminal of the organic EL element OLED. Thus, the organic EL element OLED stops emitting light. During the non-light emitting period LSP, the reverse bias power source potential Vr is fed to the control line Vg4j, and thus, during the non-light emitting period LSP, an operation similar to that of Embodiment 5 occurs.

At the time t3a, the potential of the control line Vg4j changes from the reverse bias power source potential Vr to a high level, and thus, the transistor T4 turns ON. Therefore, the organic EL element OLED emits light according to the drive current I1 shown in the formula (9) above in a manner similar to that of Embodiment 5.

<6.3 Effects>

The transistor T4 is of an n-channel type, and by sharing the control line Vg4j between the gate terminal of the transistor T4 and the first conductive terminal of the transistor T9, the reverse bias power source line Vr of Embodiment 5 can be omitted.

7. Embodiment 7

<7.1 Configuration of Pixel Circuit>

Figure 16:
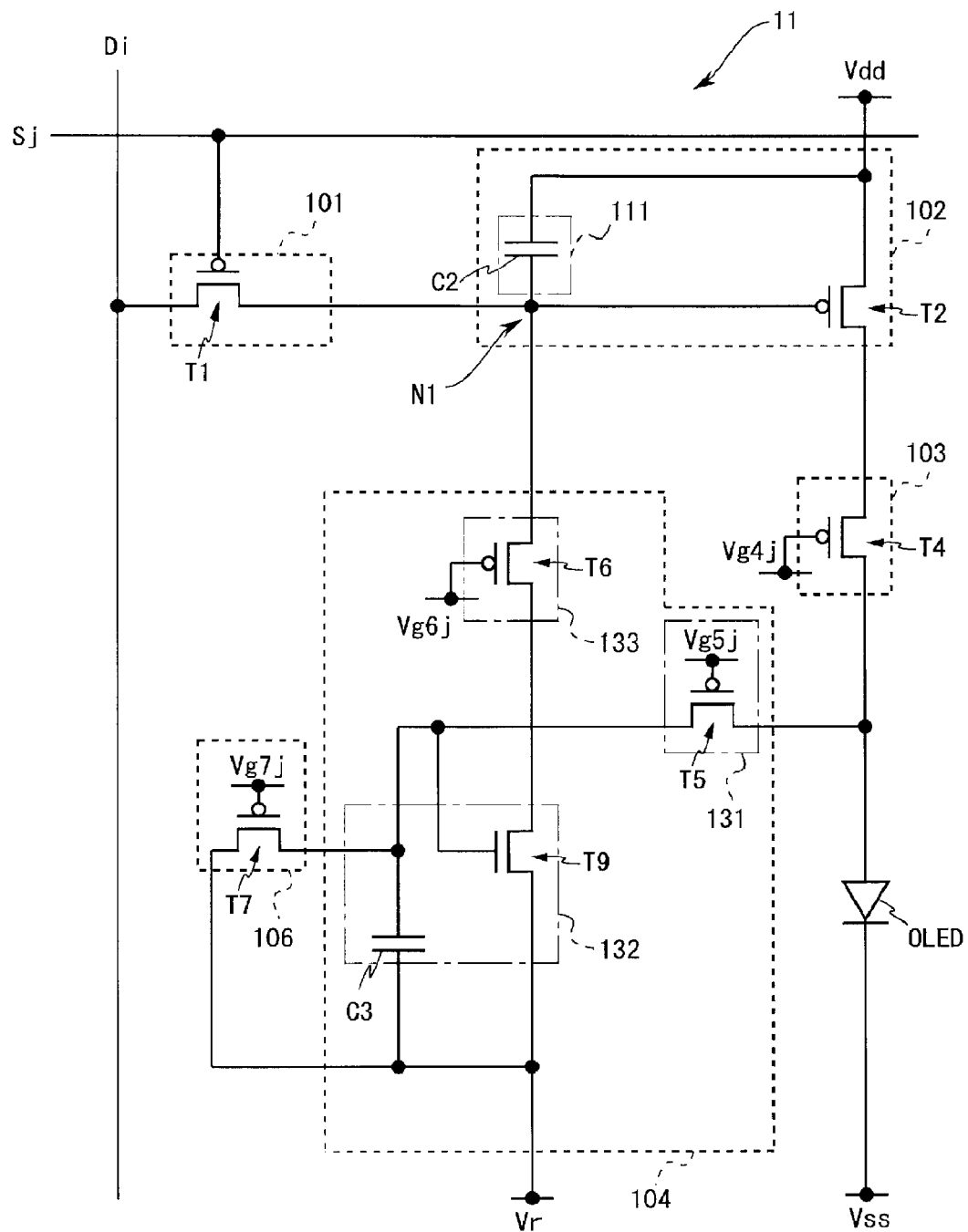
FIG. 16 is a circuit diagram showing a configuration of a pixel circuit of Embodiment 7 of the present invention.

FIG. 16 is a circuit diagram showing a configuration of a pixel circuit 11 of Embodiment 7 of the present invention. Components of the present embodiment that are the same as those of Embodiment 5 are assigned the same reference characters with descriptions thereof being omitted as appropriate. The pixel circuit 11 of the present embodiment has the addition of a first compensation initializing unit 106 to the pixel circuit 11 of Embodiment 5. Also, in the display unit 10, an n number of scan wiring lines Sj are provided along each of the n number of control lines Vg7j. The n number of control lines Vg7j are connected to the group of selection drivers 50.

The first compensation initializing unit 106 includes one transistor T7. The transistor T7 is of a p-channel type. The transistor T7 functions as a first transistor for compensation initializing. The first compensation initializing unit 106 causes a short-circuit between the first terminal and the second terminal of the capacitor C3 during the initializing period IP, which is during the non-light emitting period LSP and before the reverse direction compensation period ICP. The gate terminal of the transistor T7 is connected to a control line Vg7j, and the transistor T7 is provided between the first terminal and the second terminal of the capacitor C3. The connective relations of other components within the pixel circuit 11 and between components are similar to those of Embodiment 5, and thus, descriptions thereof are omitted.

<7.2 Operation>

Figure 17:
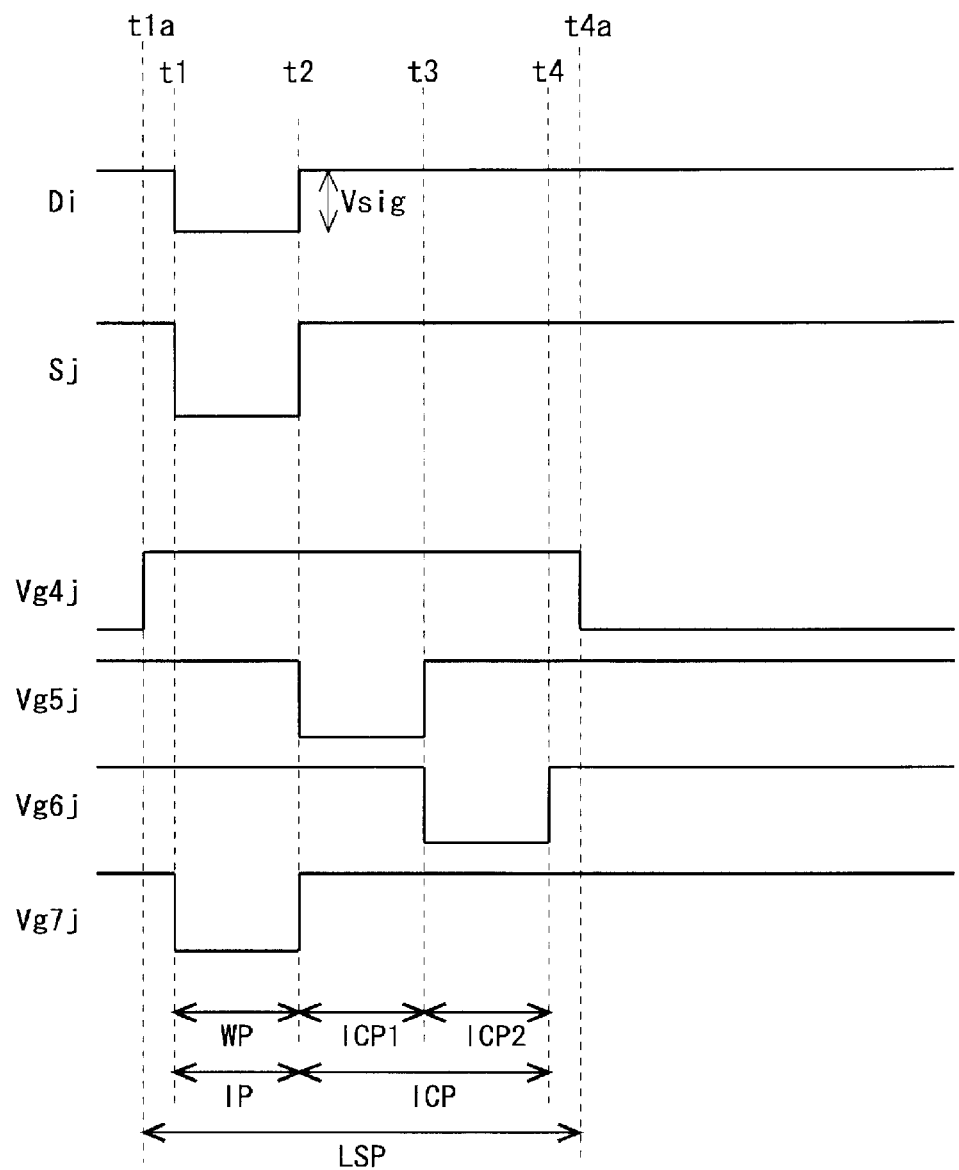
FIG. 17 is a timing chart showing a method of driving pixel circuits in Embodiment 7.

FIG. 17 is a timing chart showing a method of driving the pixel circuits 11 in the present embodiment. In the present embodiment, a time t1 a to t4a is a non-light emitting period LSP. The time t1 to t2 is the initializing period IP and the writing period WP. The time t2 to t4 is the reverse direction compensation period ICP. The time t2 to t3 is the first reverse direction compensation period ICP1. The time t3 to t4 is the second reverse direction compensation period ICP2. The operation during the time t1 a of the present embodiment is similar to that of Embodiment 5, and thus, descriptions thereof will be omitted.

Also, at the time t1, the potential of the control line Vg7j changes from a high level to a low level, and thus, the transistor T7 turns ON. Thus, the first terminal and the second terminal of the capacitor C3 are electrically connected to each other, and the voltage stored in the capacitor C3 is initialized to 0V. Also, at the time t1, the potential of the scan wiring line Sj changes from a high level to a low level, and thus, the transistor T1 turns ON. Thus, the data voltage Vsig is written to the capacitor C2.

At the time t2, the potential of the control line Vg7j changes from a low level to a high level, and the transistor T7 turns OFF. Thus, the initialization of the voltage stored in the capacitor C3 is completed. Also, at the time t2, the potential of the scan wiring line Sj changes from a low level to a high level, and thus, the transistor T1 turns OFF. Thus, the writing of the data voltage Vsig to the capacitor C2 ends. The operation starting at the time t2 is similar to the operation starting at the time t1 in Embodiment 5, and thus, descriptions thereof are omitted. The writing of the data voltage Vsig is performed during the time t1 to t2 in the present embodiment, but this may be performed during the time t2 to t3.

<7.3 Effects>

According to the present embodiment, the transistor T7, which is ON during the initializing period IP, is provided between the first terminal and the second terminal of the capacitor C3, and thus, during the initializing period IP, the first terminal and the second terminal of the capacitor C3 are electrically connected to each other. Thus, the voltage stored in the capacitor C3 is initialized to 0V. As a result, during the reverse direction compensation period ICP, it is possible to reliably write to the capacitor C3 the reverse direction voltage Voledr based on the reverse direction current Ioledr.

<7.4 Modification Example>

Figure 18:
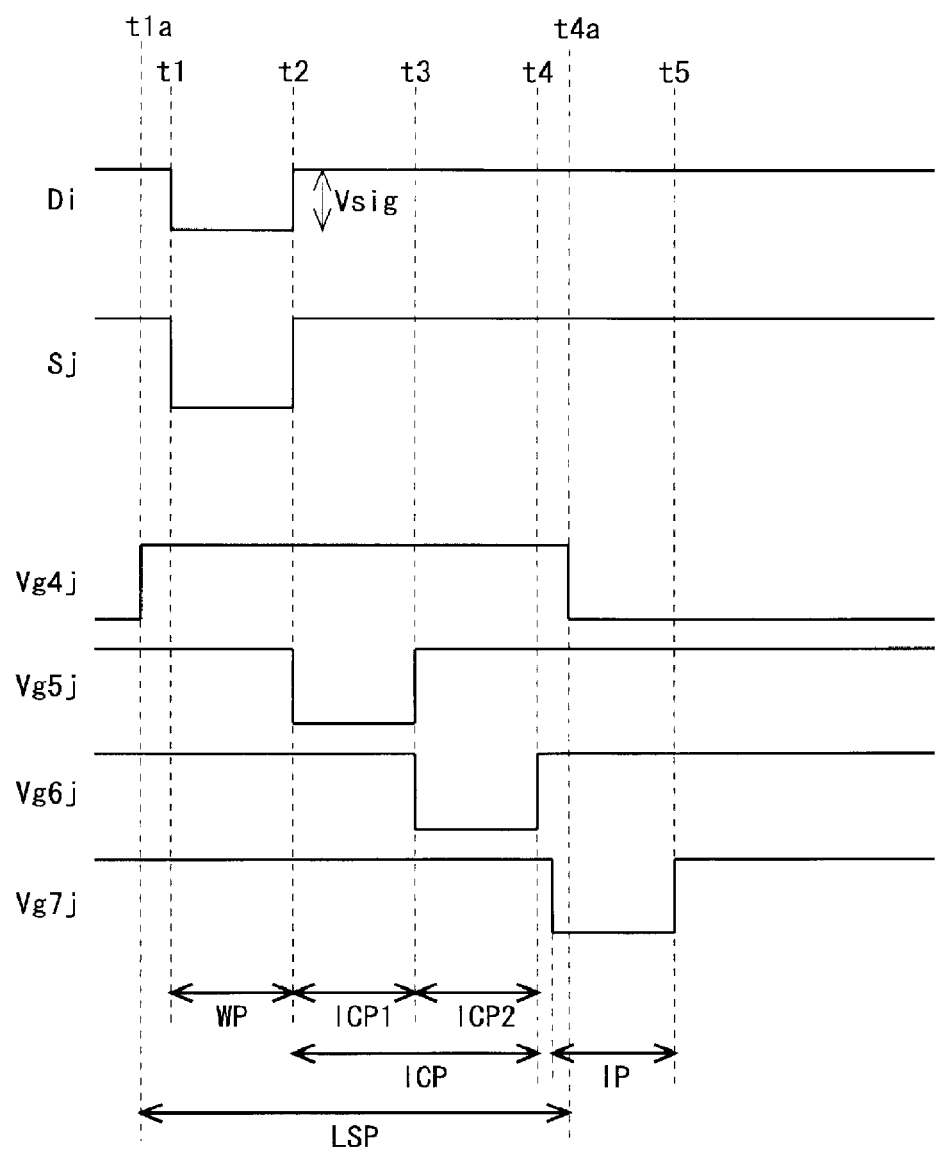
FIG. 18 is a timing chart showing a method of driving pixel circuits according to a modification example of Embodiment 7.

FIG. 18 is a timing chart showing a method of driving the pixel circuit 11 in a modification example of Embodiment 7 of the present invention. In Embodiment 7, the initializing period IP is during times t1 to t2, but in the present modification example, it is immediately after the time t4 to time t5 (after the time t4).

After the potential of the control line Vg6j during the time t4 changes from low level to high level and the transistor T6 turns OFF, the potential of the control line Vg7j changes from the high level to the low level and the transistor T7 turns ON. Thus, the first terminal and the second terminal of the capacitor C3 are electrically connected to each other, and the voltage stored in the capacitor C3 is initialized to 0V in a manner similar to Embodiment 7. Then, at the time t5, the potential of the control line Vg7j changes from a low level to a high level, and the transistor T7 turns OFF. Thus, the initialization of the voltage stored in the capacitor C3 is completed.

According to the present modification example, immediately after the second reverse direction compensation period ICP2 ends, the voltage stored in the capacitor C3 is initialized to 0V. Thus, the gate bias stress on the transistor T9 is reduced, thereby making it possible to mitigate changes in threshold voltage in the transistor T9. As a result, it is possible to more reliably control the compensation current I2, and therefore, it is possible to more reliably perform luminance compensation based on the amount of deterioration over time of the organic EL element OLED.

8. Embodiment 8

<8.1 Configuration of Pixel Circuit>

Figure 19:
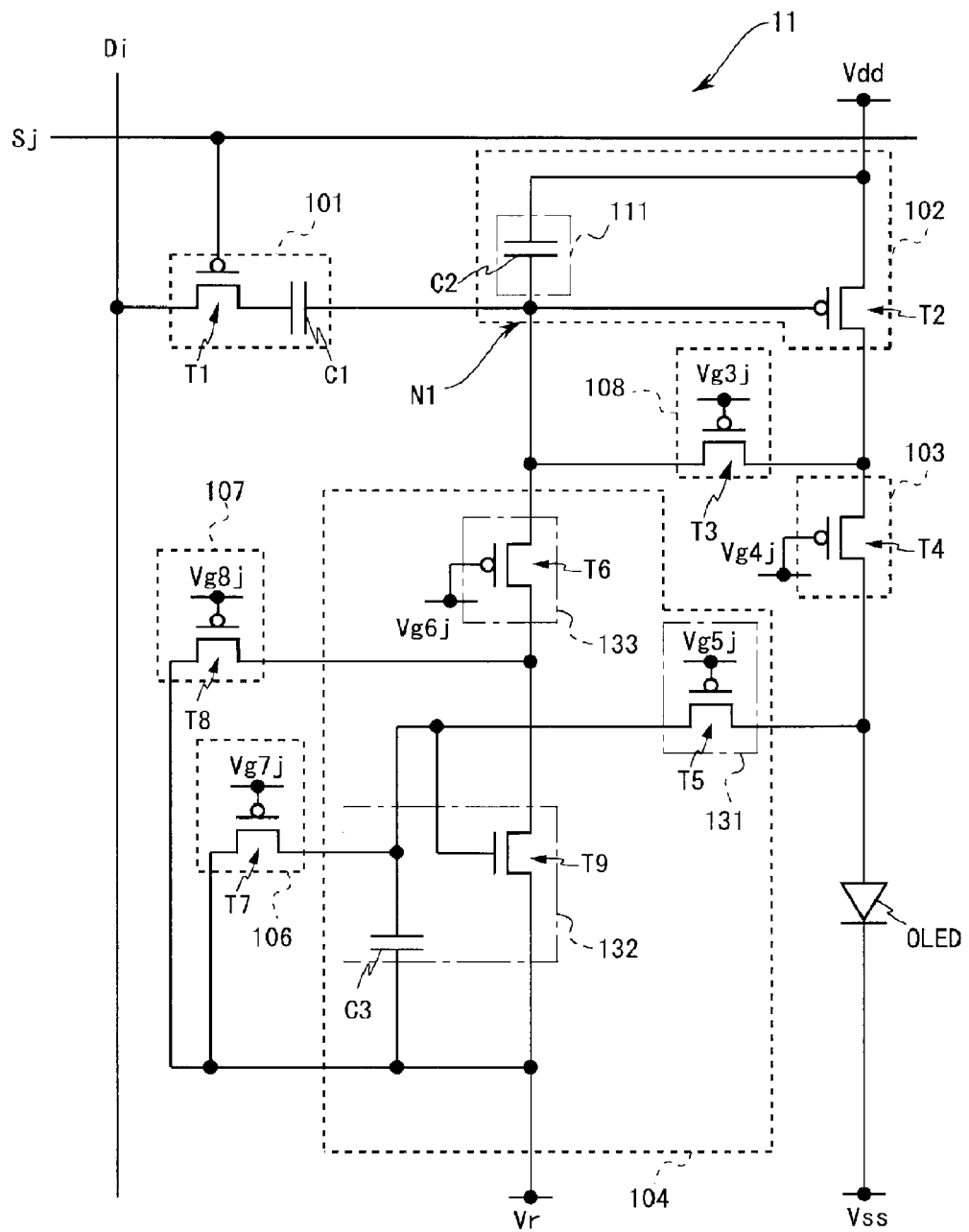
FIG. 19 is a circuit diagram showing a configuration of a pixel circuit of Embodiment 8 of the present invention.

FIG. 19 is a circuit diagram showing a configuration of a pixel circuit 11 of Embodiment 8 of the present invention. Components of the present embodiment that are the same as those of Embodiment 5 or 7 are assigned the same reference characters with descriptions thereof being omitted as appropriate. As shown in FIG. 19, the pixel circuit 11 of the present embodiment has the addition of the second compensation initializing unit 107 and the threshold voltage compensation unit 108 to the pixel circuit 11 of Embodiment 7, and the addition of the capacitor C1 to the input unit 101. In the present embodiment, the threshold voltage compensation unit 108 corresponds to the second compensation unit. Also, in the display unit 10, an n number of control lines Vg3j and an n number of control lines Vg8j are provided along an n number of scan wiring lines Sj. The n number of control lines Vg3j and the n number of control lines Vg8 are connected to the group of selection drivers 50.

The capacitor C1 included in the input unit 101 is provided between the second conductive terminal of the transistor T1 and the gate terminal of the transistor T2. The capacitor C1 functions as an input capacitance element.

The second compensation initializing unit 107 includes one transistor T8. The transistor T8 is of a p-channel type. The transistor T8 functions as a second transistor for compensation initializing. During the initializing period IP during the non-light emitting period LSP and before the reverse direction compensation period ICP, the second compensation initializing unit 107 and the second compensation current control unit 133 cause a short-circuit between the first terminal of the capacitor C2 (one end of the driving capacitance element 111 towards the second compensation current control unit 133) and the reverse bias power source line Vr. The gate terminal of the transistor T8 is connected to a control line Vg8j, and the transistor T8 is provided between the second conductive terminal of the transistor T6 and the reverse bias power source line Vr. The transistor T8 may be provided between the first terminal of the capacitor C2 and the reverse bias power source line Vr.

The threshold voltage compensation unit 108 includes one transistor T3. The transistor T3 is of a p-channel type. The transistor T3 functions as a second compensation transistor. The threshold voltage compensation unit 108 causes a short-circuit between the first terminal of the capacitor C2 and the second conductive terminal of the transistor T2 during the threshold voltage compensation period TCP during the reverse direction compensation period ICP and before the second reverse direction compensation period ICP2. The gate terminal of the transistor T3 is connected to the control line Vg3j, and the transistor T3 is provided between the gate terminal and the second conductive terminal of the transistor T2. The connective relations of other components within the pixel circuit 11 and between components are similar to those of Embodiment 7, and thus, descriptions thereof are omitted.

<8.2 Operation>

Figure 20:
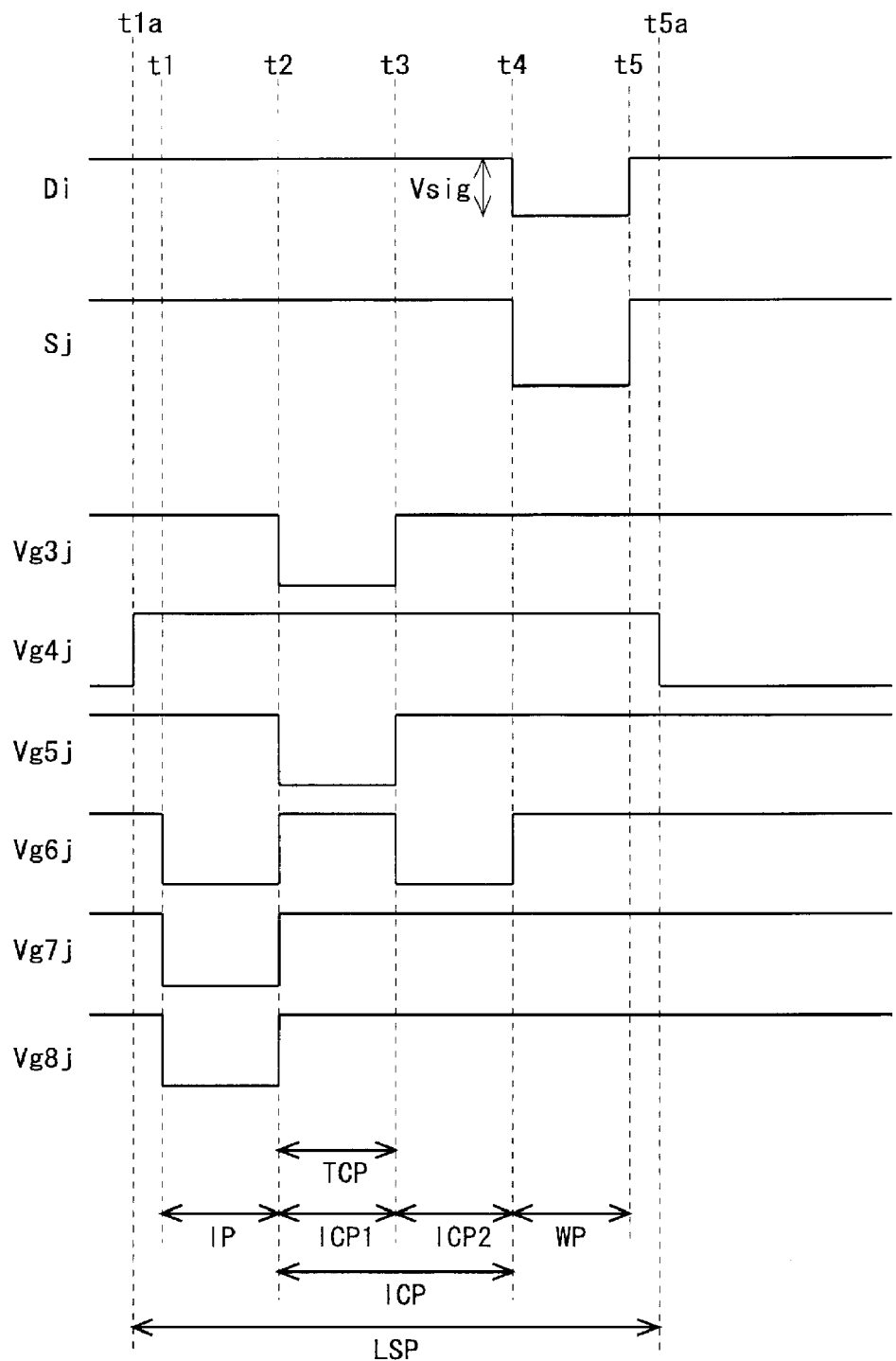
FIG. 20 is a timing chart showing a method of driving pixel circuits in Embodiment 8.

FIG. 20 is a timing chart showing a method of driving the pixel circuits 11 in the present embodiment. In the present embodiment, a time t1 a to t5a is a non-light emitting period LSP. The time t1 to t2 is the initializing period IP. The time t2 to t4 is the reverse direction compensation period ICP. The time t4 to t5 is the writing period WP. The time t2 to t3 is the first reverse direction compensation period ICP1 and the threshold voltage compensation period TCP. The time t3 to t4 is the second reverse direction compensation period ICP2. As shown in FIG. 20, the control lines Vg7j and Vg8j or Vg3j and Vg5j have the same change in potential as each other, and thus, these may respectively be consolidated to one control line. The operation during the time t1 a of the present embodiment is similar to that of Embodiment 5, and thus, descriptions thereof will be omitted.

Also, at the time t1, the potential of the control lines Vg6j to Vg8j changes from a high level to a low level, and thus, the transistors T6 to T8 turn ON. By turning ON the transistor T7, the first terminal and the second terminal of the capacitor C3 are connected to each other and the voltage stored in the capacitor C3 is initialized to 0V. Also, by turning ON the transistors T6 and T8, a short-circuit occurs between the first terminal of the capacitor C2 and the reverse bias power source line Vr. As a result, the voltage stored in the capacitor C2 is initialized to the potential difference of the high level power source potential Vdd and the reverse bias power source potential Vr, which are both fixed potentials. Initialization of the voltage stored in the capacitor C3 to 0V may be performed alone in the initializing period IP.

At the time t2, the potential of the control lines Vg6j and Vg8j changes from a low level to a high level, and the transistors T6 to T8 turn OFF. Thus, the initialization of the voltage stored in the capacitors C2 and C3 is completed. Also, at the time t2, the potential of the control line Vg5j changes from a high level to a low level, and thus, the transistor T5 turns ON. Therefore, the organic EL element OLED becomes reverse biased due to the low level power source potential Vss and the reverse bias power source potential Vr. The operation relating to reverse bias is similar to that of Embodiment 5, and thus, descriptions thereof are omitted. Also, at the time t2, the potential of the control line Vg3j changes from a high level to a low level, and thus, the transistor T3 turns ON. As a result, the gate terminal and the second conductive terminal of the transistor T2 are electrically connected to each other through the transistor T3 (forming a diode connection). As a result, during the threshold voltage compensation period TCP at the time t2 to t3, the threshold voltage VthT2 of the transistor T2 is written to the capacitor C2. As a result of the initialization above, a voltage having a more negative value than the threshold voltage VthT2 is stored in the capacitor C2 immediately before the time t2.

At the time t3, the potential of the control line Vg5j changes from a low level to a high level, and the transistor T5 turns OFF. Thus, reverse biasing of the organic EL element OLED ends. Also, at the time t3, the potential of the control line Vg3j changes from a low level to a high level, and the transistor T3 turns ON. As a result, the writing of the threshold voltage VthT2 of the transistor T2 to the capacitor C2 is completed. Also, at the time t3, the potential of the control line Vg6j changes from a high level to a low level, and thus, the transistor T6 turns ON. As a result, the compensation current I2 flows from the capacitor C2 towards the reverse bias power source line Vr. The operation relating to the compensation current I2 is similar to that of Embodiment 5, and thus, descriptions thereof are omitted. As a result of the compensation current I2 flowing, "VthT2+ΔVC2" is stored in the capacitor C2 immediately before the time t4.

At the time t4, the potential of the control line Vg6j changes from a low level to a high level, and the transistor T6 turns OFF. Thus, the flow of the compensation current I2 stops. Also, at the time t4, the potential of the scan wiring line Sj changes from a high level to a low level, and thus, the transistor T1 turns ON. Thus, the potential of the node N1 (gate potential of the transistor T2) is boosted by the capacitor C1, and thus, "Vsig+VthT2+ΔVC2" is written to the capacitor C2. Here, it is preferable that the capacitance value of the capacitor C1 be sufficiently larger than the capacitance value of the capacitor C2. In the present embodiment, such boosting results in the data voltage Vsig being supplied to the driving unit 102.

Also, at the time t5, the potential of the scan wiring line Sj changes from a low level to a high level, and thus, the transistor T1 turns OFF. Therefore, the supplying of the data voltage Vsig to the driving unit 102 is stopped.

At the time t5a, the potential of the control line Vg4*j* changes from a high level to a low level, and thus, the transistor T4 turns ON. "Vsig+VthT2+ΔVC2" is stored in the capacitor C2, or in other words, the drive voltage is determined by the data voltage Vsig in the driving unit 102, the threshold voltage VthT2 in the transistor T2, and the compensation change voltage ΔVC2, and thus, in the present embodiment, a drive current I1 determined by the following formula (10) is supplied to the organic EL element OLED.

$$I1=(\beta1/2)\cdot(Vsig+\Delta VC2) \tag{10}$$

Unlike the formula (9), the threshold voltage VthT2 is absent in formula (10). Thus, variation in the threshold voltage VthT2 of the transistor T2 is compensated.

<8.3 Effects>

According to the present embodiment, a transistor T3 that turns ON during the threshold voltage compensation period TCP is provided. As a result, during the threshold voltage compensation period TCP, the gate terminal and the second conductive terminal of the transistor T2 are electrically connected to each other through the transistor T3 (forming a diode connection). As a result, during the threshold voltage compensation period TCP, the threshold voltage VthT2 of the transistor T2 is written to the capacitor C2. Therefore, the threshold voltage VthT2 of the transistor T2 stored in the capacitor C2 is used to compensate for the variation in the threshold voltage VthT2 of the transistor T2.

Also, according to the present embodiment, during the initializing period IP, the transistors T6 and T8 turn ON. Thus, the first terminal of the capacitor C2 and the reverse bias power source line Vr are electrically connected to each other through the transistors T6 and T8. As a result, the voltage stored in the capacitor C2 is initialized to the potential difference of the high level power source potential Vdd and the reverse bias power source potential Vr, which are fixed potentials during the initializing period IP. Therefore, during the threshold voltage compensation period TCP, it is possible to stably write the threshold voltage VthT2 of the transistor T2 to the capacitor C2, and thus, it is possible to stably compensate for the variation in the threshold voltage VthT2 of the transistor T2.

In the present embodiment also, it is possible to turn ON the transistor T7 immediately after the second reverse direction compensation period ICP2 ends to initialize the voltage stored in the capacitor C3 to 0V, in a manner similar to the modification example of Embodiment 7. As a result, it is possible to mitigate fluctuation in threshold voltage in the transistor T9. Also, in the present embodiment, when turning ON both transistors T7 and T8 immediately after the second reverse direction compensation period ICP2 ends, the potential difference between the terminals of the transistor T9 becomes 9V, and thus, it is possible to further mitigate fluctuation in threshold voltage in the transistor T9.

9. Embodiment 9

<9.1 Configuration of Pixel Circuit>

Figure 21:
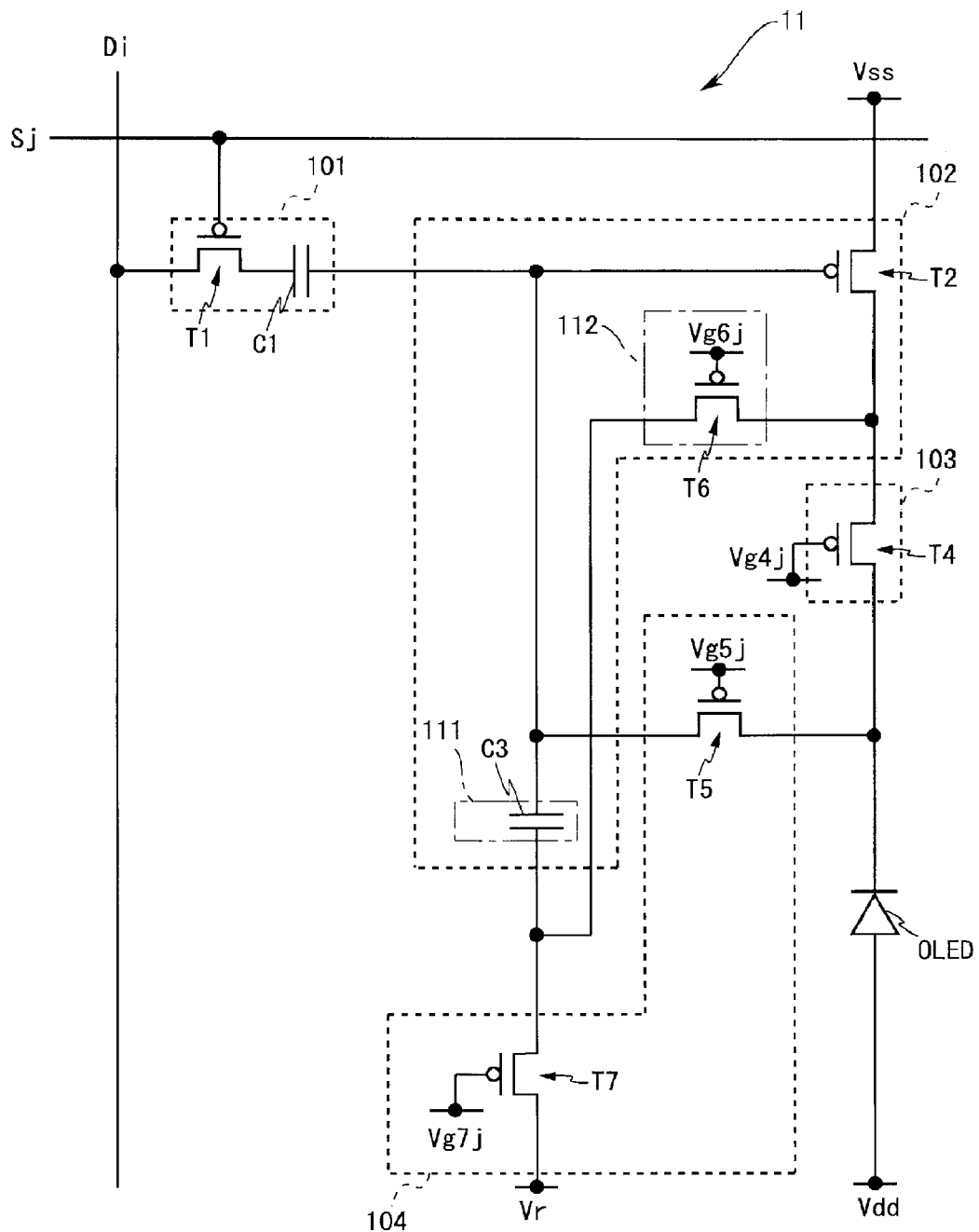
FIG. 21 is a circuit diagram showing a configuration of a pixel circuit of Embodiment 9 of the present invention.

FIG. 21 is a circuit diagram showing a configuration of a pixel circuit 11 of Embodiment 9 of the present invention. Components of the present embodiment that are the same as those of Embodiment 1 are assigned the same reference characters with descriptions thereof being omitted as appropriate. As shown in FIG. 21, in the present embodiment, the connective relations of some of the components are modified from those of Embodiment 1. Also, in the present embodiment, unlike the embodiments above, the high level power source line Vdd is the second power source line, and the low level power source line Vss is the first power source line, and the size relations of the high level power source potential Vdd, the low level power source potential Vss, and the reverse bias power source potential Vr are represented in the following formula (11).

$$Vr>Vdd>Vss \tag{11}$$

The gate terminal of the transistor T2 is connected to a second terminal of the capacitor C3, and the second conductive terminal of the transistor T2 is connected to the low level power source line Vss. The gate terminal of the transistor T4 is connected to the control line Vg4*j*, and the transistor T4 is provided between the first conductive terminal of the transistor T2 and the negative terminal of the organic EL element OLED. The gate terminal of the transistor T5 is connected to the control line Vg5*j*, and the transistor T5 is provided between the negative terminal of the organic EL element OLED and the second terminal of the capacitor C3. The gate terminal of the transistor T6 is connected to a control line Vg6*j*, and is provided between the first terminal of the capacitor C3 and the first conductive terminal of the transistor T2. The gate terminal of the transistor T7 is connected to a control line Vg7*j*, and is provided between the first terminal of the capacitor C3 and the reverse bias power source line Vr. The connective relations of the input unit 101 are similar to those of Embodiment 1, and thus, descriptions thereof are omitted.

<9.2 Operation>

Figure 22:
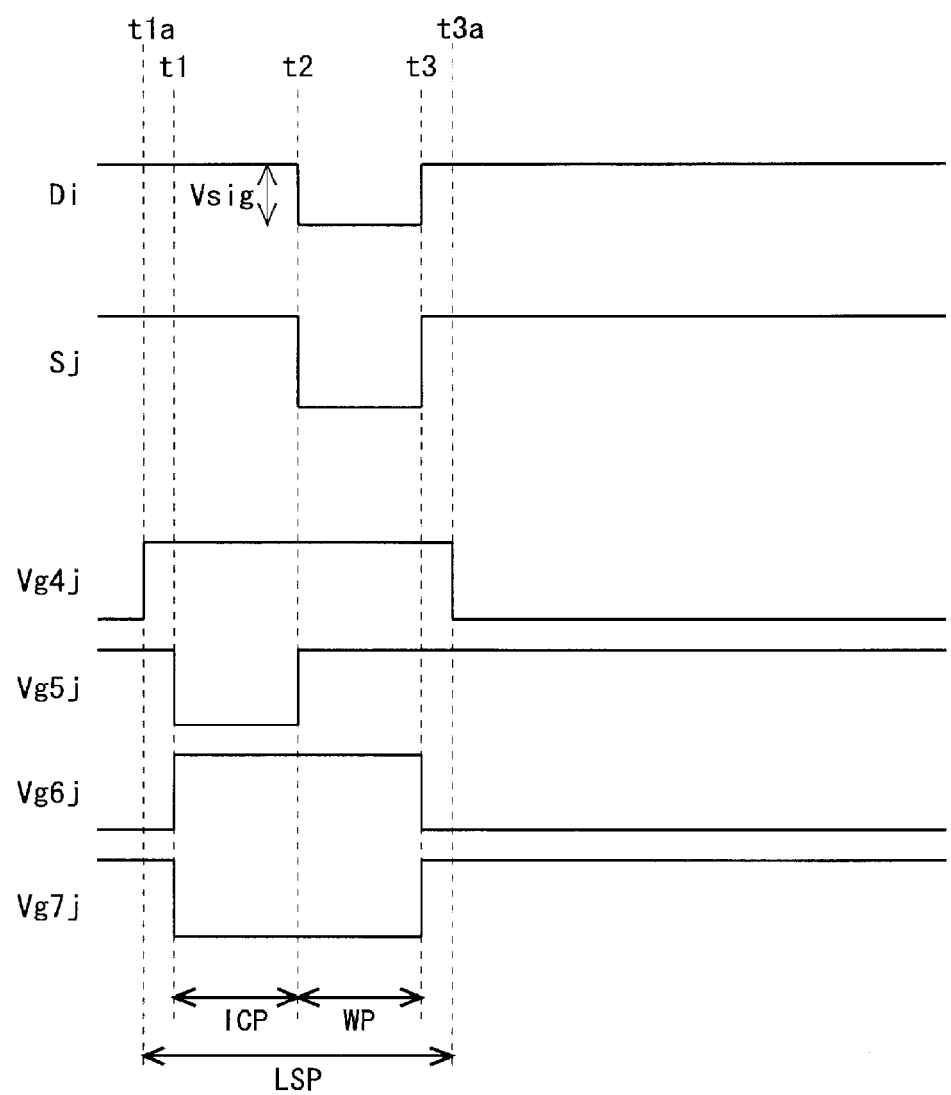
FIG. 22 is a timing chart showing a method of driving pixel circuits in Embodiment 9.

FIG. 22 is a timing chart showing a method of driving the pixel circuits 11 in the present embodiment. In the present embodiment, a time t1 a to t3a is a non-light emitting period LSP. The time period t1 to t2 is a reverse direction compensation period ICP, and the time period t2 to t3 is a writing period WP.

At time t1a, the potential of the control line Vg4*j* changes from a low level to a high level. Thus, the transistor T4 turns OFF, and the first conductive terminal of the transistor T2 is electrically separated from the negative terminal of the organic EL element OLED. Thus, the organic EL element OLED stops emitting light.

At the time t1, the potential of the control line Vg6*j* changes from a low level to a high level, and the transistor T6 turns OFF. As a result, the first conductive terminal of the transistor T2 is electrically disconnected from the first terminal of the capacitor C3. Also, at the time t1, the potential of the control lines Vg5*j* and Vg7*j* changes from a high level to a low level, and thus, the transistors T5 and T7 turn ON. Therefore, the organic EL element OLED becomes reverse biased due to the reverse bias power source potential Vr and the high level power source potential Vdd. As a result, similar to Embodiment 1, a reverse direction voltage Voledr is written to the capacitor C3.

At the time t2, the potential of the control line Vg5j changes from a low level to a high level, and the transistor T5 turns OFF. Thus, reverse biasing of the organic EL element OLED ends. By maintaining the transistor T7 in the ON state, the reverse bias power source potential Vr is applied to the first terminal of the capacitor C3. Also, at the time t2, the potential of the scan wiring line Sj changes from a high level to a low level, and thus, the transistor T1 turns ON. Therefore, the second terminal (gate potential of the transistor T2) of the capacitor C3 is boosted through the capacitor C1, and thus, "Vsig+Voledr" is written to the capacitor C3 in a manner similar to Embodiment 1.

Also, at the time t3, the potential of the control line Vg6j changes from a high level to a low level, and thus, the transistor T6 turns ON. Thus, the capacitor C3 electrically connects the gate terminal and the first conductive terminal of the transistor T2. Also, at the time t3, the potential of the control line Vg7j changes from a low level to a high level, and the transistor T7 turns ON. As a result, the first terminal of the capacitor C3 and the reverse bias power source line Vr are electrically disconnected from each other. Also, at the time t3, the potential of the scan wiring line Sj changes from a low level to a high level, and thus, the transistor T1 turns OFF. Therefore, the supplying of the data voltage Vsig to the driving unit 102 is stopped.

At the time t3a, the potential of the control line Vg4j changes from a high level to a low level, and thus, the transistor T4 turns ON. As a result, in a manner similar to Embodiment 1, the organic EL element OLED is lit according to the value of the drive current I1, which becomes larger as deterioration of the organic EL element OLED progresses over time.

<9.3 Effects>

According to the present embodiment, effects similar to Embodiment 1 can be attained using the high level power source potential Vdd, the low level power source potential Vss, and the reverse bias power source potential Vr determined in the formula (11) above.

10. Embodiment 10

<10.1 Configuration of Pixel Circuit>

Figure 23:
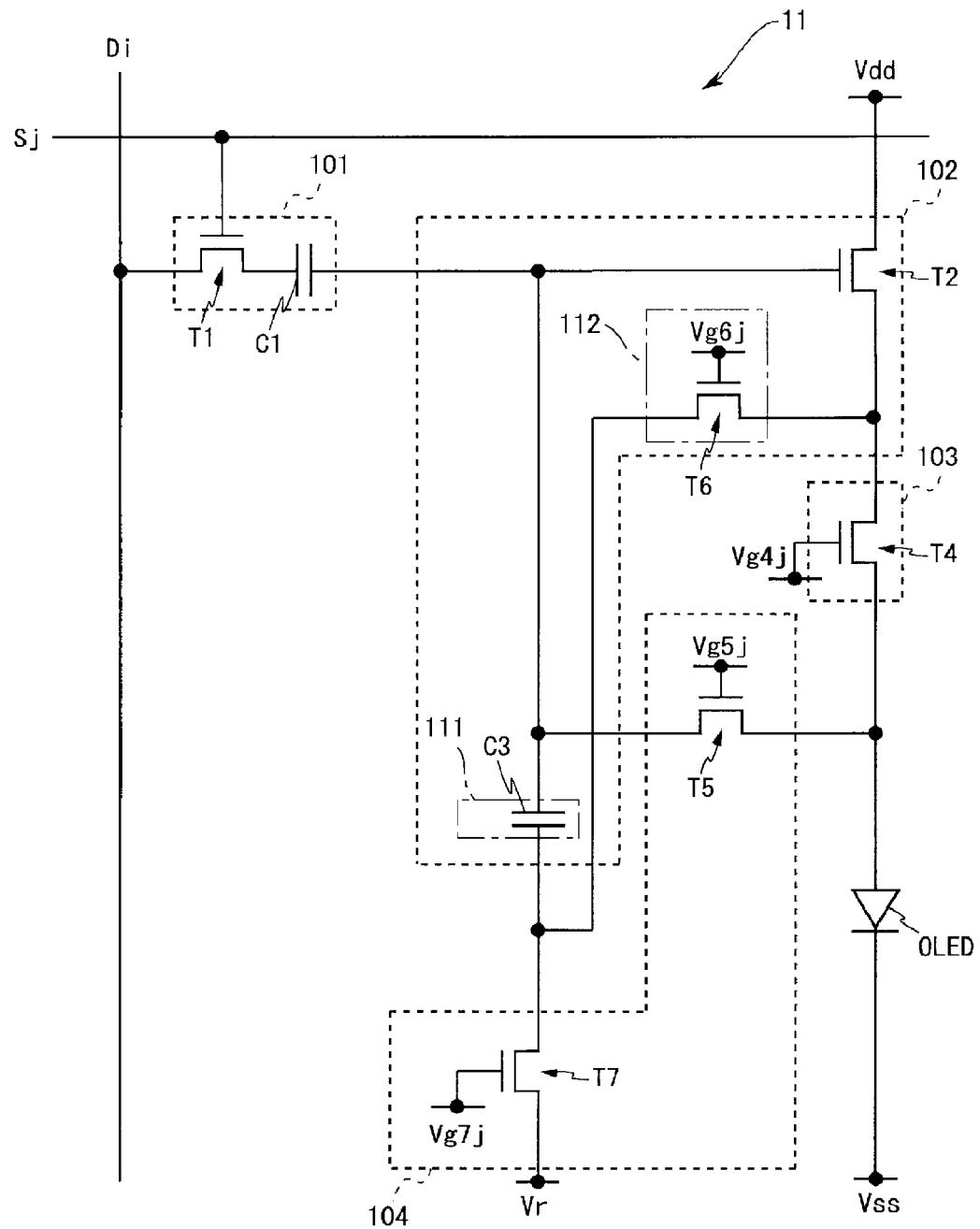
FIG. 23 is a circuit diagram showing a configuration of a pixel circuit of Embodiment 10 of the present invention.

FIG. 23 is a circuit diagram showing a configuration of a pixel circuit 11 of Embodiment 10 of the present invention. Components of the present embodiment that are the same as those of Embodiment 1 are assigned the same reference characters with descriptions thereof being omitted as appropriate. As shown in FIG. 23, in the present embodiment, the connective relations of some of the components are modified from Embodiment 1, and the conductive type of the transistors T1, T2, and T4 to T7 is modified to the n-channel type. Also, in the present embodiment, similar to Embodiment 1, the high level power source line Vdd is the first power source line and the low level power source line Vss is the second power source line, and the size relations of the high level power source potential Vdd, the low level power source potential Vss, and the reverse bias power source potential Vr are shown in formula (2) above.

The gate terminal of the transistor T2 is connected to a second terminal of the capacitor C3, and the second conductive terminal of the transistor T2 is connected to the high level power source line Vdd. The gate terminal of the transistor T4 is connected to the control line Vg4j, and the transistor T4 is provided between the first conductive terminal of the transistor T2 and the positive terminal of the organic EL element OLED. The gate terminal of the transistor T5 is connected to the control line Vg5j, and the transistor T5 is provided between the positive terminal of the organic EL element OLED and the second terminal of the capacitor C3. The gate terminal of the transistor T7 is connected to a control line Vg7j, and is provided between the first terminal of the capacitor C3 and the reverse bias power source line Vr. The connective relations of the input unit 101 are similar to those of Embodiment 1, and thus, descriptions thereof are omitted.

<10.2 Operation>

Figure 24:
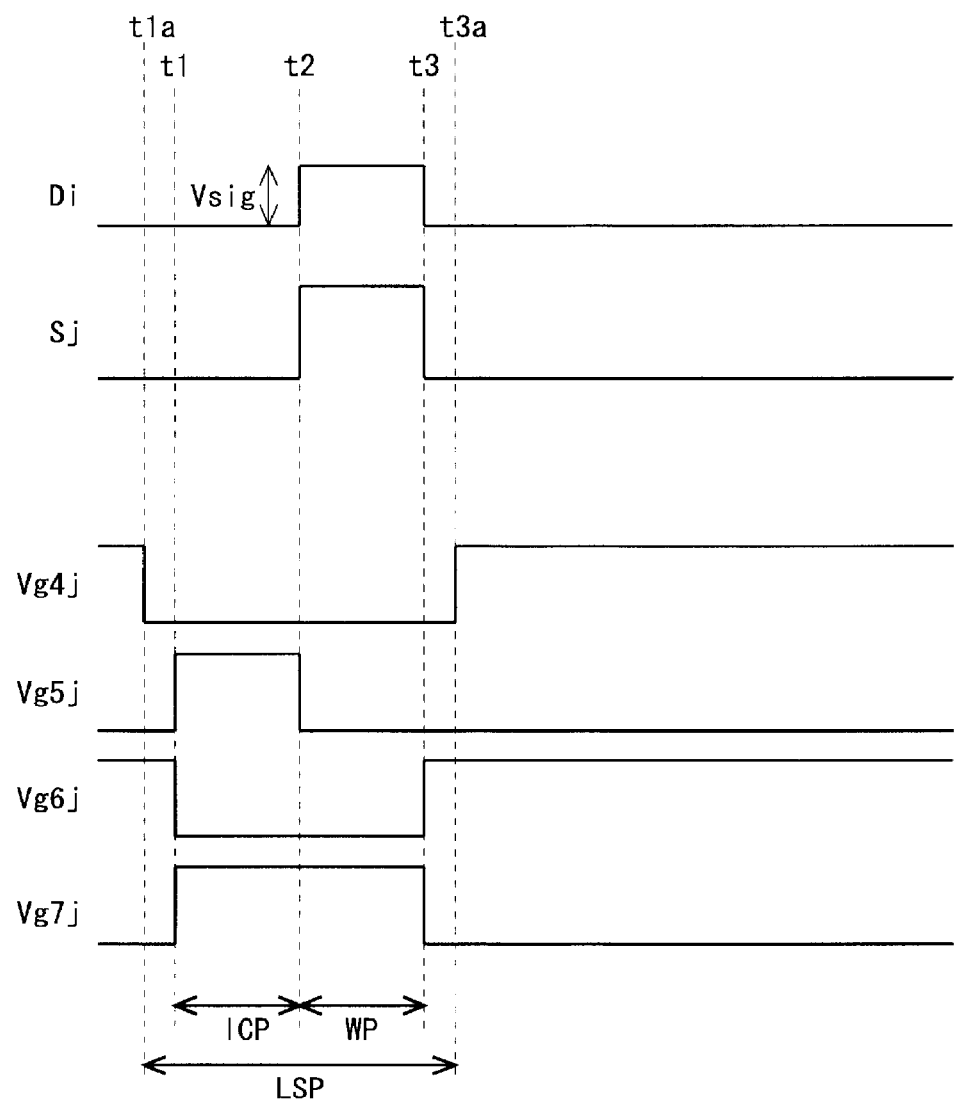
FIG. 24 is a timing chart showing a method of driving pixel circuits in Embodiment 10.

FIG. 24 is a timing chart showing a method of driving the pixel circuits 11 in the present embodiment. In the present embodiment, a time t1a to t3a is a non-light emitting period LSP. The time period t1 to t2 is a reverse direction compensation period ICP, and the time period t2 to t3 is a writing period WP.

At time t1a, the potential of the control line Vg4j changes from a high level to a low level. Thus, the transistor T4 turns OFF, and the first conductive terminal of the transistor T2 is electrically separated from the positive terminal of the organic EL element OLED. Thus, the organic EL element OLED stops emitting light.

Also, at the time t1, the potential of the control line Vg6j changes from a high level to a low level, and thus, the transistor T6 turns OFF. As a result, the first conductive terminal of the transistor T2 is electrically disconnected from the first terminal of the capacitor C3. Also, at the time t1, the potential of the control lines Vg5j and Vg7j changes from a low level to a high level, and thus, the transistors T5 and T7 turn ON. Therefore, the organic EL element OLED becomes reverse biased due to the low level power source potential Vss and the reverse bias power source potential Vr. As a result, similar to Embodiment 1, a reverse direction voltage Voledr is written to the capacitor C3.

Also, at the time t2, the potential of the control line Vg5j changes from a high level to a low level, and thus, the transistor T5 turns OFF. Thus, reverse biasing of the organic EL element OLED ends. By maintaining the transistor T7 in the ON state, the reverse bias power source potential Vr is applied to the first terminal of the capacitor C3. Also, at the time t2, the potential of the scan wiring line Sj changes from a low level to a high level, and thus, the transistor T1 turns ON. Therefore, the second terminal (gate potential of the transistor T2) of the capacitor C3 is boosted through the capacitor C1, and thus, "Vsig+Voledr" is written to the capacitor C3 in a manner similar to Embodiment 1.

At the time t3, the potential of the control line Vg6j changes from a low level to a high level, and the transistor T6 turns ON. Thus, the capacitor C3 electrically connects the gate terminal and the first conductive terminal of the transistor T2. Also, at the time t3, the potential of the control line Vg7j changes from a high level to a low level, and thus, the transistor T7 turns OFF. As a result, the first terminal of the capacitor C3 and the reverse bias power source line Vr are electrically disconnected from each other. Also, at the time t3, the potential of the scan wiring line Sj changes from a high level to a low level, and thus, the transistor T1 turns OFF. Therefore, the supplying of the data voltage Vsig to the driving unit 102 is stopped.

At the time t3a, the potential of the control line Vg4j changes from a low level to a high level, and the transistor T4 turns ON. As a result, in a manner similar to Embodiment 1, the organic EL element OLED is lit according to the value of the drive current I1, which becomes larger as deterioration of the organic EL element OLED progresses over time.

<10.3 Effects>

According to the present embodiment, it is possible to attain effects similar to those of Embodiment 1 using an n-channel type transistor.

11. Embodiment 11

<11.1 Configuration of Pixel Circuit>

Figure 25:
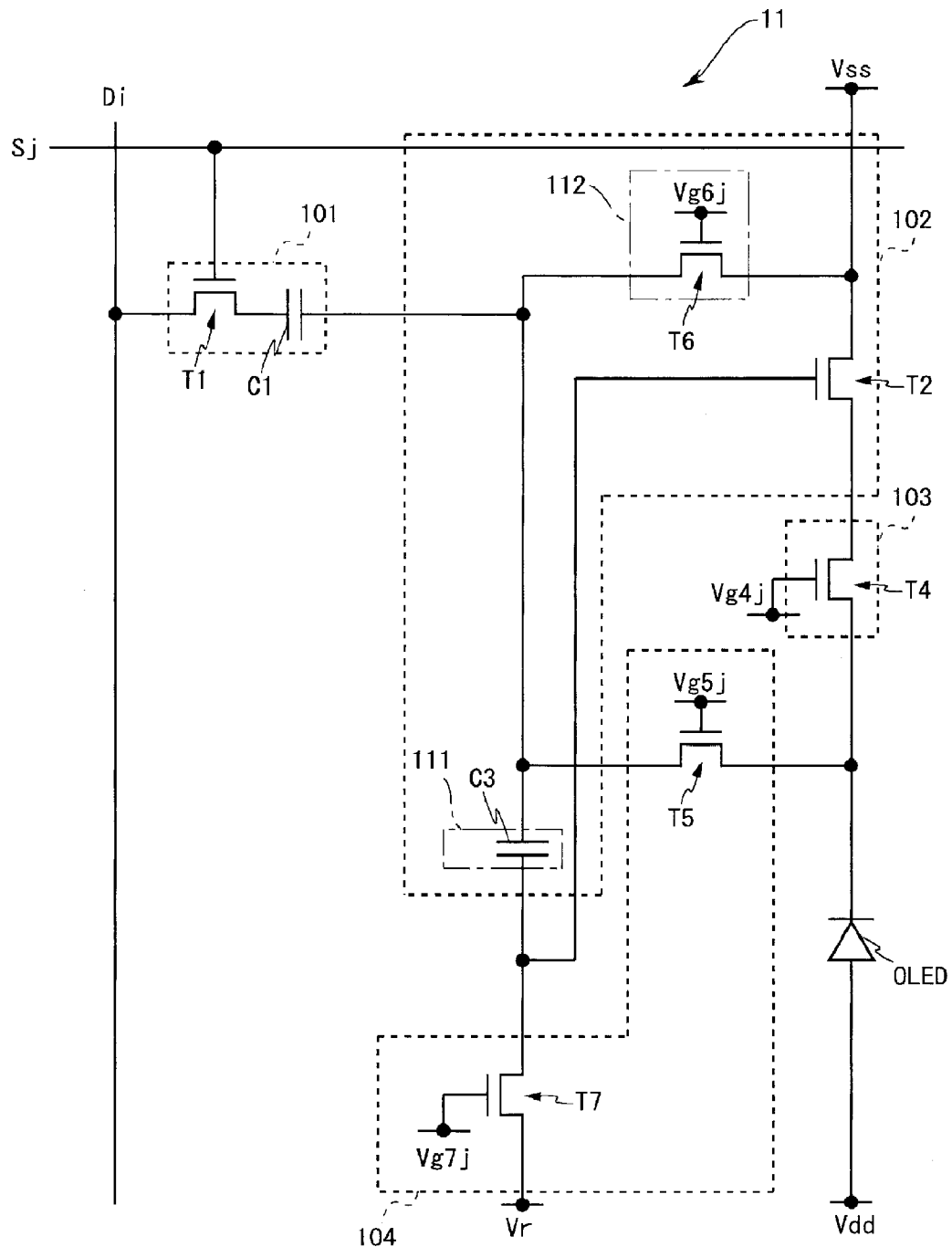
FIG. 25 is a circuit diagram showing a configuration of a pixel circuit of Embodiment 11 of the present invention.

FIG. 25 is a circuit diagram showing a configuration of a pixel circuit 11 of Embodiment 11 of the present invention. Components of the present embodiment that are the same as those of Embodiment 1 are assigned the same reference characters with descriptions thereof being omitted as appropriate. In the present embodiment, the connective relations of some of the components are modified from those of Embodiment 10. Also, in the present embodiment, similar to Embodiment 9, the high level power source line Vdd is the first power source line and the low level power source line Vss is the second power source line, and the size relations of the high level power source potential Vdd, the low level power source potential Vss, and the reverse bias power source potential Vr are shown in formula (11) above.

The gate terminal of the transistor T2 is connected to a second terminal of the capacitor C3, and the first conductive terminal of the transistor T2 is connected to the low level power source line Vss. The gate terminal of the transistor T4 is connected to the control line Vg4j, and the transistor T4 is provided between the second conductive terminal of the transistor T2 and the negative terminal of the organic EL element OLED. The gate terminal of the transistor T5 is connected to the control line Vg5j, and the transistor T5 is provided between the negative terminal of the organic EL element OLED and the first terminal of the capacitor C3. The gate terminal of the transistor T6 is connected to a control line Vg6j, and is provided between the first terminal of the capacitor C3 and the first conductive terminal of the transistor T2. The gate terminal of the transistor T7 is connected to a control line Vg7j, and is provided between the second terminal of the capacitor C3 and the reverse bias power source line Vr. The connective relations of the input unit 101 are similar to those of Embodiment 1, and thus, descriptions thereof are omitted.

<11.2 Operation>

Figure 26:
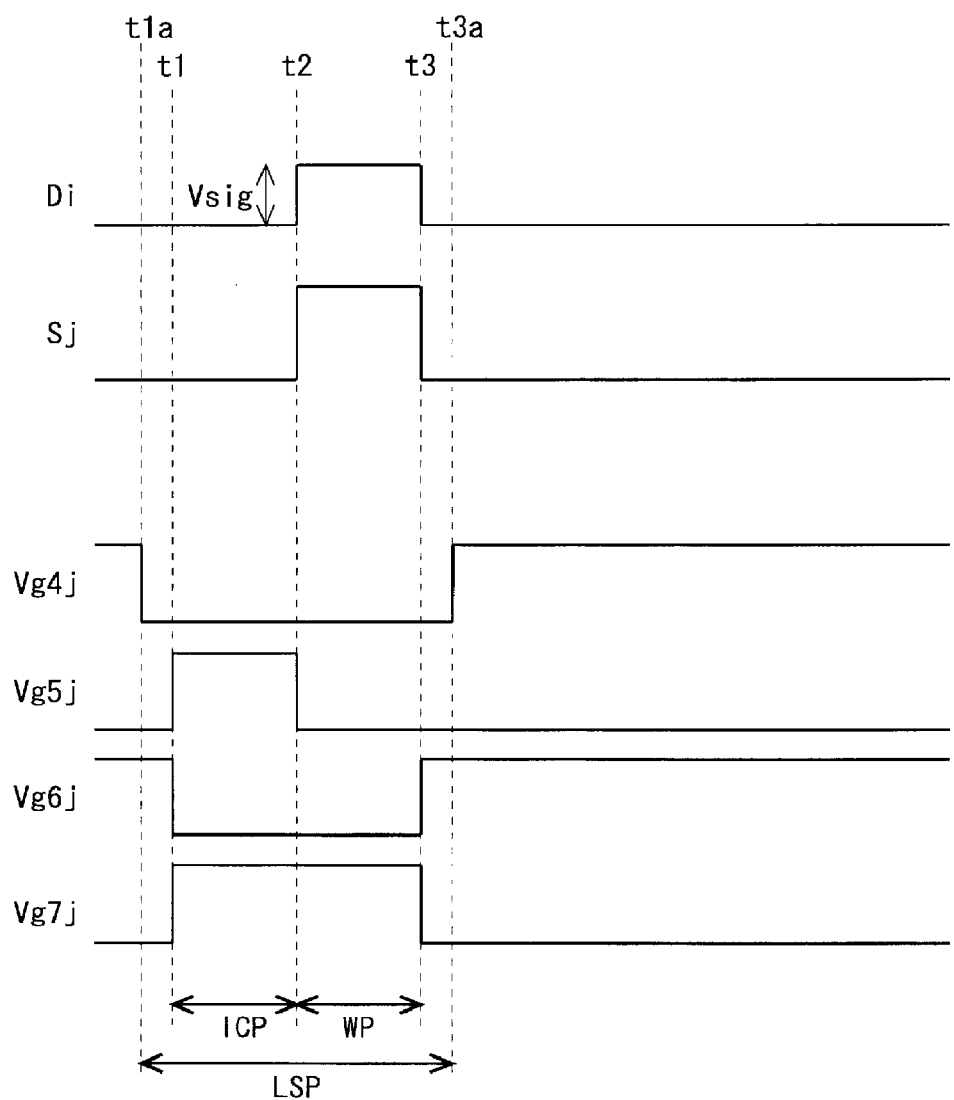
FIG. 26 is a timing chart showing a method of driving pixel circuits in Embodiment 11.

FIG. 26 is a timing chart showing a method of driving the pixel circuits 11 in the present embodiment. As shown in FIG. 26, the timing chart of the present embodiment is similar to that of Embodiment 10 (see FIG. 24).

At time t1a, the potential of the control line Vg4j changes from a high level to a low level. Thus, the transistor T4 turns OFF, and the second conductive terminal of the transistor T2 is electrically separated from the negative terminal of the organic EL element OLED. Thus, the organic EL element OLED stops emitting light. The operation during the time t2 to t3a is similar to that of Embodiment 10, and thus, descriptions thereof are omitted.

Also, at the time t1, the potential of the control line Vg6j changes from a high level to a low level, and thus, the transistor T7 turns OFF. As a result, the first conductive terminal of the transistor T2 is electrically disconnected from the first terminal of the capacitor C3. Also, at the time t1, the potential of the control lines Vg5j and Vg7j changes from a low level to a high level, and thus, the transistors T5 and T7 turn ON. Therefore, the organic EL element OLED becomes reverse biased due to the reverse bias power source potential Vr and the high level power source potential Vdd. As a result, similar to Embodiment 1, a reverse direction voltage Voledr is written to the capacitor C3.

<11.3 Effects>

According to the present embodiment, effects similar to Embodiment 1 can be attained using the high level power source potential Vdd, the low level power source potential Vss, and the reverse bias power source potential Vr, and additionally using an n-channel transistor.

12. Embodiment 12

<12.1 Configuration of Pixel Circuit>

Figure 27:
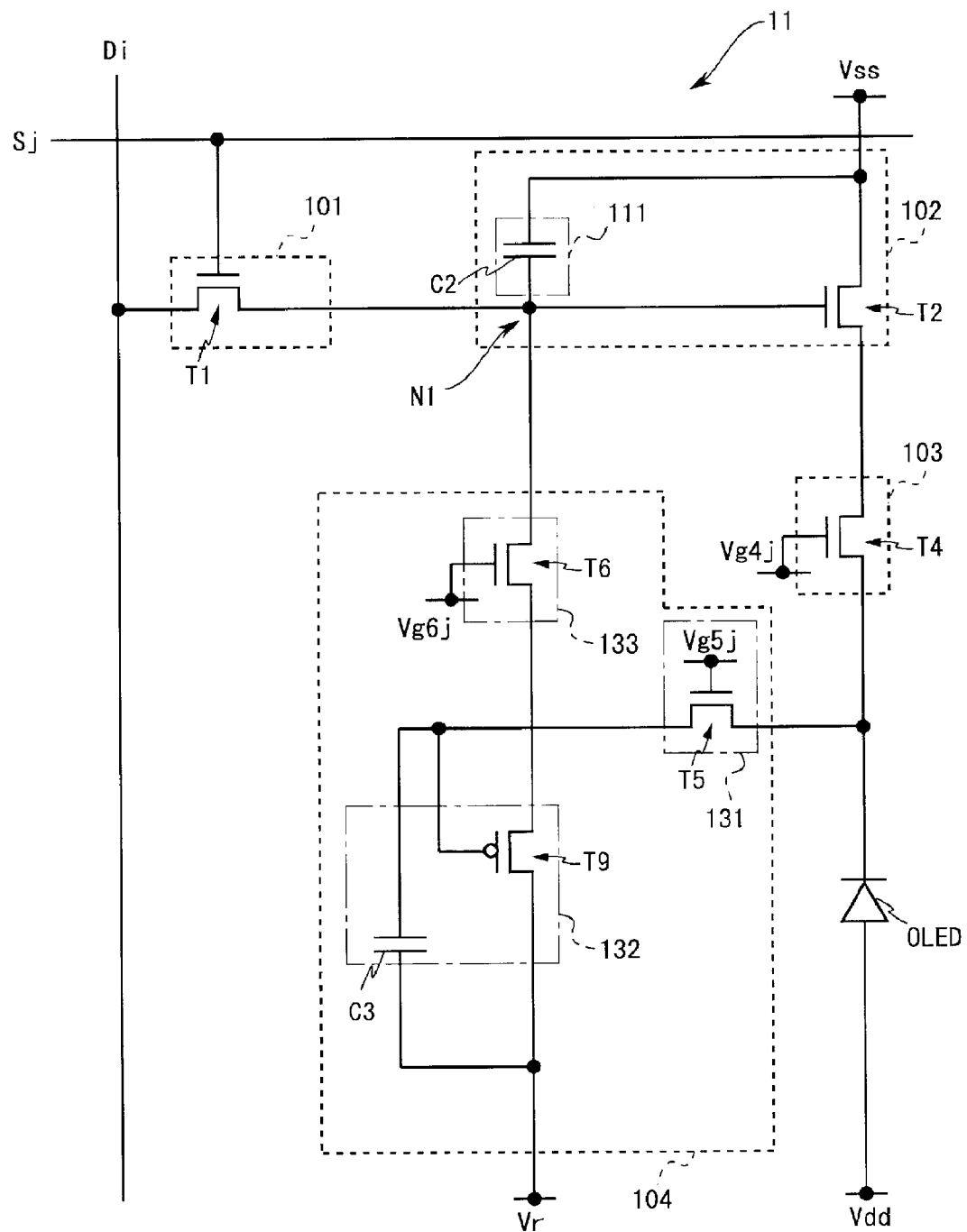
FIG. 27 is a circuit diagram showing a configuration of a pixel circuit of Embodiment 12 of the present invention.

FIG. 27 is a circuit diagram showing a configuration of a pixel circuit 11 of Embodiment 12 of the present invention. Components of the present embodiment that are the same as those of Embodiment 5 are assigned the same reference characters with descriptions thereof being omitted as appropriate. As shown in FIG. 27, in the present embodiment, the connective relations of some of the components are modified from Embodiment 5, and the conductive type of the transistors T1, T2, and T4 to T6 is modified to the n-channel type, and the conductive type of the transistor T9 is modified to the p-channel type. Also, in the present embodiment, similar to Embodiment 9, the high level power source line Vdd is the first power source line and the low level power source line Vss is the second power source line, and the size relations of the high level power source potential Vdd, the low level power source potential Vss, and the reverse bias power source potential Vr are shown in formula (11) above.

The gate terminal of the transistor T2 is connected to a second conductive terminal of the transistor T1, and the first conductive terminal of the transistor T2 is connected to the low level power source line Vss. The gate terminal of the transistor T4 is connected to the control line Vg4j, and the transistor T4 is provided between the second conductive terminal of the transistor T2 and the negative terminal of the organic EL element OLED. The gate terminal of the transistor T5 is connected to the control line Vg5j, and the first conductive terminal of the transistor T5 is connected to the negative terminal of the organic EL element OLED. The connective relations of other components are similar to those of Embodiment 5, and thus, descriptions thereof are omitted.

The reverse direction current compensation unit 104 of the present embodiment causes the voltage stored in the capacitor C2 to change by causing a compensation current I2 to flow from the reverse bias power source line Vr to the capacitor C2 during the second compensation period ICP2, the compensation current I2 being determined based on the reverse direction current Ioledr. This signifies that the compensation signal based on the reverse direction current Ioledr is supplied to the capacitor C2. This also means that a voltage based on the reverse direction current Ioledr (amount of fluctuation in voltage) is supplied to the capacitor C2. Also, it can be said that in the present embodiment, the voltage based on the reverse direction current Ioledr supplied to the capacitor C2 is the voltage based on the compensation current I2.

<12.2 Operation>

Figure 28:
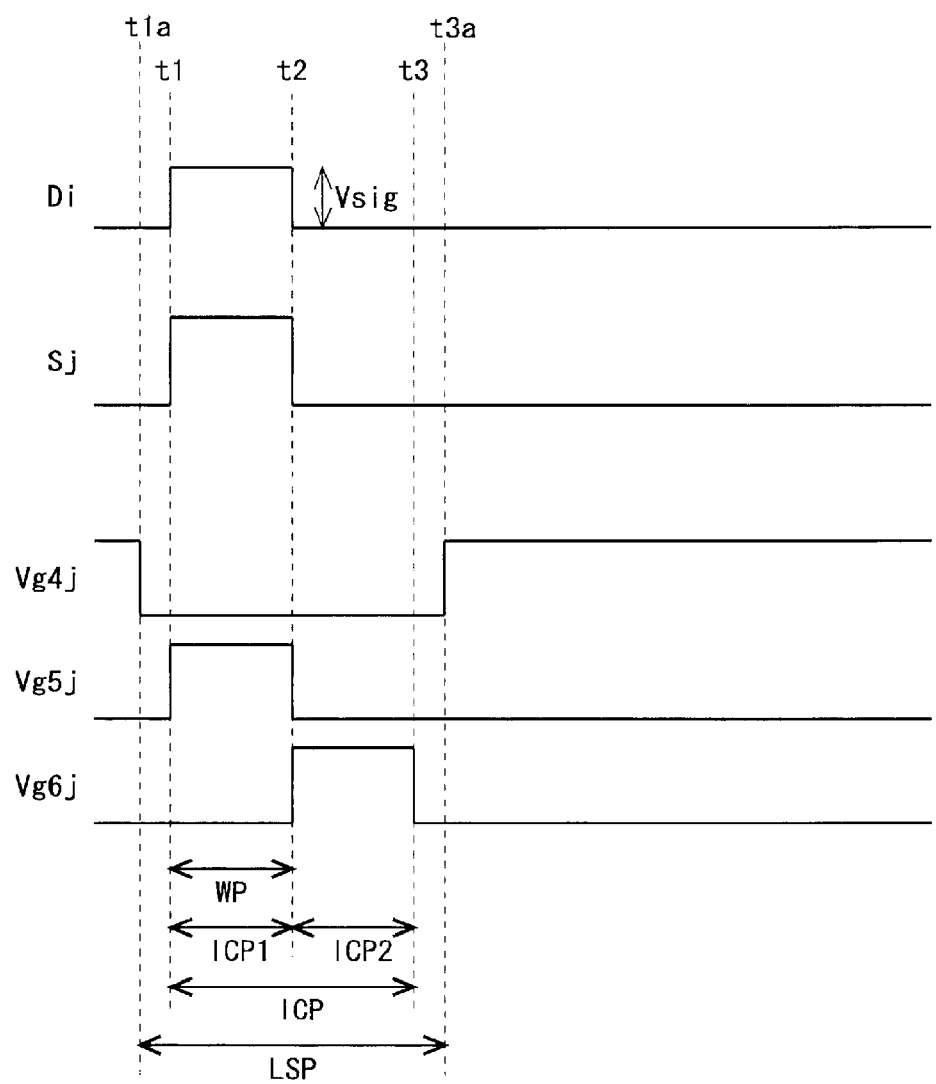
FIG. 28 is a timing chart showing a method of driving pixel circuits in Embodiment 12.

FIG. 28 is a timing chart showing a method of driving the pixel circuits 11 in the present embodiment. As shown in FIG. 28, the timing chart in the present embodiment shows the high level and the low level reversed from the timing chart in Embodiment 5 (see FIG. 13).

At time t1a, the potential of the control line Vg4j changes from a high level to a low level. Thus, the transistor T4 turns OFF, and the second conductive terminal of the transistor T2 is electrically separated from the negative terminal of the organic EL element OLED. Thus, the organic EL element OLED stops emitting light.

At the time t1, the potential of the scan wiring line Sj changes from a low level to a high level, and thus, the transistor T1 turns ON. Thus, the voltage Vsig (data voltage) of the data signal supplied from the data wiring line Di is written to the capacitor C2. Also, at the time t1, the potential of the control line Vg5j changes from a low level to a high level, and the transistor T5 turns ON. Therefore, the organic EL element OLED becomes reverse biased due to the reverse bias power source potential Vr and the high level power source potential Vdd. As a result, the reverse direction current Ioledr flowing through the organic EL element OLED is supplied to the capacitor C3, and a reverse direction voltage Voledr is written to the capacitor C3. The reverse bias power source potential Vr in the present embodiment must satisfy the following formula (12) in addition to the formula (11) above.

$$|Vdd-Vr|>|VthT9| \quad (12)$$

Also, at the time t2, the potential of the scan wiring line Sj changes from a high level to a low level, and thus, the transistor T1 turns OFF. Thus, the writing of the data voltage Vsig to the capacitor C2 ends. Also, at the time t2, the potential of the control line Vg5j changes from a high level to a low level, and thus, the transistor T5 turns OFF. Thus, reverse biasing of the organic EL element OLED ends. Also, at the time t2, the potential of the control line Vg6j changes from a low level to a high level, and the transistor T6 turns ON. As a result, the compensation current I2 flows from the reverse bias power source line Vr towards the capacitor C2. During the period of the time t2 to t3 (period tc), it is preferable that the difference between the potential of the node N1 and the reverse bias power source potential Vr be such that the transistor T9 operates in a saturation region. As a result, the compensation current I2 is at a value based on the reverse direction voltage Voledr stored in the capacitor C3 according to formula (7) above. During the period tc, the first and second conductive terminals of the transistor T9 respectively function as the source terminal and the drain terminal. As a result of the compensation current I2 flowing during the period tc, the drive voltage stored in the capacitor C2 changes by ΔVC2 attained in formula (8) above in a manner similar to Embodiment 5.

Also, at the time t3, the potential of the control line Vg6j changes from a high level to a low level, and thus, the transistor T6 turns OFF. Thus, the flow of the compensation current I2 stops.

At the time t3a, the potential of the control line Vg4j changes from a low level to a high level, and the transistor T4 turns ON. Therefore, the drive current I1 determined by formula (9) above is fed to the organic EL element OLED, and the organic EL element OLED emits light based on the value of the drive current I1.

<12.3 Effects>

According to the present embodiment, effects similar to Embodiment 5 can be attained using the high level power source potential Vdd, the low level power source potential Vss, and the reverse bias power source potential Vr, and additionally using n-channel transistors T1, T2, and T4 to T6 and a p-channel transistor T9.

13. Embodiment 13

<13.1 Configuration of Pixel Circuit>

Figure 29:
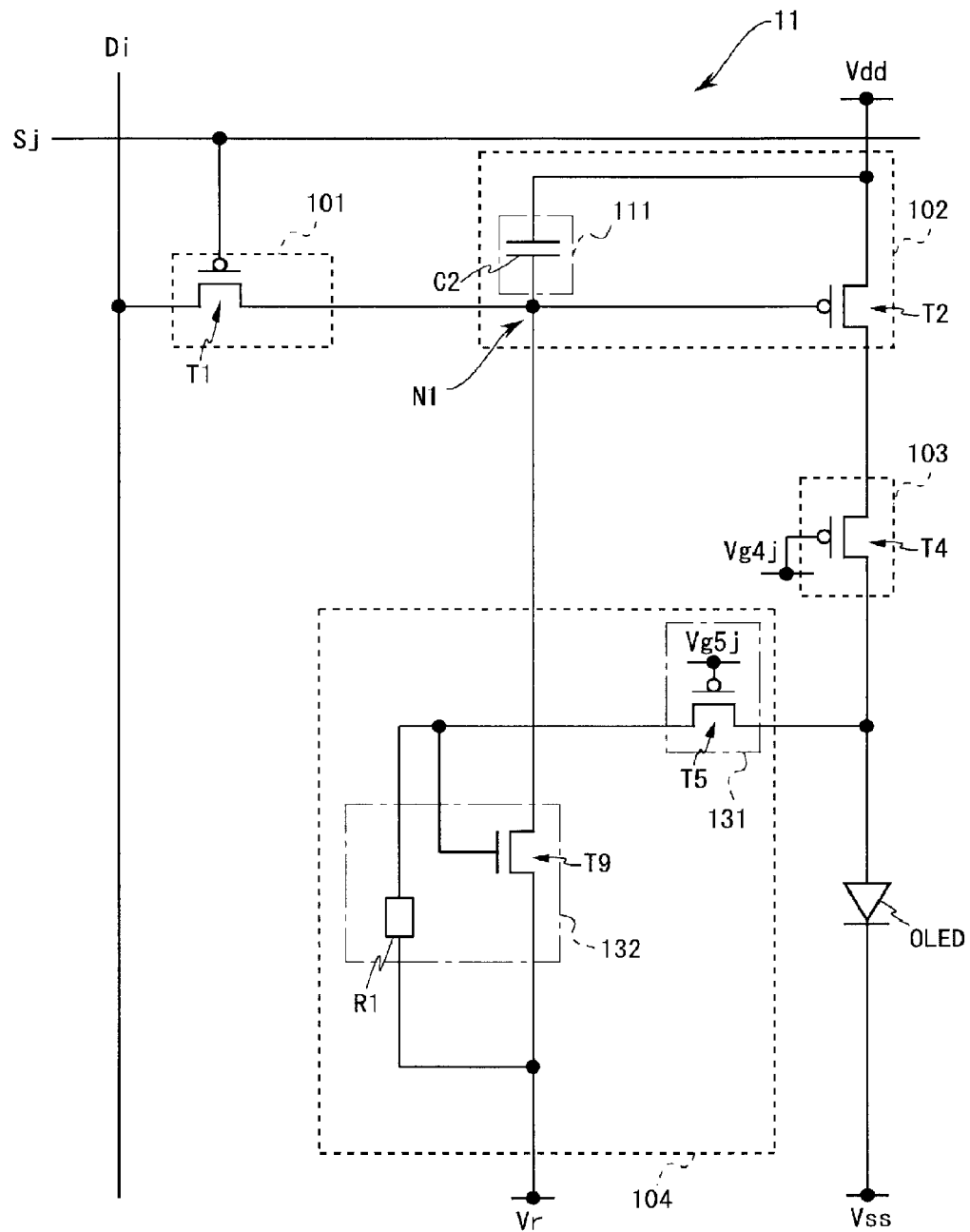
FIG. 29 is a circuit diagram showing a configuration of a pixel circuit of Embodiment 13 of the present invention.

FIG. 29 is a circuit diagram showing a configuration of a pixel circuit 11 of Embodiment 13 of the present invention. Components of the present embodiment that are the same as those of Embodiment 5 are assigned the same reference characters with descriptions thereof being omitted as appropriate. As shown in FIG. 29, in the present embodiment, a resistor R1 is used instead of the capacitor C3 in Embodiment 5, and the second compensation current control unit 133 (transistor T6) is omitted. The resistor R1 is provided between the gate terminal and the first conductive terminal of the transistor T9. Also, in the present embodiment, similar to Embodiment 5, the high level power source line Vdd is the first power source line and the low level power source line Vss is the second power source line, and the size relations of the high level power source potential Vdd, the low level power source potential Vss, and the reverse bias power source potential Vr are shown in formula (2) above.

<13.2 Operation>

Figure 30:
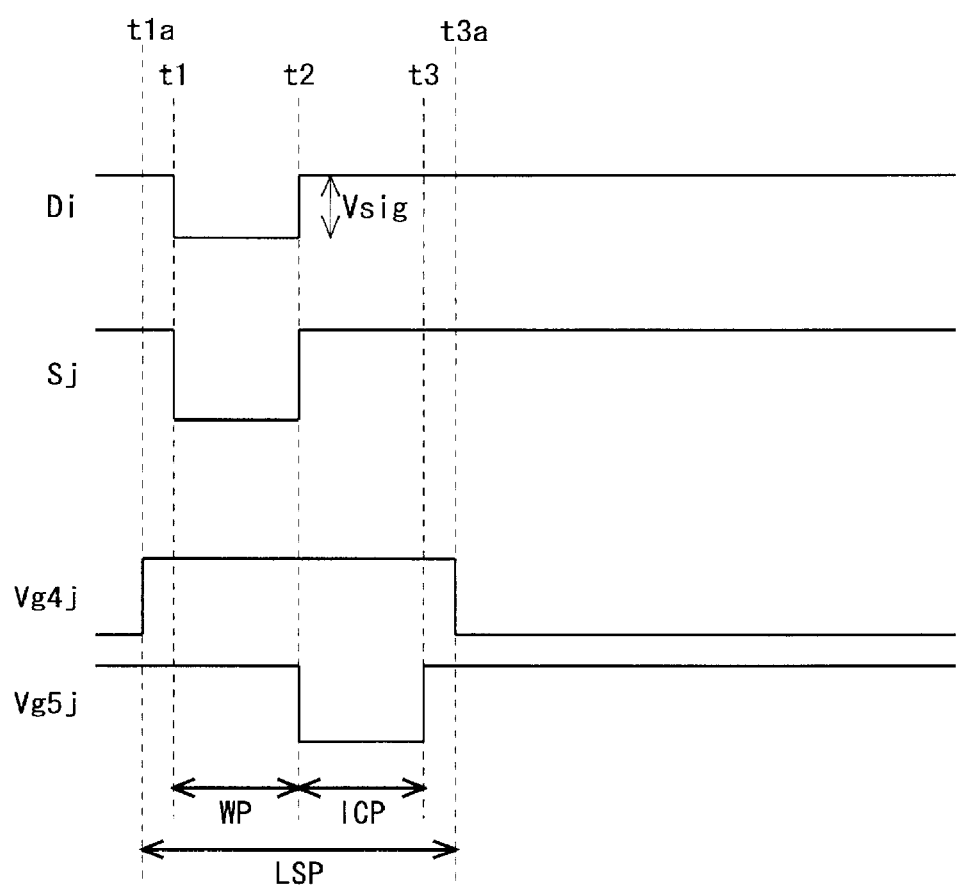
FIG. 30 is a timing chart showing a method of driving pixel circuits in Embodiment 13.
Figure 31:
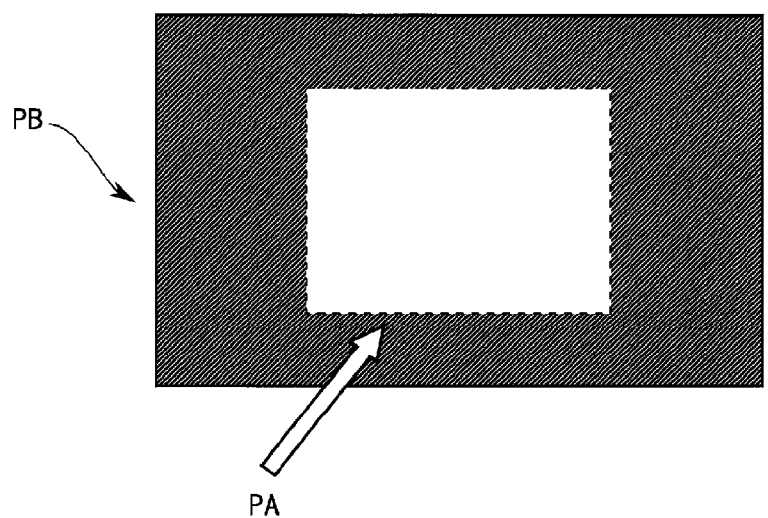
FIG. 31 is a drawing for describing the effect that deterioration over time of the organic EL elements has on image display.
Figure 31:
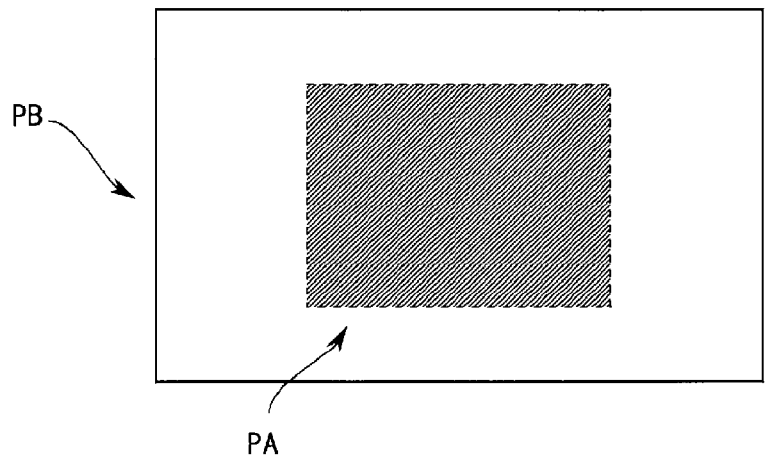
Figure 32:
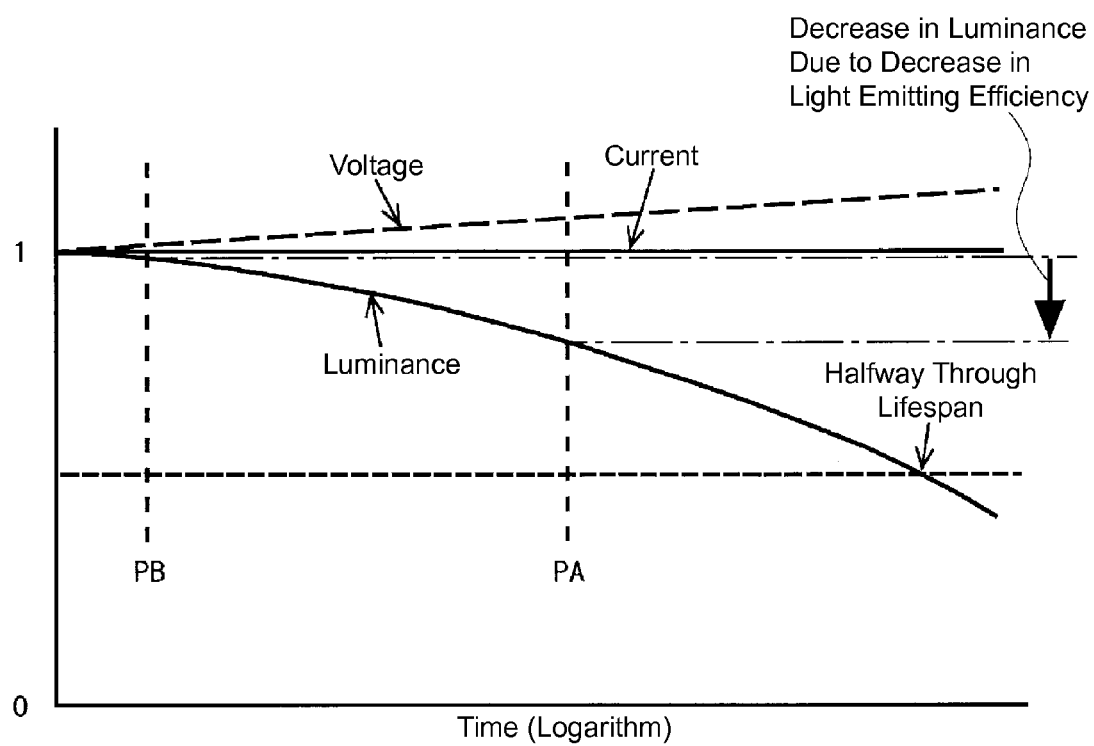
FIG. 32 is a drawing for describing the decrease in luminance of the organic EL elements.
Figure 33:
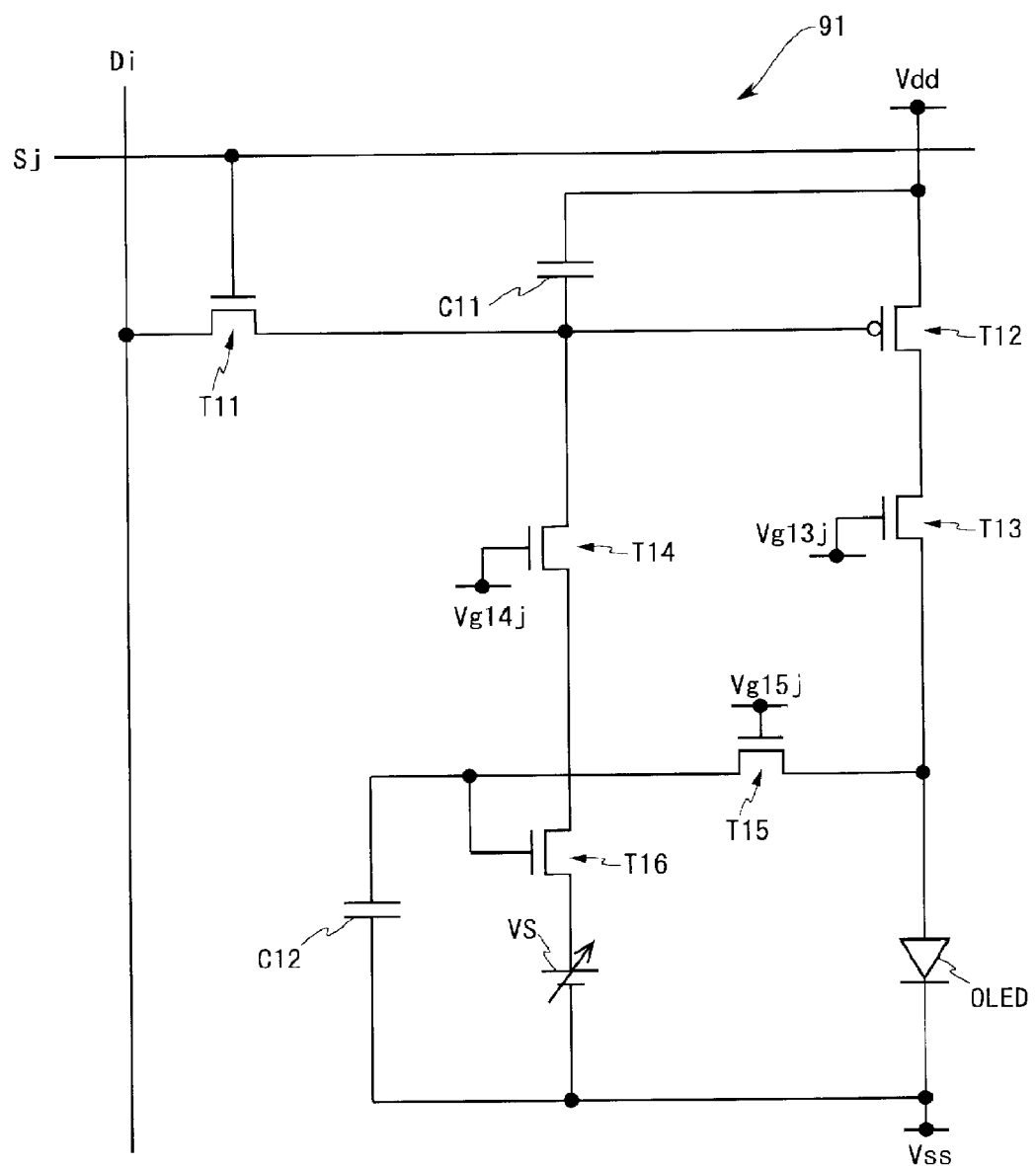
FIG. 33 is a circuit diagram showing a configuration of a conventional pixel circuit.

FIG. 30 is a timing chart showing a method of driving the pixel circuits 11 in the present embodiment. In the present embodiment, a time t1 a to t3a is a non-light emitting period LSP. The time t1 to t2 is the writing period WP. The time t2 to t3 is the reverse direction compensation period ICP. The operation at the time t1 a is similar to that of Embodiment 5, and thus, descriptions thereof are omitted.

Also, at the time t1, the potential of the scan wiring line Sj changes from a high level to a low level, and thus, the transistor T1 turns ON. Thus, the voltage Vsig (data voltage) of the data signal supplied from the data wiring line Di is written to the capacitor C2. At this time, the transistor T5 is OFF, and thus, no current flows through the resistor R1. Therefore, no voltage is present between the terminals of the resistor R1, and the transistor T9 is OFF.

Also, at the time t2, the potential of the scan wiring line Sj changes from a low level to a high level, and thus, the transistor T1 turns OFF. Thus, the writing of the data voltage Vsig to the capacitor C2 ends. Also, at the time t2, the potential of the control line Vg5j changes from a high level to a low level, and thus, the transistor T5 turns ON. Therefore, the organic EL element OLED becomes reverse biased due to the low level power source potential Vss and the reverse bias power source potential Vr. As a result, the reverse direction current Ioledr flowing through the organic EL element OLED flows to the resistor R1, and a voltage occurs between the terminals of the resistor R1. In the present embodiment, the reverse direction current Ioledr flows, and thus, the voltage between the terminals of the resistor R1 corresponds to a reverse direction voltage Voledr (second voltage). The reverse direction voltage Voledr of the present embodiment is determined according to the following formula (13).

$$Voledr=Ioledr \cdot R1 \quad (13)$$

The reverse direction voltage Voledr of the present embodiment is determined according to the following formula (14).

$$|Voledr|>|VthT9| \quad (14)$$

If a reverse direction voltage Voledr occurs between the terminals of the resistor R1, the transistor T9 turns ON, and thus, a compensation current I2 flows from the capacitor C2 towards the reverse bias power source line Vr. During the period of the time t2 to t3 (period tc), it is preferable that the difference between the potential of the node N1 and the reverse bias power source potential Vr be such that the transistor T9 operates in a saturation region. As a result, the compensation current I2 corresponds to the reverse direction voltage Voledr occurring between the terminals of the resistor R1 as determined by the formula (7) above. During the period tc, the first and second conductive terminals of the transistor T9 respectively function as the source terminal and the drain terminal. As a result of the compensation current I2 flowing during the period tc, the drive voltage stored in the capacitor C2 changes by ΔVC2 attained in formula (8) above in a manner similar to Embodiment 5.

At the time t3, the potential of the control line Vg5j changes from a low level to a high level, and the transistor T5 turns OFF. Thus, reverse biasing of the organic EL element OLED ends. As a result, the reverse direction voltage Voledr does not occur between the terminals of the resistor R1, and thus, the transistor T9 turns OFF. Thus, the flow of the compensation current I2 stops.

At the time t3a, the potential of the control line Vg4*j* changes from a low level to a high level, and the transistor T4 turns ON. Therefore, the drive current I1 determined by formula (9) above is fed to the organic EL element OLED, and the organic EL element OLED emits light based on the value of the drive current I1.

<13.3 Effects>

According to the present embodiment, by controlling the transistor T9 by the reverse direction voltage Voledr occurring between the terminals of the resistor R1 when the reverse direction current Ioledr is flowing, it is possible to attain effects similar to those of Embodiment 5. Also, when the reverse direction current Ioledr is not flowing through the resistor R1, the transistor T9 is OFF, and thus, there is no need to provide the second compensation current control unit (transistor T6). As a result, it is possible to miniaturize the size of the circuit compared to Embodiment 5. Also, by using the resistor R1 and not the capacitor when detecting the reverse direction current Ioledr, it is possible to prevent a situation in which luminance compensation cannot occur due to insulation defects between the electrodes of the capacitor.

14. Other Configurations

The present invention is not limited to the embodiments above, and it is possible to provide various modifications within a range that does not deviate from the gist of the present invention. For example, in the respective embodiments, the voltage corresponding to the initial value of the reverse direction current Ioledr shown in FIG. 2 (4.8 μA) may be offset in the driving capacitance element 111. In this manner, it is possible to cancel out excessive compensation resulting from the initial value.

In Embodiments 3, 4, and 9, the transistor T4 may be of an n-channel type, with the control line Vg4*j* being shared between the gate terminal of the transistor T4 and the first conductive terminal of the transistor T7, in a manner similar to Embodiment 2. Also, in Embodiments 10 and 11, the transistor T4 may be of a p-channel type with the control line Vg4*j* being shared between the gate terminal of the transistor T4 and the first conductive terminal of the transistor T7. In Embodiments 7, 8 and 13, the transistor T4 may be of the n-channel type with the control line Vg4*j* being shared between the gate terminal of the transistor T4 and the first conductive terminal of the transistor T9, in a manner similar to Embodiment 6. In Embodiment 12, the transistor T4 may be of the p-channel type with the control line Vg4*j* being shared between the gate terminal of the transistor T4 and the first conductive terminal of the transistor T9.

In Embodiments 9 to 13, initialization and/or threshold voltage compensation may be performed. If performing threshold voltage compensation in Embodiments 9 to 11, at least a second pre-processing unit 122 (transistor T3) is provided between the gate terminal and the second conductive terminal of the transistor T2. When performing threshold voltage compensation in Embodiments 12 and 13, at least a threshold voltage compensation unit 108 (transistor T3) is provided between the gate terminal and the second conductive terminal of the transistor T2.

In Embodiments 1 to 3 and 10, the position where the transistor T4 is provided may be modified to be between the high level power source line Vdd (first power source line) and the transistor T2. Also, in Embodiments 9 and 11, the position where the transistor T4 is provided may be modified to be between the low level power source line Vss (first power source line) and the transistor T2.

15. Additional Notes

<Additional Note A1>

An active matrix display device includes:

a plurality of data wiring lines supplying data signals;

a plurality of scan wiring lines that are each selectively driven;

a first power source line that supplies a first power source potential;

a second power source line that supplies a second power source potential;

a reverse bias control line that supplies a control potential at least during a first prescribed period; and a plurality of pixel circuits provided at respective intersections between the plurality of data wiring lines and the plurality of scan wiring lines, wherein each of the pixel circuits includes:

an electrooptical element provided between the first power source line and the second power source line;

a driving unit that controls a current flowing to the electrooptical element, the driving unit including a driving transistor provided between the first power source line and the second power source line and connected in series to the electrooptical element;

an input unit that supplies to the driving unit a voltage of the data signal supplied by a corresponding data wiring line in response to a corresponding scan wiring line being selected;

a first compensation unit between the second power source line and the reverse bias control line, the first compensation unit supplying to the driving unit a compensation signal based on a reverse direction current flowing through the electrooptical element; and a light emission control unit that controls a light emission timing of the electrooptical element such that current is prevented from flowing between the first power source line and the electrooptical element during a second prescribed period that includes the first prescribed period, and wherein the driving unit determines a drive voltage for controlling the driving transistor in accordance with at least a voltage of the data signal and the compensation signal.

According to the display device disclosed in Additional Note A1, a compensation signal based on the reverse direction current flowing through the electrooptical element (hereinafter referred to as the organic EL element in the additional note descriptions) during reverse bias time is supplied to the driving unit, and the drive voltage is determined based on the voltage of at least the compensation signal and the data signal. A forward direction current (drive current) based on this drive voltage is then supplied to the organic EL element. The reverse direction current becomes greater as deterioration over time of the organic EL element progresses. Thus, the compensation signal also attains a value based on the degree of progression over time of deterioration of the organic EL element. As a result, the drive current also attains a value based on the degree of progression over time of the organic EL element. As a result, luminance compensation occurs based on the progression over time of deterioration of the organic EL element. Furthermore, this luminance compensation occurs during the second prescribed period during which the organic EL element does not emit light. Therefore, prior to the luminance compensation being completed, the organic EL element does not emit light, and therefore, a decrease in luminance in emitted light due to deterioration over time of the organic EL element can be mitigated to a greater degree than in conventional devices.

<Additional Note A2>

In the display device according to Additional Note A1, the compensation signal is at a first voltage based on the reverse direction current, and the driving unit determines the drive voltage based on at least a voltage of the data signal and the first voltage.

According to such a display device disclosed in Additional Note A2, the first voltage based on the reverse direction current is supplied to the driving unit, and the drive voltage is determined based on at least the first voltage and the voltage of the data signal. A forward direction current (drive current) based on this drive voltage is then supplied to the organic EL element. The reverse direction current becomes greater as deterioration over time of the organic EL element progresses. Thus, the first voltage based on the reverse direction current becomes greater as deterioration over time of the organic EL element progresses. As a result, the drive current also becomes larger as deterioration of the organic EL element progresses over time. As a result effects similar to the display device disclosed in Additional Note A1 can be attained.

<Additional Note A3>

In the display device according to Additional Note A2, the driving unit includes a driving capacitance unit that is provided between a control terminal and a first conductive terminal of the driving transistor and that stores the drive voltage, the input unit supplies a voltage of the data signal to the driving capacitance unit, and the first compensation unit supplies the first voltage to the driving capacitance unit during at least a portion of the first prescribed period.

According to the display device disclosed in Additional Note A3, the drive voltage can be determined using the first voltage supplied to the driving capacitance element.

<Additional Note A4>

In the display device according to Additional Note A3, the first conductive terminal of the driving transistor is located towards the first power source line.

According to such a display device disclosed in Additional Note A4, by providing the driving capacitance element between the control terminal of the driving transistor and the first conductive terminal located towards the first power source line, effects similar to the display device disclosed in Additional Note A3 can be attained.

<Additional Note A5>

In the display device according to Additional Note A3, the first conductive terminal of the driving transistor is located towards the second power source line.

According to such a display device disclosed in Additional Note A5, by providing the driving capacitance element between the control terminal of the driving transistor and the first conductive terminal located towards the second power source line, effects similar to the display device disclosed in Additional Note A3 can be attained.

<Additional Note A6>

In the display device according to Additional Note A1, wherein a conductive type of the driving transistor is of a p-channel type.

According to such a display device disclosed in Additional Note A6, it is possible to attain an effect similar to the display device disclosed in Additional Note A1 using a p-channel type driving transistor.

<Additional Note A7>

In the display device according to Additional Note A1, a conductive type of the driving transistor is of an n-channel type.

According to such a display device disclosed in Additional Note A7, it is possible to attain an effect similar to the display device disclosed in Additional Note A1 using an n-channel type driving transistor.

<Additional Note A8>

In the display device according to Additional Note A1, the second power source potential is lower than the first power source potential, and the control potential is lower than the second power source potential.

According to such a display device disclosed in Additional Note A8, effects similar to the display device disclosed in Additional Note A1 can be attained by causing a forward direction current (drive current) to flow from the first power source line towards the second power source line, and a reverse direction current to flow from the second power source line towards the reverse bias control line.

<Additional Note A9>

In the display device according to Additional Note A1, the second power source potential is higher than the first power source potential, and the control potential is higher than the second power source potential.

According to such a display device disclosed in Additional Note A9, effects similar to the display device disclosed in Additional Note A1 can be attained by causing a forward direction current (drive current) to flow from the second power source line towards the first power source line, and a reverse direction current to flow from the reverse bias control line towards the second power source line.

<Additional Note A10>

In the display device according to Additional Note A3, the first compensation unit supplies the reverse direction current to the driving capacitance unit during the first prescribed period, the input unit includes an input capacitance element and supplies a voltage of the data signal to the driving capacitance unit through the input capacitance element, the driving capacitance unit includes:

a first driving capacitance element to which the reverse direction current is supplied during the first prescribed period; and a second driving capacitance element provided between the first conductive terminal and the second conductive terminal of the driving transistor, the driving unit further includes a drive voltage application control unit that controls the application of the drive voltage to the driving transistor, the pixel circuits each further include a pre-processing unit that performs pre-processing on the drive voltage stored in the driving capacitance unit during a pre-processing period that is during the second prescribed period and before the first prescribed period, the pre-processing unit includes:

a first pre-processing unit that causes a short-circuit between the first terminal and the second terminal of the first driving capacitance element during the first pre-processing period in the pre-processing period; and a second pre-processing unit provided between the control terminal and the second conductive terminal of the driving transistor, at least the second pre-processing unit causes a short-circuit between the control terminal and the second conductive terminal of the driving transistor, and at least one of the first pre-processing unit, the first compensation unit, and the drive voltage application control unit causes a short-circuit between the terminal of the second driving capacitance element and the reverse bias control line.

According to such a display device disclosed in Additional Note A10, the terminal of the second driving capacitance element and the reverse bias control line are electrically connected to each other during the first pre-processing period by at least one of the first pre-processing unit, the first compensation unit, and the drive voltage application control unit. Thus, during the first pre-processing period, the voltage held in the second driving capacitance element is initialized to a value based on the control potential. As a result, during the second pre-processing period, it is possible to stably write the threshold voltage of the driving transistor to the second driving capacitance element. Therefore, variation in the threshold voltage of the driving transistor can be stably compensated.

<Additional Note A11>

In the display device according to Additional Note A3, the first compensation unit supplies the first voltage to the driving capacitance unit by causing a compensation current to flow between the driving capacitance unit and the reverse bias control line, the compensation current being determined based on the reverse direction current, the first compensation unit receiving said reverse direction current during the first prescribed period, each of the pixel circuits further includes:

a second compensation unit that causes a short-circuit between the control terminal and the second conductive terminal of the driving transistor before the compensation current flows between the driving capacitance unit and the reverse bias control line during the first prescribed period; and a second compensation initializing unit that is included in the first compensation unit, is provided between the second compensation current control unit that controls the timing at which the compensation current flows and the reverse bias control line, and causes a short-circuit between one end of the driving capacitance unit towards the second compensation current control unit and the reverse bias control line during the second prescribed period and before the first prescribed period.

According to such a display device disclosed in the Additional Note A11, the control terminal and the second conductive terminal of the driving transistor are electrically connected to each other prior to the compensation current flowing between the driving capacitance element and the reverse bias control line during the first prescribed period (to form a diode connection). Thus, the threshold voltage of the driving transistor is written to the driving capacitance element. As a result, it is possible to compensation for variation in the threshold voltage of the driving transistor using the threshold voltage. Also, the second compensation initializing unit causes one end of the driving capacitance element towards the second compensation current control unit to be electrically connected to the reverse bias control line during the second prescribed period and prior to the first prescribed period. Thus, the voltage held in the driving capacitance element is initialized to the difference in potential between the first power source potential and the control potential, which are fixed potentials, during the second prescribed period and prior to the first prescribed period. Thus, the threshold voltage of the driving transistor can be stably written to the driving capacitance element. Therefore, variation in the threshold voltage of the driving transistor can be stably compensated.

<Additional Note B1>

An active matrix display device includes:

a plurality of data wiring lines supplying data signals;

a plurality of scan wiring lines that are each selectively driven;

a first power source line that supplies a first power source potential;

a second power source line that supplies a second power source potential;

a reverse bias control line that supplies a control potential at least during a first prescribed period; and a plurality of pixel circuits provided at respective intersections between the plurality of data wiring lines and the plurality of scan wiring lines, wherein each of the pixel circuits includes:

an electrooptical element provided between the first power source line and the second power source line;

a driving unit that controls a current flowing to the electrooptical element, the driving unit including a driving transistor provided between the first power source line and the second power source line and connected in series to the electrooptical element, and a driving capacitance unit that stores a drive voltage for controlling the driving transistor;

an input unit that supplies to the driving unit a voltage of the data signal supplied by a corresponding data wiring line in response to a corresponding scan wiring line being selected;

a first compensation unit between the second power source line and the reverse bias control line, the compensation unit supplying to the driving capacitance unit a reverse direction current flowing through the electrooptical element; and a light emission control transistor provided between the first power source line and the electrooptical element, the light emission control transistor being in an off state during a second prescribed period that includes the first prescribed period, and wherein the driving unit determines the drive voltage based on at least a voltage of the data signal and the reverse direction current.

According to such a display device disclosed in Additional Note B1, the voltage of the data signal and the reverse direction current flowing to the electrooptical unit (organic EL element) during reverse bias time is supplied to the driving capacitance element, and the drive voltage is determined by at least the reverse direction current and the data signal voltage. A forward direction current (drive current) based on this drive voltage is then supplied to the organic EL element. The reverse direction current becomes greater as deterioration over time of the organic EL element progresses. As a result, the drive current also attains a value based on the degree of progression over time of the organic EL element. As a result, luminance compensation occurs based on the progression over time of deterioration of the organic EL element. Furthermore, this luminance compensation occurs during the second prescribed period during which the organic EL element does not emit light. Therefore, prior to the luminance compensation being completed, the organic EL element does not emit light, and therefore, a decrease in luminance in emitted light due to deterioration over time of the organic EL element can be mitigated to a greater degree than in conventional devices.

<Additional Note B2>

In the display device according to Additional Note B1, the driving unit determines the drive voltage based on at least a voltage of the data signal and a first voltage based on the compensation current.

According to such a display device disclosed in Additional Note B2, the first voltage based on the reverse direction current is supplied to the driving capacitance element, and the drive voltage is determined based on at least the first voltage and the voltage of the data signal. A forward direction current (drive current) based on this drive voltage is then supplied to the organic EL element. The reverse direction current becomes greater as deterioration over time of the organic EL element progresses. Thus, the first voltage based on the reverse direction current becomes greater as deterioration over time of the organic EL element progresses. As a result, the drive current also becomes larger as deterioration of the organic EL element progresses over time. As a result effects similar to the display device disclosed in Additional Note B1 can be attained.

<Additional Note B3>

In the display device according to Additional Note B2, the driving capacitance unit is provided between a control terminal and a first conductive terminal of the driving transistor and includes a first driving capacitance element to which the reverse direction current is supplied during the first prescribed period, and the driving unit is provided between the first conductive terminal and the first driving capacitance element of the driving transistor and further includes a transistor for controlling the application of the drive voltage, said transistor being off during the first prescribed period.

According to such a display device disclosed in Additional Note B3, by supplying the reverse direction current to the first driving capacitance element, and controlling the application of the drive voltage by the transistor for controlling the application of the drive voltage, it is possible to attain effects similar to the display device disclosed in Additional Note B2.

<Additional Note B4>

In the display device according to Additional Note B3, the input unit includes:

an input transistor having a control terminal connected to a corresponding scan wiring line, and a first conductive terminal connected to a corresponding data wiring line; and an input capacitance element provided between a second conductive terminal of the input transistor and the first driving capacitance element.

According to such a display device disclosed in Additional Note B4, the input unit is constituted of the input transistor and the input capacitance element. Thus, based on the selection timing for the scan wiring line, the voltage of the data signal can be supplied to the driving capacitance element through the input capacitance element.

<Additional Note B5>

In the display device according to Additional Note B4, the first compensation unit includes:

a first transistor for supplying a reverse direction current provided between the electrooptical element and the first driving capacitance element, said first transistor being on during the first prescribed period; and a second transistor for supplying a reverse direction current provided between the first driving capacitance element and the reverse bias control line, said second transistor being on during the first prescribed period.

According to such a display device disclosed in Additional Note B5, the first compensation unit is constituted of first and second transistors for supplying the reverse direction currents.

<Additional Note B6>

In the display device according to Additional Note B5, the pixel circuits each further include a pre-processing unit that performs pre-processing on the drive voltage stored in the driving capacitance unit during a pre-processing period that is during the second prescribed period and before the first prescribed period.

According to such a display device disclosed in Additional Note B6, it is possible to perform pre-processing on the drive voltage. Pre-processing includes initialization or threshold voltage compensation.

<Additional Note B7>

In the display device according to Additional Note B6, the pre-processing unit includes a first pre-processing transistor provided between terminals of the first driving capacitance element, the first pre-processing transistor being on during a first pre-processing period in the pre-processing period.

According to such a display device disclosed in Additional Note B7, during the first pre-processing period, both terminals of the first driving capacitance element are electrically connected to each other through the first pre-processing transistor. Thus, the voltage held in the first driving capacitance element is initialized to 0V. As a result, it is possible to reliably write the first voltage based on the reverse direction current to the first driving capacitance element.

<Additional Note B8>

In the display device according to Additional Note B7, the driving capacitance unit further includes a second driving capacitance element provided between the first conductive terminal and a second conductive terminal of the driving transistor, and the pre-processing unit further includes a second pre-processing transistor provided between the control terminal and the second conductive terminal of the driving transistor, the second pre-processing transistor being on in a second pre-processing period during the pre-processing period and after the first pre-processing period.

According to such a display device disclosed in Additional Note B8, during the second pre-processing period, the control terminal and the second conductive terminal of the driving transistor are electrically connected to each other through at least the second pre-processing transistor (form a diode connection). Thus, during the second pre-processing period, the threshold voltage of the driving transistor is written to the second driving capacitance element. As a result, it is possible to compensation for variation in the threshold voltage of the driving transistor using the threshold voltage.

<Additional Note B9>

In the display device according to Additional Note B8, the first pre-processing transistor and the transistor for controlling the application of the drive voltage turn on during the second pre-processing period.

According to such a display device disclosed in Additional Note B9, during the second pre-processing period, the second pre-processing transistor, the first pre-processing transistor, and the transistor for controlling the application of the drive voltage are turned ON, variation in threshold voltage in the driving transistor can be reliably compensated.

<Additional Note B10>

In the display device according to Additional Note B9, the second transistor for supplying a reverse direction current and the transistor for controlling the application of the drive voltage turn on during the first pre-processing period.

According to the display device disclosed in Additional Note B10, during the first pre-processing period, the transistor for supplying the second reverse direction current, the transistor for controlling the application of the drive voltage, and the first pre-processing transistor cause the terminal of the second driving capacitance element to be electrically connected to the reverse bias control line. Thus, during the first pre-processing period, the voltage held in the second driving capacitance element is initialized to a value based on the control potential, which is a fixed potential. As a result, during the second pre-processing period, it is possible to stably write the threshold voltage of the driving transistor to the second driving capacitance element. Therefore, variation in the threshold voltage of the driving transistor can be stably compensated.

<Additional Note B11>

In the display device according to any one of Additional Notes B1 to B10, the reverse bias control line supplies the control potential during the second prescribed period, and a control terminal of the light emission control transistor is connected to the reverse bias control line.

According to such a display device disclosed in Additional Note B11, the reverse bias control line is shared between the components in the first compensation unit connected to the reverse bias control line and the transistor for controlling light emission. Thus, the number of lines can be reduced.

<Additional Note B12>

A method of driving an active matrix display device includes: a plurality of data wiring lines supplying data signals; a plurality of scan wiring lines that are each selectively driven; first power source lines that supply a first power source potential; second power source lines that supply a second power source potential; and a plurality of pixel circuits provided at respective intersections between the plurality of data wiring lines and the plurality of scan wiring lines, each of the pixel circuits including: an electrooptical element provided between the first power source line and the second power source line; and a driving unit that controls a current flowing to the electrooptical element, the driving unit including a driving transistor provided between the first power source line and the second power source line and connected in series with the electrooptical element, the method including:

supplying to the driving unit a voltage of the data signal supplied by a corresponding data wiring line in response to a corresponding scan wiring line being selected;

supplying to the driving capacitance unit a reverse direction signal flowing to the electrooptical element between the second power source line and a reverse bias control line that supplies a control potential at least during a first prescribed period;

determining the drive voltage based on at least a voltage of the data signal and the reverse direction current; and controlling a light emission timing of the electrooptical element to block current flowing between the first power source line and the electrooptical element during a second prescribed period that includes the first prescribed period.

According to such a method for driving a display device disclosed in Additional Note B12, effects similar to the display device disclosed in Additional Note B1 can be attained.

<Additional Note C1>

An active matrix display device includes:

a plurality of data wiring lines supplying data signals;

a plurality of scan wiring lines that are each selectively driven;

a first power source line that supplies a first power source potential;

a second power source line that supplies a second power source potential;

a reverse bias control line that supplies a control potential at least during a first prescribed period; and a plurality of pixel circuits provided at respective intersections between the plurality of data wiring lines and the plurality of scan wiring lines, wherein each of the pixel circuits includes:

an electrooptical element provided between the first power source line and the second power source line;

a driving unit that controls a current flowing through the electrooptical element, the driving unit including a driving transistor provided between the first power source line and the second power source line and connected in series to the electrooptical element, and a driving capacitance element that stores a drive voltage for controlling the driving transistor;

an input unit that supplies to the driving unit a voltage of the data signal supplied by a corresponding data wiring line in response to a corresponding scan wiring line being selected;

a first compensation unit that receives a reverse direction current flowing through the electrooptical element between the second power source line and the reverse bias control line during the first prescribed period, and supplies a compensation signal based on the reverse direction current to the driving capacitance element; and a light emission control transistor provided between the first power source line and the electrooptical element, the light emission control transistor being in an off state during a second prescribed period that includes the first prescribed period, and wherein the driving unit determines a drive voltage for controlling the driving transistor in accordance with at least a voltage of the data signal and the compensation signal.

According to such a display device disclosed in Additional Note C1, during the first prescribed period, the compensation signal based on the reverse direction current flowing to the electrooptical element (organic EL element) during reverse bias time is supplied to the driving capacitance element, and the drive voltage is determined by the voltages of at least the compensation signal and the data signal. A forward direction current (drive current) based on this drive voltage is then supplied to the organic EL element. The reverse direction current becomes greater as deterioration over time of the organic EL element progresses. Thus, the compensation signal also attains a value based on the degree of progression over time of deterioration of the organic EL element. As a result, the drive current also attains a value based on the degree of progression over time of the organic EL element. As a result, luminance compensation occurs based on the progression over time of deterioration of the organic EL element. Furthermore, this luminance compensation occurs during the second prescribed period during which the organic EL element does not emit light. Therefore, prior to the luminance compensation being completed, the organic EL element does not emit light, and therefore, a decrease in luminance in emitted light due to deterioration over time of the organic EL element can be mitigated to a greater degree than in conventional devices.

<Additional Note C2>

In the display device according to Additional Note C1, the compensation signal is a compensation current determined on the basis of the reverse direction current, the compensation current flowing between the driving capacitance element and the reverse bias control line during the first prescribed period, and the driving unit determines the drive voltage based on at least a voltage of the data signal and a first voltage based on the compensation current.

According to such a display device disclosed in Additional Note C2, the compensation current determined based on the reverse direction current flows between the driving capacitance element and the reverse bias control line during the second compensation period, and thus, the voltage stored in the driving capacitance element based on the compensation current changes. This means that the first voltage based on the compensation current is supplied to the driving capacitance element. The value of the compensation current is determined based on the reverse direction current, and thus, the first voltage is also based on the reverse direction current. The drive voltage is determined based on at least the first voltage and the voltage of the data signal, and the forward direction current (drive current) based on the drive voltage is supplied to the organic EL element. The reverse direction current becomes greater as deterioration over time of the organic EL element progresses, and thus, the compensation current also becomes greater as deterioration over time of the organic EL element progresses. Thus, the first voltage based on the compensation current becomes greater as deterioration over time of the organic EL element progresses. As a result, the drive current also becomes larger as deterioration of the organic EL element progresses over time. As a result effects similar to the display device disclosed in Additional Note C1 can be attained.

<Additional Note C3>

In the display device according to Additional Note C2, the driving capacitance element is provided between the control terminal and the first conductive terminal of the driving transistor.

According to such a display device disclosed in Additional Note C3, by using the driving transistor controlled by the drive voltage applied between the control terminal and the first conductive terminal, effects similar to the display device disclosed in Additional Note C2 can be attained.

<Additional Note C4>

In the display device according to Additional Note C3,
the first compensation unit includes:
a capacitance element for controlling the compensation current provided between the electrooptical element and the reverse bias control line, said capacitance element being supplied the reverse direction current flowing through the electrooptical element between the second power source line and the reverse bias control line during a first compensation period in the first prescribed period, and storing a second voltage based on the reverse direction current; and
a first transistor for controlling the compensation current based on the second voltage stored in the capacitance element for controlling the compensation current, said first transistor being provided between the driving capacitance element and the reverse bias control line, said first transistor causing the compensation current to flow between the driving capacitance element and the reverse bias control line during a second compensation period during the first prescribed period and after the first compensation period.

According to such a display device disclosed in Additional Note C4, the second voltage based on the reverse direction current is stored in the capacitance element for controlling the compensation current, and the transistor for controlling the compensation current is controlled by the second voltage, and thus, a compensation current determined based on the reverse direction current can flow.

<Additional Note C5>

In the display device according to Additional Note C4, the capacitance element for controlling the compensation current is provided between a control terminal of the first transistor for controlling the compensation current and a conductive terminal conductive terminal of said first transistor located towards the reverse bias control line.

According to the display device disclosed in Additional Note C5, by providing the capacitance element for controlling the compensation current between the control terminal of the transistor for controlling the compensation current and the conductive terminal towards the reverse bias control line, effects similar to the display device disclosed in Additional Note C4 can be attained.

<Additional Note C6>

In the display device according to Additional Note C5, the first compensation unit further includes a second transistor for controlling the compensation current, said second transistor being provided between the driving capacitance element and the first transistor for controlling the compensation current and being turned on during the second compensation period.

According to the display device disclosed in Additional Note C6, it is possible to control the timing at which the compensation current flows using the second transistor for controlling the compensation current.

<Additional Note C7>

In the display device according to Additional Note C6, the first compensation unit further includes a transistor for supplying a reverse direction current provided between the electrooptical element and the capacitance element for controlling the compensation current, said transistor being turned on during the first compensation period.

According to such a display device disclosed in Additional Note C7, it is possible to control the flowing of the reverse direction current between the second power source line and the capacitance element for controlling the compensation current using the transistor for supplying the reverse direction current.

<Additional Note C8>

In the display device according to Additional Note C7, the pixel circuit further includes a first compensation initializing transistor provided between terminals of the capacitance element for controlling the compensation current, the first compensation initializing transistor being turned on during the second prescribed period and before or after the first prescribed period.

According to such a display device disclosed in Additional Note C8, before or after the first prescribed period, both terminals of the capacitance element for controlling the compensation current are electrically connected to each other through the first compensation initializing transistor. Thus, the voltage held in the capacitance element for controlling the compensation current is initialized to 0V. Therefore, it is possible to reliably write the second voltage to the capacitance element for controlling the compensation current.

<Additional Note C9>

In the display device according to Additional Note C8, the first compensation initializing transistor is turned on immediately after the first prescribed period.

According to the display device disclosed in Additional Note C9, the voltage held in the capacitance element for controlling the compensation current is initialized to 0V during the second prescribed period and before or after the first prescribed period. Thus, the gate bias stress on the transistor for controlling the compensation current is reduced, thereby making it possible to mitigate changes in threshold voltage in the transistor for controlling the compensation current. As a result, it is possible to more reliably control the compensation current, and therefore, it is possible to more reliably perform luminance compensation based on the amount of deterioration over time of the organic EL element.

<Additional Note C10>

In the display device according to Additional Note C3,
the first compensation unit includes:
a resistor through which the reverse direction current flows; and
a compensation current control transistor that is provided between the driving capacitance element and the reverse bias control line and that allows through a compensation current based on a second voltage that occurs between terminals of the resistor.

According to such a display device disclosed in Additional Note C10, by controlling the transistor for controlling the compensation current using the second voltage formed between the terminals of the resistor when the reverse direction current is flowing, it is possible to cause the compensation current determined based on the reverse direction current to flow.

<Additional Note C11>

In the display device according to Additional Note C10, the first compensation unit further includes a transistor for supplying a reverse direction current provided between the electrooptical element and the resistor, said transistor being turned on during the first prescribed period.

According to such a display device disclosed in Additional Note C10, it is possible to control the flowing of the reverse direction current between the second power source line and the resistor using the transistor for supplying the reverse direction current.

<Additional Note C12>

In the display device according to Additional Note C1, the pixel circuit further includes a second compensation transistor provided between a control terminal and a second conductive terminal of the driving transistor, the second compensation transistor being turned on before the compensation signal is supplied to the driving capacitance element during the first prescribed period, and the input unit includes:

an input transistor having a control terminal connected to a corresponding scan wiring line, and a first conductive terminal connected to a corresponding data wiring line; and an input capacitance element provided between a second conductive terminal of the input transistor and the driving capacitance element.

According to such a display device disclosed in Additional Note C12, the control terminal and the second conductive terminal of the driving transistor are electrically connected (form a diode connection) before the compensation current flows between the driving capacitance element and the reverse bias control line during the first prescribed period. Thus, the threshold voltage of the driving transistor is written to the driving capacitance element. As a result, it is possible to compensation for variation in the threshold voltage of the driving transistor using the threshold voltage.

<Additional Note C13>

In the display device according to Additional Note C12, the pixel circuit further includes a second compensation initializing transistor provided between the driving capacitance element and the reverse bias control line, the second compensation initializing transistor being turned on during the second prescribed period and before the first prescribed period.

According to such a display device disclosed in Additional Note C13, the terminal of the driving capacitance element and the reverse bias control line are electrically connected to each other through the second transistor for compensation initialization during the second prescribed period and before the first prescribed period. Thus, the voltage held in the driving capacitance element is initialized to the value based on the control potential during the second prescribed period and before the first prescribed period. Thus, the threshold voltage of the driving transistor can be stably written to the driving capacitance element. Therefore, variation in the threshold voltage of the driving transistor can be stably compensated.

<Additional Note C14>

In the display device according to any one of Additional Notes C1 to C13, the reverse bias control line supplies the control potential during the second prescribed period, and a control terminal of the light emission control transistor is connected to the reverse bias control line.

According to such a display device disclosed in Additional Note C14, the reverse bias control line is shared between the components in the first compensation unit connected to the reverse bias control line and the transistor for controlling light emission. Thus, the number of lines can be reduced.

<Additional Note C15>

A method of driving an active matrix display device includes: a plurality of data wiring lines supplying data signals; a plurality of scan wiring lines that are each selectively driven; first power source lines that supply a first power source potential; second power source lines that supply a second power source potential; and a plurality of pixel circuits provided at respective intersections between the plurality of data wiring lines and the plurality of scan wiring lines, each of the pixel circuits including: an electrooptical element provided between the first power source line and the second power source line; and a driving unit that controls a current flowing to the electrooptical element, the driving unit including a driving transistor provided between the first power source line and the second power source line and connected in series with the electrooptical element, the method including:

supplying to the driving unit a voltage of the data signal supplied by a corresponding data wiring line in response to a corresponding scan wiring line being selected;

supplying to the driving capacitance element a compensation signal based on a reverse direction current flowing through the electrooptical element between the second power source line and a reverse bias control line that supplies a control potential at least during a first prescribed period;

determining the drive voltage based on at least a voltage of the data signal and the compensation signal; and controlling a light emission timing of the electrooptical element to block current flowing between the first power source line and the electrooptical element during a second prescribed period that includes the first prescribed period.

According to such a method for driving a display device disclosed in Additional Note C15, effects similar to the display device disclosed in Additional Note C1 can be attained.

INDUSTRIAL APPLICABILITY

The display device of the present invention has the characteristic of being able to mitigate a decrease in luminance resulting from deterioration over time of the electrooptical element, and thus, it is possible to use the present invention in various types of display devices including electrooptical elements such as organic EL displays.

DESCRIPTION OF REFERENCE CHARACTERS

10 display unit
11 pixel circuit
30 data driver
40 scan driver
50 group of selection drivers
101 input unit
102 driving unit
103 light emission control unit
104 reverse direction current compensation unit (first compensation unit)

105 pre-processing unit
106 first compensation initializing unit
107 second compensation initializing unit
108 threshold voltage compensation unit (second compensation unit)
111 driving capacitance element
112 drive voltage application control unit
121 initializing unit (first pre-processing unit)
122 threshold voltage compensation unit (second pre-processing unit)
131 reverse direction current supplying unit
132 first compensation current control unit
133 second compensation current control unit
T1 to T9 transistor
C1 to C3 capacitor
R1 resistor
OLED organic EL element (electrooptical element)
Di (i=1 to m) data wiring line
Sj (j=1 to n) scan wiring line
Vg3j to Vg8j (j=1 to n) control line
Vdd high level power source line (first power source line)
Vss low level power source line (second power source line)
Vr reverse bias power source line (reverse direction bias control line)
ICP reverse direction compensation period (first prescribed period)
ICP1, ICP2 first and second reverse direction compensation periods (first and second compensation periods)
PP pre-processing period
IP initializing period (first pre-processing period)
TCP threshold voltage compensation period (second pre-processing period)
WP writing period

What is claimed is:

1. An active matrix display device, comprising:
a plurality of data wiring lines supplying data signals;
a plurality of scan wiring lines that are each selectively driven;
reverse bias control lines that supply a control potential at least during a first prescribed period; and
a plurality of pixel circuits provided at respective intersections between the plurality of data wiring lines and the plurality of scan wiring lines,
wherein each of the pixel circuits includes:
an electrooptical element provided between a first power source line that supplies a first power source potential and a second power source line that supplies a second power source potential;
a driving unit that controls a current flowing to the electrooptical element, the driving unit including a driving transistor provided between the first power source line and the second power source line and connected in series to the electrooptical element;
an input unit that supplies to the driving unit a voltage of the data signal supplied by a corresponding data wiring line in response to a corresponding scan wiring line being selected;
a first compensation unit causing the electrooptical element to be reverse biased between the second power source line and the reverse bias control line during the first prescribed period, the first compensation unit supplying to the driving unit a compensation signal based on a reverse direction current flowing through the electrooptical element that is reverse biased; and
a light emission control unit that controls a light emission timing of the electrooptical element such that current is prevented from flowing between the first power source line and the electrooptical element during a second prescribed period that includes the first prescribed period, and
wherein the driving unit determines a drive voltage for controlling the driving transistor in accordance with at least a voltage of the data signal and the compensation signal, the driving unit causing the electrooptical element to emit light in accordance with the determined drive voltage after the second prescribed period ends.

2. The display device according to claim 1,
wherein the compensation signal is at a first voltage based on the reverse direction current, and
wherein the driving unit determines the drive voltage based on at least a voltage of the data signal and the first voltage.

3. The display device according to claim 2,
wherein the driving unit includes a driving capacitance unit that is provided between a control terminal and a first conductive terminal of the driving transistor and that stores the drive voltage,
wherein the input unit supplies a voltage of the data signal to the driving capacitance unit, and
wherein the first compensation unit supplies the first voltage to the driving capacitance unit during at least a portion of the first prescribed period.

4. The display device according to claim 3,
wherein the first compensation unit supplies the reverse direction current to the driving capacitance unit during the first prescribed period, and
wherein the input unit includes an input capacitance element and supplies a voltage of the data signal to the driving capacitance unit through the input capacitance element.

5. The display device according to claim 4,
wherein the driving capacitance unit includes a first driving capacitance element to which the reverse direction current is supplied during the first prescribed period, and
wherein the driving unit further includes a drive voltage application control unit that controls the application of the drive voltage to the driving transistor.

6. The display device according to claim 5, wherein the pixel circuits each further include a pre-processing unit that performs pre-processing on the drive voltage stored in the driving capacitance unit during a pre-processing period that is during the second prescribed period and before the first prescribed period.

7. The display device according to claim 6, wherein the pre-processing unit includes a first pre-processing unit that causes a short-circuit between both terminals of the first driving capacitance element during a first pre-processing period during the pre-processing period.

8. The display device according to claim 7,
wherein the driving capacitance unit further includes a second driving capacitance element provided between the first conductive terminal and a second conductive terminal of the driving transistor,
wherein the pre-processing unit further includes a second pre-processing unit provided between the control terminal and the second conductive terminal of the driving transistor, and
wherein at least the second pre-processing unit causes a short-circuit between the control terminal and the second conductive terminal of the driving transistor during a second pre-processing period during the pre-processing period and after the first pre-processing period.

9. The display device according to claim 3, wherein the first compensation unit supplies the first voltage to the driving capacitance unit by causing a compensation current to flow between the driving capacitance unit and the reverse bias control line, the compensation current being determined based on the reverse direction current, the first compensation unit receiving said reverse direction current during the first prescribed period.

10. The display device according to claim 9,
wherein the first compensation unit includes:
- a first compensation current control unit that controls a value of the compensation current based on the reverse direction current; and
- a reverse direction current supplying unit that supplies the reverse direction current to the first compensation current control unit.

11. The display device according to claim 10,
wherein the first compensation unit further includes a second compensation current control unit that controls a timing at which the compensation current flows, and
wherein the first compensation current control unit includes:
- a capacitance element for compensation current control that stores a second voltage based on the reverse direction current; and
- a transistor for compensation current control that is provided between the driving capacitance unit and the reverse bias control line and that allows through a compensation current based on the second voltage stored in said capacitance element for compensation current control.

12. The display device according to claim 11, wherein each of the pixel circuits further includes a first compensation initializing unit that causes a short-circuit between both terminals of the capacitance element for compensation current control before or after the first prescribed period.

13. The display device according to claim 10,
wherein the first compensation current control unit includes:
- a resistor through which the reverse direction current flows; and
- a transistor for compensation current control that is provided between the driving capacitance unit and the reverse bias control line and that allows through a compensation current based on a second voltage that occurs between terminals of the resistor.

14. The display device according to claim 9, wherein each of the pixel circuits further includes a second compensation unit that causes a short-circuit between the control terminal and the second conductive terminal of the driving transistor before the compensation current flows between the driving capacitance unit and the reverse bias control line during the first prescribed period.

15. The display device according to claim 1,
wherein the reverse bias control line supplies the control potential during the second prescribed period, and
wherein the light emission control unit is controlled by the reverse bias control line and blocks a current flowing between the first power source line and the electrooptical element when the control potential is supplied to the control line.

16. A method of driving an active matrix display device that includes: a plurality of data wiring lines supplying data signals; a plurality of scan wiring lines that are each selectively driven; and a plurality of pixel circuits provided at respective intersections between the plurality of data wiring lines and the plurality of scan wiring lines, each of the pixel circuits including: an electrooptical element provided between a first power source line that supplies a first power source potential and a second power source line that supplies a second power source potential; and a driving unit that controls a current flowing to the electrooptical element, the driving unit including a driving transistor provided between the first power source line and the second power source line and connected in series with the electrooptical element, the method comprising:
- supplying to the driving unit a voltage of the data signal supplied by a corresponding data wiring line in response to a corresponding scan wiring line being selected;
- supplying to the driving unit a compensation signal based on a reverse direction current flowing to the electrooptical element between the second power source line and a reverse bias control line that supplies a control potential at least during a first prescribed period;
- determining a drive voltage for controlling the driving transistor by at least a voltage of the data signal and the compensation signal;
- controlling a light emission timing of the electrooptical element to block current flowing between the first power source line and the electrooptical element during a second prescribed period that includes the first prescribed period; and
- causing the electrooptical element to emit light in accordance with the determined drive voltage after the second prescribed period ends.

* * * * *